(12) United States Patent
France

(10) Patent No.: US 9,562,764 B2
(45) Date of Patent: Feb. 7, 2017

(54) USE OF A SKY POLARIZATION SENSOR FOR ABSOLUTE ORIENTATION DETERMINATION IN POSITION DETERMINING SYSTEMS

(71) Applicant: Trimble Navigation Limited, Sunnyvale, CA (US)

(72) Inventor: Peter Glen France, Westmorland Christchurch (NZ)

(73) Assignee: Trimble Inc., Sunnyvale, CA (US)

( * ) Notice: Subject to any disclaimer, the term of this patent is extended or adjusted under 35 U.S.C. 154(b) by 863 days.

(21) Appl. No.: 13/830,955

(22) Filed: Mar. 14, 2013

(65) Prior Publication Data
US 2014/0022539 A1    Jan. 23, 2014

Related U.S. Application Data

(60) Provisional application No. 61/674,563, filed on Jul. 23, 2012.

(51) Int. Cl.
*G01B 11/26* (2006.01)
*G01S 19/48* (2010.01)
(Continued)

(52) U.S. Cl.
CPC .......... *G01B 11/26* (2013.01); *G01C 3/08* (2013.01); *G01C 15/00* (2013.01); *G01C 17/00* (2013.01);
(Continued)

(58) Field of Classification Search
CPC .......... G01B 11/26; G01C 3/08; G01C 15/00; G01C 17/00
See application file for complete search history.

(56) References Cited

U.S. PATENT DOCUMENTS

| 1,990,607 A | 2/1935 | Kocks |
|---|---|---|
| 5,903,235 A | 5/1999 | Nichols |

(Continued)

FOREIGN PATENT DOCUMENTS

| CN | 101413799 A | 4/2009 |
|---|---|---|
| EP | 1990607 A | 11/2008 |

(Continued)

OTHER PUBLICATIONS

Chu, Jinkui et al., "Research on a Novel Polarization Sensor for Navigation", Proceedings of the 2007 International Convference on Information Acquisition. Jeju City, Korea, Jul. 9-11, 2007, pp. 241-246.

(Continued)

*Primary Examiner* — Luke Ratcliffe
*Assistant Examiner* — Samantha K Abraham
(74) *Attorney, Agent, or Firm* — Kilpatrick Townsend & Stockton LLP

(57) ABSTRACT

A method for determining absolute orientation of a platform is disclosed. In one embodiment, a first sky polarization data set for a first time Ti is measured using a sky polarization sensor disposed on a platform. A second sky polarization data set is obtained at a second time Tj. A difference in orientation between the first sky polarization data set and the second sky polarization data set is determined using an orientation determiner. The difference in orientation is provided as at least one orientation parameter for the platform at time Tj. The at least one orientation parameter is used to provide a direction relative to a reference point on the platform.

38 Claims, 44 Drawing Sheets

(51) Int. Cl.

| | | |
|---|---|---|
| *G06G 7/70* | (2006.01) | |
| *G01C 3/08* | (2006.01) | |
| *G01C 15/00* | (2006.01) | |
| *G01C 17/00* | (2006.01) | |
| *G01J 4/04* | (2006.01) | |
| *G01S 17/06* | (2006.01) | |
| *G01S 19/43* | (2010.01) | |
| *G01S 19/53* | (2010.01) | |

(52) U.S. Cl.
CPC ............... *G01J 4/04* (2013.01); *G01S 17/06* (2013.01); *G01S 19/43* (2013.01); *G01S 19/48* (2013.01); *G01S 19/53* (2013.01); *G06G 7/70* (2013.01)

(56) References Cited

U.S. PATENT DOCUMENTS

| | | | | |
|---|---|---|---|---|
| 8,390,696 | B2 | 3/2013 | Komoto et al. | |
| 8,654,179 | B2 † | 2/2014 | Kanamori | |
| 2002/0178815 | A1* | 12/2002 | Challoner | G01C 19/42 73/504.16 |
| 2003/0160757 | A1* | 8/2003 | Shirai | G01C 1/04 345/156 |
| 2004/0233461 | A1* | 11/2004 | Armstrong | G01C 11/025 356/620 |
| 2010/0275334 | A1* | 10/2010 | Proksch | B82Y 35/00 850/33 |
| 2011/0018990 | A1 | 1/2011 | Komoto et al. | |
| 2011/0050854 | A1* | 3/2011 | Kanamori | G06T 7/0065 348/46 |
| 2011/0231094 | A1* | 9/2011 | Simon | G01S 5/16 701/469 |
| 2011/0275408 | A1* | 11/2011 | Kulik | G01C 17/34 455/556.1 |
| 2012/0127455 | A1* | 5/2012 | Sharp | G01C 25/00 356/6 |

FOREIGN PATENT DOCUMENTS

| | | | |
|---|---|---|---|
| EP | 2375755 A1 † | 10/2011 | |
| WO | 2011/036662 | 3/2011 | |
| WO | WO 2013/103725 † | 7/2013 | |

OTHER PUBLICATIONS

Zhao, et al., "A Novel Angle Algorithm of Polarized Sensor for Navigation", Aug. 2009, 6 Pages.

Campbell, Charles D., A Sky Compass for Field Use, pp. 43-51, Northwest Science, vol. 28, No. 2, 1954.†

Sarkar, Mukul, et al., Biologically Inspired Autonomous Agent Navigation using an Integrated Polarization Analyzing CMOS Image Sensor, pp. 673-676, Procedia Engineering, vol. 5, (Sep. 5, 2010).†

\* cited by examiner
† cited by third party

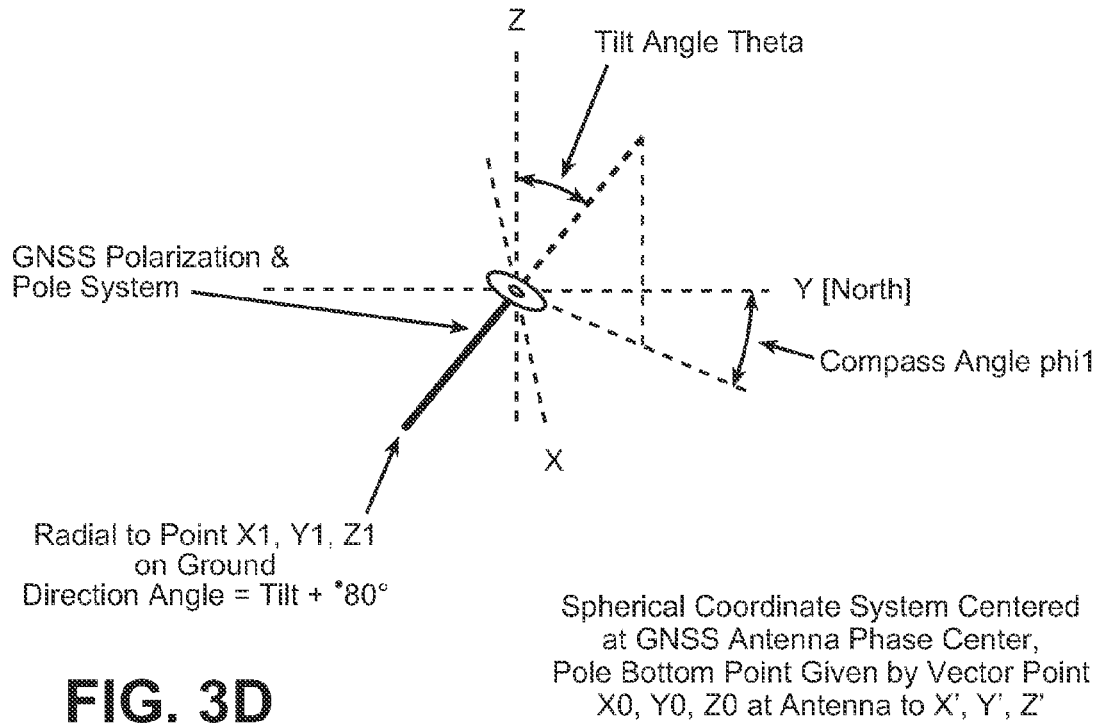
FIG. 3D
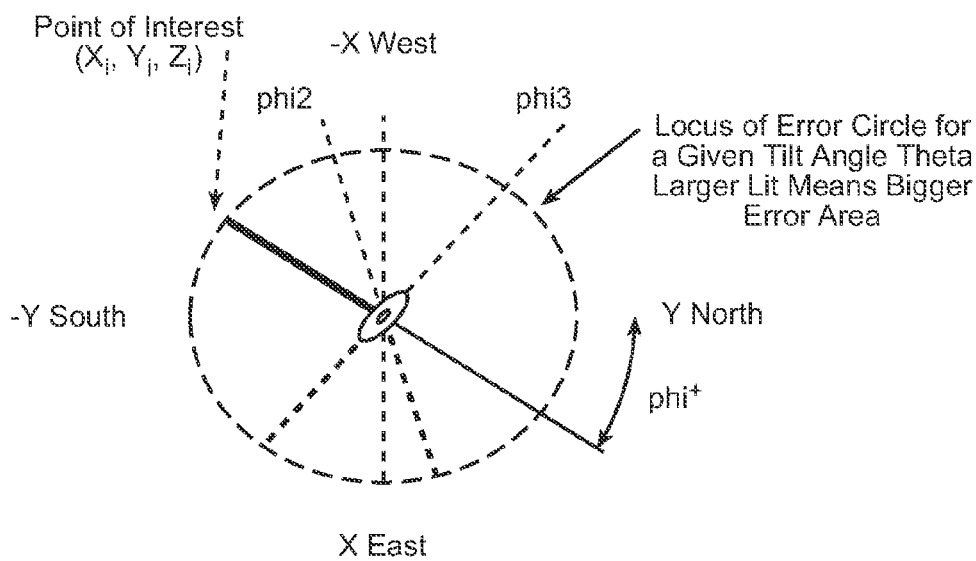
FIG. 3E Top Down View

Pole Bottom Point Is at the Center of the Sphere
GNSS Position Point Is at the Tip of the Radial Fig. 4B Total Station with Orientation System Use case for Sky Polarization Orientation
Determination on a Total Station Pole Polarization Detector ACQUIRE A REFERENCE SKY POLARIZATION DATA SET MEASURED AT FIRST TIME Ti
1401

ACQUIRE A SKY POLARIZATION DATA SET MEASURED AT A SECOND TIME Tj FROM PLATFORM-MOUNTED SKY POLARIZATION SENSOR
1402

PROCESS THE TWO SKY POLARIZATION DATA SETS TO DETERMINE THE DIFFERENCE IN ORIENTATION BETWEEN THEM
1403

PROVIDING SAID DIFFERENCE IN ORIENTATION AS ORIENTATION PARAMETERS FOR PLATFORM AT TIME Tji
1404

USE ORIENTATION PARAMETERS TO PROVIDE A DIRECTION RELATIVE TO A REFERENCE POINT ON SAID PLATFORM
1405

FIG. 14

SIGHT TO A TARGET USING THE VISUAL SIGHTING DEVICE
1501

ACQUIRE A RANGE MEASUREMENT TO TARGET AND A SKY POLARIZATION MEASUREMENT
1502

DETERMINE ABSOLUTE ORIENTATION OF VISUAL SIGHTING DEVICE BY CORRELATING SKY POLARIZATION MEASUREMENT WITH A MODEL
1503

DETERMINE VECTOR FROM SIGHTING DEVICE TO TARGET BASED ON RANGE MEASUREMENT AND ORIENTATION
1504

OPTIONAL NEXT STEPS

DETERMINE GEOLOCATION OF VISUAL SIGHTING DEVICE WITH GNSS RECEIVER
1505

DETERMINE GEOLOCATION OF TARGET BY VECTOR ADDITION FROM GEOLOCATION OF VISUAL SIGHTING DEVICE
1506

FIG. 15A

```
┌─────────────────────────────────────────────────────────────────┐
│         SIGHT TO A FIRST TARGET USING THE VISUAL SIGHTING DEVICE │
│                              1511                                │
└─────────────────────────────────────────────────────────────────┘

┌─────────────────────────────────────────────────────────────────┐
│  ACQUIRE A RANGE MEASUREMENT TO TARGET AND A MOBILE SKY POLARIZATION │
│                          MEASUREMENT                             │
│                              1512                                │
└─────────────────────────────────────────────────────────────────┘

┌─────────────────────────────────────────────────────────────────┐
│  ACQUIRE A MEASUREMENT OF SKY POLARIZATION FROM REFERENCE DEVICE WITH │
│                   KNOWN ABSOLUTE ORIENTATION                     │
│                              1513                                │
└─────────────────────────────────────────────────────────────────┘

┌─────────────────────────────────────────────────────────────────┐
│   DETERMINE ABSOLUTE ORIENTATION OF VISUAL SIGHTING DEVICE BY    │
│ CORRELATING MEASUREMENTS FROM MOBILE AND REFERENCE DEVICES       │
│                              1514                                │
└─────────────────────────────────────────────────────────────────┘

┌─────────────────────────────────────────────────────────────────┐
│  DETERMINE VECTOR FROM SIGHTING DEVICE TO TARGET BASED ON RANGE  │
│                   MEASUREMENT AND ORIENTATION                    │
│                              1515                                │
└─────────────────────────────────────────────────────────────────┘

OPTIONAL NEXT STEPS

┌─────────────────────────────────────────────────────────────────┐
│   DETERMINE GEOLOCATION OF VISUAL SIGHTING DEVICE WITH GNSS RECEIVER │
│                              1516                                │
└─────────────────────────────────────────────────────────────────┘

┌─────────────────────────────────────────────────────────────────┐
│ DETERMINE GEOLOCATION OF TARGET BY VECTOR ADDITION FROM GEOLOCATION │
│                    OF VISUAL SIGHTING DEVICE                     │
│                              1517                                │
└─────────────────────────────────────────────────────────────────┘
```

FIG. 15B

```
ESTABLISH ABSOLUTE ORIENTATION OF VISUAL SIGHTING DEVICE BY SETTING
UP OVER KNOWN POINT, SIGHTING A KNOWN BACKSIGHT, AND MEASURING
REFERENCE SKY POLARIZATION
1521
```

```
SIGHT TO A FIRST TARGET USING THE VISUAL SIGHTING DEVICE
1522
```

```
ACQUIRE A RANGE MEASUREMENT TO TARGET AND A MOBILE SKY
POLARIZATION MEASUREMENT
1523
```

```
DETERMINE ABSOLUTE ORIENTATION TO TARGET BY CORRELATING
REFERENCE AND TARGET POLARIZATION MEASUREMENTS
1524
```

```
DETERMINE VECTOR FROM SIGHTING DEVICE TO TARGET BASED ON RANGE
MEASUREMENT AND ORIENTATION
1525
```

OPTIONAL NEXT STEPS

```
DETERMINE GEOLOCATION OF VISUAL SIGHTING DEVICE WITH GNSS RECEIVER
1526
```

```
DETERMINE GEOLOCATION OF TARGET BY VECTOR ADDITION FROM
GEOLOCATION OF VISUAL SIGHTING DEVICE
1527
```

FIG. 15C

MEASURING A FIRST REFERENCE SKY POLARIZATION DATA SET AT A FIRST TIME Ti USING A SKY POLARIZATION SENSOR DESPOSED ON A PLATFORM
2001

OBTAINING A SECOND SKY POLARIZATION DATA SET AT A SECOND TIME Tj FROM THE SKY POLARIZATION SENSOR
2002

DETERMINING A DIFFERENCE IN ORIENTATION BETWEEN THE FIRST REFERENCE SKY POLARIZATION DATA SET AND THE SECOND SKY POLARIZATION DATA SET USING AN ORIENTATION DETERMINING COMPONENT
2003

PROVIDING THE DIFFERENCE IN ORIENTATION AS AT LEAST ONE ORIENTATION PARAMETER FOR THE PLATFORM AT THE SECOND TIME Tj
2004

USING THE AT LEAST ONE ORIENTATION PARAMETER TO PROVIDE A DIRECTION RELATIVE TO A REFERENCE POINT ON THE PLATFORM
2005

FIG. 20

ORIENTING A VISUAL SIGHTING DEVICE AND A SKY POLARIZATION SENSOR TOWARD A TARGET WHEREIN THE VISUAL SIGHTING DEVICE COMPRISES A RANGE MEASUREMENT SYSTEM AND IS DISPOSED IN A KNOWN SPATIAL RELATIONSHIP WITH THE SKY POLARIZATION SENSOR
2101

GENERATING AN ESTIMATE OF THE ORIENTATION OF THE VISUAL SIGHTING DEVICE BASED ON SKY POLARIZATION WHILE A RANGE MEASUREMENT IS CAPTURED FROM THE VISUALSIGHTING DEVICE TO THE TO THE TARGET
2102

DETERMINING A FIRST LOCATION HAVING A KNOWN SPATIAL RELATIONSHIP TO THE VISUAL SIGHTING DEVICE
2103

ACQUIRING AN ORIENTATION OF THE VISUAL SIGHTING DEVICE AND A DISTANCE TO THE TARGET
2104

CALCULATING A LOCATION OF THE TARGET BASED ON THE FIRST LOCATION, THE DISTANCE TO THE TARGET, AND THE ORIENTATION OF THE VISUAL SIGHTING DEVICE
2105

FIG. 21

ACQUIRING A FIRST POSITION USING A TOTAL STATION COMPRISING A SKY POLARIZATION SENSOR HAVING A KNOWN SPATIAL RELATIONSHIP TO THE TOTAL STATION
2201

ACQUIRING A FIRST ORIENTATION OF THE TOTAL STATION BASED ON A SKY POLARIZATION DATA SET
2202

TRANSLATING THE SKY POLARIZATION DATA SET INTO ORIENTATION INFORMATION IN A COORDINATE SYSTEM AT THE TOTAL STATION
2203

USING A VISUAL SIGHTING DEVICE OF THE TOTAL STATION, COMPRISING AN INTERNAL DISTANCE MEASURING SYSTEM, TO CAPTURE A DISTANCE TO THE TARGET
2204

CALCULATING A LOCATION OF THE TARGET BASED ON THE FIRST POSITION, THE DISTANCE TO THE TARGET, AND THE ORIENTATION INFORMATION
2205

FIG. 22

USING A GLOBAL NAVIGATION SATELLITE SYSTEM (GNSS) RECEIVER OF A POSITION DETERMINING SYSTEM TO MEASURE A FIRST LOCATION
2301

USING A VISUAL SIGHTING DEVICE, FURTHER COMPRISING AN INTERNAL DESTANCE MEASURING SYSTEM, OF THE POSITION DETERMINING SYSTEM TO MEASURE A DISTANCE TO A TARGET
2302

USING A SKY POLARIZATION SENSOR OF THE POSITION DETERMINING SYSTEM TO MEASURE AN ORIENTATION OF THE VISUAL SIGHTING DEVICE
2303

CALCULATING A LOCATION OF THE TARGET BASED ON THE FIRST POSITION, THE DISTANCE TO THE TARGET, AND THE ORIENTATION OF THE VISUAL SIGHTING DEVICE
2304

FIG. 23

DETERMINING A FIRST LOCATION OF A VISUAL SIGHTING DEVICE AND A SKY POLARIZATION SENSING DEVICE HAVING A KNOWN SPATIAL RELATIONSHIP, FROM WHICH IS MEASURED A FIRST ESTIMATE OF ORIENTATION TO A TARGET BASED UPON SKY POLARIZATION
2401

DETERMINING A SECOND LOCATION FROM WHICH IS MEASURED A SECOND ESTIMATE OF ORIENTATION TO THE TARGET BASED UPON SKY POLARIZATION
2402

CALCULATING A POSITION OF THE TARGET BASED ON THE FIRST LOCATION, THE FIRST ESTIMATE OF ORIENTATION TO THE TARGET, THE SECOND LOCATION AND THE SECOND ESTIMATE OF ORIENTATION TO THE TARGET
2403

FIG. 24

ORIENTING A VISUAL SIGHTING DEVICE AND A SKY POLARIZATION SENSOR TOWARD A KNOWN LOCATION, THE VISUAL SIGHTING DEVICE COMPRISING A RANGE MEASUREMENT SYSTEM AND IS DISPOSED IN A KNOWN SPATIAL RELATIONSHIP WITH THE SKY POLARIZATION SENSOR
2510

GENERATING AN ESTIMATE OF THE ABSOLUTE ORIENTATION OF THE VISUAL SIGHTING DEVICE BASED ON SKY POLARIZATION WHILE DETERMINING A DISTANCE FROM THE VISUAL SIGHTING DEVICE TO THE KNOWN LOCATION
2520

ACCESSING A SET OF COORDINATES OF THE KNOWN LOCATION
2530

DETERMINING A SECOND SPATIAL RELATIONSHIP BETWEEN THE VISUAL SIGHTING DEVICE AND THE TARGET WHEN THE RANGE MEASUREMENT IS CAPTURED
2540

CALCULATING A LOCATION OF THE TARGET BASED ON THE SET OF COORDINATES, THE DISTANCE TO THE KNOWN LOCATION, THE KNOWN SPATIAL RELATIONSHIP, THE SECOND KNOWN RELATIONSHIP, AND THE ABSOLUTE ORIENTATION OF THE VISUAL SIGHTING DEVICE
2550

FIG. 25

USE OF A SKY POLARIZATION SENSOR FOR ABSOLUTE ORIENTATION DETERMINATION IN POSITION DETERMINING SYSTEMS

RELATED APPLICATIONS

This application claims priority to U.S. Provisional Application Ser. No. 61/674,563, entitled "USE OF A SKY POLARIZATION SENSOR FOR ABSOLUTE ORIENTATION DETERMINATION IN POSITION DETERMINING SYSTEMS," with filing date Jul. 23, 2012, by Peter Glenn France, assigned to the assignee of the present application, and hereby incorporated by reference in its entirety.

BACKGROUND

Position determination is required for the execution of a variety of activities. Some survey and mapping activities include determining the position of objects in the world, either near the position determination device or some distance away. Other activities include navigation or stakeout, where the coordinates of a destination is known, and the operator is guided to that destination by iteratively determining the position of a device and comparing that position with the destination coordinate. The position determination process in optical surveying typically starts from a known location, called a Point of Beginning (POB). The POB may have 2 or 3 coordinates (e.g., X, Y, and Z coordinates), in a specified coordinate system. Such a coordinate system may be a local one, where the location of a given starting point is given in "northing and easting" and height relative to a predetermined datum, or in latitude, longitude and height, or altitude. A typical optical survey system is set up and leveled directly over the POB, and the vertical distance between the POB and the instrument is measured, often with a tape measure. The system uses a visual sighting instrument in the form of a telescope with a built-in electronic distance measurement system to sight to a target located away from the POB. The telescope is coupled to a set of angle measurement devices that give elevation angle (also known as pitch) and a horizontal angle. The raw horizontal angle is relative, not absolute. To convert these relative horizontal angles into absolute azimuths (that is, with respect to true north), the first operation is to measure the horizontal angle in a known direction. This is usually accomplished by sighting to another known reference point, known as the backsight. These measurements are made on a tripod platform which enables the survey instrument to be manually leveled so that the vertical axis of rotation for horizontal angle determination is aligned with the local gravity vector. Leveling also ensures that the elevation angle is absolute (i.e., with respect to local gravity). Alignment of a local vertical axis on the measurement device with the gravity vector has been the standard way to create a reference plane from which azimuth and elevation angles can be measured. After measuring the angles and distance to a target, well-known geometric calculations determine the location of the first target relative to the POB. The survey process may continue by moving the survey instrument to directly over the first target location, repeating the leveling process for the tripod mounting system, and continuing to sight to the next target, again obtaining a range distance and angles to the new target.

The underlying assumption in the above data collection process is that the local vertical axis is well-behaved and well known, and serves as the common orientation reference by establishing a locally horizontal plane and vertical axis to which all range and horizontal angle measurements are referenced. The process always requires a re-leveling step for the survey instrument at each new target location, and the vertical distance between the new POB and the instrument is re-measured. There is quite an art to setting the instrument up so that it is both level and vertically above the POB. This setup procedure is time-consuming, and is a source of error if not accomplished accurately.

It should be noted that handheld laser rangefinders commonly measure absolute orientation and elevation angle, without leveling and backsighting. However this is achieved through electronic tilt sensors and magnetometers, which deliver only low accuracy measurements of roughly one degree, and so are not suitable for high accuracy positioning applications.

Total stations for surveying and construction measure relative angles to an accuracy between 0.5 and 10 arc-seconds; additional errors can be introduced by mis-leveling and imprecise target sighting as described above.

The introduction of Global Positioning System (GPS) and Global Navigation Satellite Systems (GNSS) receivers significantly reduced the need for optical surveying, as a 3D position can be determined from a single measurement of the GNSS receiver at a desired target location. But when high accuracy positioning is desired, as in most survey applications, the GNSS antenna still needs to be precisely positioned over the desired spot on the ground, or over some other physical target. Since GNSS operational practice dictates keeping the antenna at a known distance vertically above a ground target, often on a pole or rod about 2 meters in length, a different kind of leveling activity must be performed as well. Again, leveling a pole requires a bubble-level indicator as in the case of a survey tripod, and takes some time to bring the pole into a vertical alignment with sufficient accuracy to meet survey requirements. Further, there are many circumstances where the GNSS receiver cannot be located exactly at or over the target point.

GNSS receivers often do not give high accuracy positions in environments where the satellites are not clearly in view, such as near buildings or trees. In such cases an optical instrument such as a total station can be used. Alternatively a GNSS receiver can be combined with a total station, where the GNSS position is used to avoid the need to find an existing local POB. However the operator of a combined GNSS total station still needs to level it and take a backsight reading.

BRIEF DESCRIPTION OF THE DRAWINGS

FIGS. 3D and 3E are simplified diagrams showing a survey instrument in a spherical coordinate frame in accordance with one or more embodiments.

FIG. 14 is a flow chart demonstrating a process for obtaining an incremental update to orientation based on sky polarization data in accordance with an embodiment.

FIG. 15A is a flow chart for determining a location with a visual sighting device, using a sky polarization measurement and a model in accordance with an embodiment.

FIG. 15B is a flow chart for determining a location with a visual sighting device, using a sky polarization measurement and a model in accordance with an embodiment.

FIG. 15C is a flow chart for determining a location with a visual sighting device, using a sky polarization measurement and a model in accordance with an embodiment.

FIG. 20 is a flowchart of a method for determining absolute orientation of a platform in accordance with an embodiment.

FIG. 21 is a flowchart of a method for obtaining position data for a target in accordance with an embodiment.

FIG. 22 is a flowchart of a method for obtaining position data for a target with a position determining component in accordance with an embodiment.

FIG. 23 is a flowchart of a method for obtaining position data for a target with a position determining component in accordance with an embodiment.

FIG. 24 is a flowchart of a method for obtaining position data for a target in accordance with an embodiment.

FIG. 25 is a flowchart of a method for determining the position of a target location in accordance with various embodiments.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

NOTATION AND NOMENCLATURE

Unless specifically stated otherwise as apparent from the following discussions, it is appreciated that throughout the present Description of Embodiments, discussions utilizing terms such as "measuring," "obtaining," "determining," "providing," "using," "calculating," "accessing," "adding," "orienting," "establishing," "translating," "receiving," "correlating," "converting," "adding," "storing," "transmitting," "sending," "processing," "acquiring," "capturing," "generating," "comparing" or the like, often (but not always) refer to the actions and processes of a computer system or similar electronic computing device. The electronic computing device manipulates and transforms data represented as physical (electronic) quantities within the electronic computing device's processors, registers, and/or memories into other data similarly represented as physical quantities within the electronic computing device's memories, registers and/or other such information storage, processing, transmission, or/or display components of the electronic computing device or other electronic computing device(s).

Figure 1A:
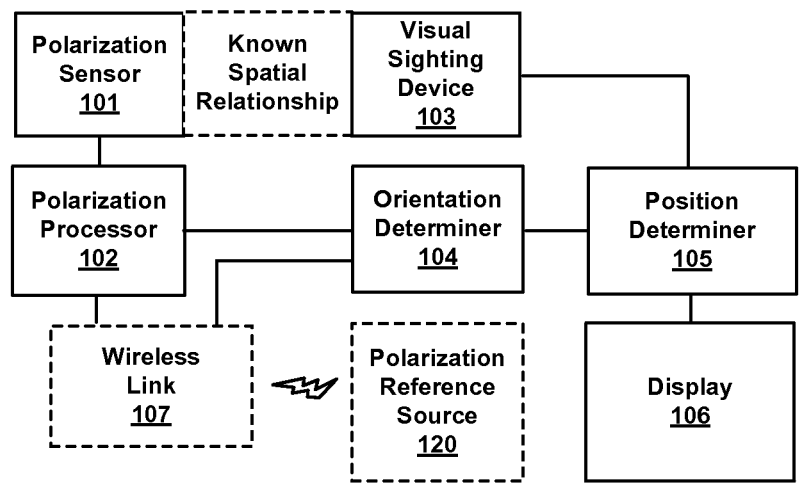
FIG. 1A is a block diagram of an example device utilizing a sky polarization sensor for absolute orientation determination in accordance with one embodiment.

FIG. 1A is a block diagram of an example device 100 utilizing a sky polarization sensor for absolute orientation determination in accordance with one embodiment. In FIG. 1A, device 100 comprises a polarization sensor 101 which is coupled with an orientation determiner 104. Polarization sensor 101 has a known spatial relationship with a visual sighting device 103. In other words, the physical disposition of polarization sensor 101 with respect to visual sighting device 103 is known and recorded. It is noted that the spatial relationship between polarization sensor 101 and other components of device 100 (e.g., to an antenna phase center of a GNSS receiver 111 of FIG. 2A, or to a tip of a pole such as 110 of FIG. 1C) can also be known and recorded. In accordance with various embodiments, the known spatial relationship between polarization sensor 101 and visual sighting device 103 can be expressed as a set of local X, Y, Z coordinates, a vector, a measure of the relationship of the sighting axis of polarization sensor 101 to the sighting axis of visual sighting device 103, or another measurement of the spatial relationship of these devices. In FIG. 1A, visual sighting device 103 is further coupled with a position determiner 105, which is in turn coupled with a display 106. Position determiner 105 is further coupled with an orientation determiner 104, which is also coupled with polarization processor 102 and a wireless link 107. Wireless link 107 is configured to wirelessly communicate with a polarization reference source 120.

As will be discussed in greater detail below, in one or more embodiments, polarization sensor 101 comprises an image capture device which is configured to capture polarization data. The image capture device may comprise a photographic camera, equipped with appropriate polarization filters, which enable the image capture element, typically a Charge Coupled Device (CCD), or a Complimentary Metal-oxide Semiconductor (CMOS) detector, to capture images of the filtered light. In one or more embodiments, polarization sensor 101 also comprises algorithms that take those images as input and calculate intensity or degree of polarization, degree of polarization, and/or other values. Linear polarization is of primary interest in one or more embodiments. Polarization data may be captured even if there are clouds aloft, although clouds do modify the polarization pattern. An example polarization detector is further described with reference to FIG. 10 and the accompanying discussion.

In another embodiment, the polarization sensor 101 comprises a photo diode sensor with polarization filters. The system described in a reference by Lambrinos (2000) uses three pairs of photo-diodes. Each pair has their polarization filters at right angles to its mate. The pairs are arranged at 0, 60, and 120 degrees relative to each other. The photo-diodes all view the same portion of the sky, with a field of view of about 60 degrees. This method is able to calculate orientation by using the fact that the sky polarization pattern has symmetry about the solar meridian.

As an example, polarization sensor 101 is configured to capture data indicating the polarization of the sky at the location where device 100 is located. It is noted that embodiments are not limited to still images alone and polarization sensor 101 can comprise a motion picture cameras in at least one embodiment. In various embodiments, visual sighting device 103 comprises a telescopic sighting device with or without a lens, binoculars, a camera with an electronic visual display system, or the like configured to permit users to view a real-time representation of their surroundings. In other embodiments, visual sighting device 103 comprises a robotic target tracker configured to track a target such that as the target moves, the visual sighting device 103 can continually measure the distance and orientation to the target. In some embodiments, the robotic tracker comprise servo motors rotating visual sighting device 103, guided by an optical target identification and tracking system that recognizes the location and movement of an optical target such as a prism. Orientation determiner 104 is configured to analyze the sky polarization data received from polarization sensor 101. Orientation determiner 104 is configured to determine the orientation of device 100, or a component thereof, in three axes (e.g., a relative orientation and/or an absolute orientation of visual sighting device 103). Components and operation of orientation determiner 104 is discussed in greater detail below with reference to FIGS. 11A, 11B, and 11C. Position determiner 105 is configured to receive the orientation information from orientation determiner 104 and from visual sighting device 103 and provide output to, for example, display 106 indicating the position of a point of interest. It is noted that this information can also be stored in a data storage unit of device 100 or at a location apart from device 100.

In accordance with various embodiments, wireless link 107 may operate on any suitable wireless communication protocol including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard.

In accordance with one or more embodiments, polarization reference source 120 comprises a source of polarization data which is at a located apart from device 100. In one or more embodiments, polarization reference source 120 is configured to utilize measurements of sky polarization data at its location along with data indicating the absolute orientation of polarization reference source 120. In at least one embodiment, polarization reference source 120 provides this information to device 100 which facilitates determining the absolute orientation of visual sighting device 103. In an embodiment, the orientation of polarization sensor 101 is determined by performing coordinate axes rotations to bring the pattern of the polarization sensor 101 into congruence with the pattern from the polarization reference source. When the polarization reference source 120 is aligned with the celestial zenith, and its True North heading reference point is aligned with True North, then the rotation angles determined when congruence is obtained will become the orientation angles for the polarization sensor 101. Alternatively, in an embodiment, the vertical zenith alignment of the reference source 120 may be aligned with any other desired reference system, such as a local gravity vector. It is noted that time at which the polarization data is captured, both at device 100 and at polarization reference source 120, is factored into the information which is sent to device 100. In another embodiment, polarization reference source 120 is configured to utilize a model of an expected polarization pattern based upon the time of day and the location at which device 100 is located and to send this data to device 100 to facilitate determining the absolute orientation of visual sighting device 103. Alternatively, this model of the expected polarization pattern based upon the time of day and the location at which device 100 may be derived by device 100 itself. In another embodiment, device 100 is configured to send data (e.g., raw sky polarization data, or processed sky polarization data) to polarization reference source 120 which will then determine the absolute orientation of visual sighting device 103 using either the model of the expected polarization pattern, or the sky polarization data captured at polarization reference source 120. The absolute orientation of visual sighting device 103 can then be stored (e.g., at polarization reference source 120), or sent back to device 100. In various embodiments, polarization reference source 120 may be placed at a fixed location, or may be a mobile device which for which the absolute orientation is determined as a set procedure. It is noted that there is no necessity to determine the absolute orientation of visual sighting device 103 at the time data is captured. Instead, the sky polarization data captured by polarization sensor 101 can be stored and processed at a later time.

In an embodiment, position determination of an object remote from device 100 can be obtained with the system shown in FIG. 1A by the method of acquiring two horizontal angles relative to a reference direction from two observation points, and knowing the distance between the two observation points, by the method of Law of Sines, as is explained in greater detail in the discussion associated with FIG. 18 below.

Figure 1B:
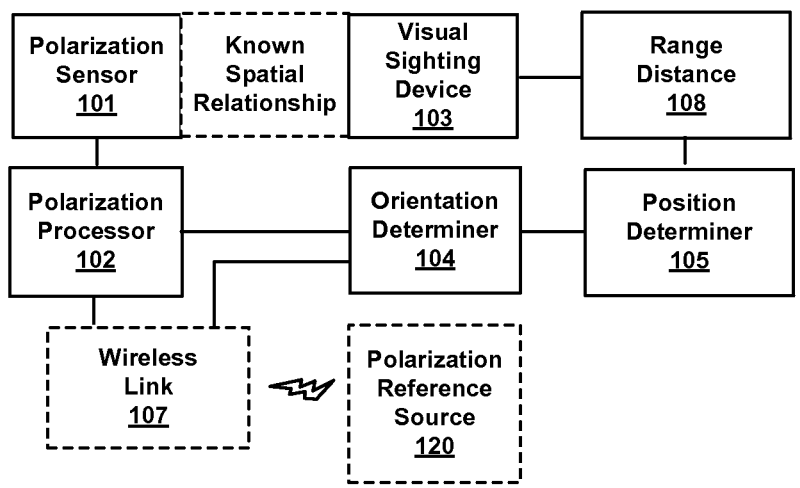
FIG. 1B is a block diagram of an example device utilizing a sky polarization sensor for absolute orientation determination in accordance with one embodiment.

FIG. 1B is a block diagram of an example device 100 utilizing a sky polarization sensor for absolute orientation determination in accordance with one embodiment. For the sake of brevity, components of device 100 described above with reference to FIG. 1A will not be described again in the discussion of FIG. 1B. In the example of FIG. 1B, device 100 further comprises a range distance component 108 configured to determine the range from device 100 to another location. In accordance with various embodiments, range distance component 108 may use light or radio waves to determine the distance from a target to device 100. In one embodiment, range distance component 108 comprises a laser range finder. It is noted that in the embodiment of FIG. 1B, display 106 is not utilized. Laser range finders are also referred to as Electronic Distance Measurement (EDM) devices.

Figure 1C:
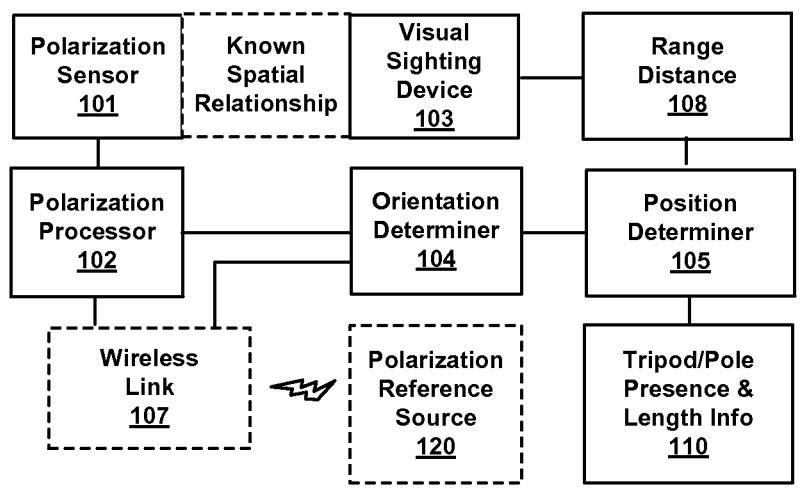
FIG. 1C is a block diagram of an example device utilizing a sky polarization sensor for absolute orientation determination in accordance with one embodiment.

FIG. 1C is a block diagram of an example device 100 utilizing a sky polarization sensor for absolute orientation determination in accordance with one embodiment. For the sake of brevity, components of device 100 described above with reference to FIGS. 1A and 1B will not be described again in the discussion of FIG. 1C. In the example of FIG. 1C, device 100 further comprises a pole 110 upon which other components of device 100 are disposed. In accordance with various embodiments, device 100 comprises a total station theodolite, or other surveying instrument and pole 110 may be replaced with a tripod or other support device. However, it is noted that various embodiments are not limited to surveying devices alone, or to devices mounted upon a fixture such as a pole, tripod, or fixed structure. In accordance with various embodiments, information regarding the distance various components of device 100 are above the ground when device 100 is placed at a location. For example, if device 100 comprises a pole mounted surveying system, this information comprises the height of various components of device 100 (e.g., polarization sensor 101 and visual sighting device 103 of FIGS. 1A-1C, and GNSS receiver 111 of FIGS. 2A-2B) from the tip of pole 100. This also provides the distance of these components above the ground when device 100 is in place. It is noted that this information can change based upon the orientation of device 100. For example, if device 100 is tilted when a measurement is taken this information can be modified to reflect the orientation of device 100.

Figure 2A:
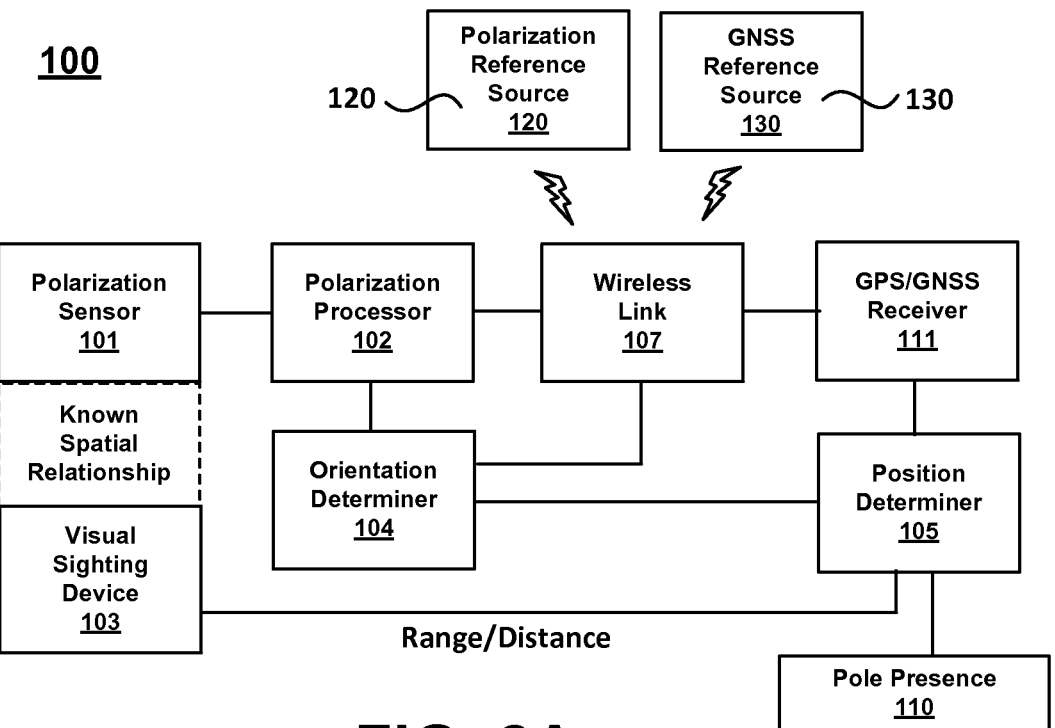
FIG. 2A is a block diagram of an example survey device in accordance with one embodiment.

FIG. 2A an example device 100 utilizing a sky polarization sensor for absolute orientation determination in accordance with one embodiment. For the sake of brevity, components of device 100 described above with reference to FIGS. 1A, 1B, and 1C will not be described again in the discussion of FIG. 2A. In FIG. 2A device 100 further comprises a Global Positioning System/Global Navigation Satellite System (GPS/GNSS) receiver associated with polarization sensor 101, visual sighting device 103, and orientation determiner 104. The assembly of components shown in FIG. 2A may be mounted on a pole (e.g., pole 110) for ease of transport and for locating the known starting point over some particular spot on the ground, via the pole bottom point. Knowledge of the length of pole 110 may be detected automatically, or by manual input to position determiner 105. GNSS reference source 130 comprises a reference station for providing real-time data which is used to improve the precision in determining the location of a remotely located GNSS receiver. There are a variety of types of GNSS reference sources 130 which can be used in various embodiments such as, but not limited to, Differential GPS (DGPS) reference stations and Real-time Kinematic (RTK) GNSS reference stations. In at least one embodiment, device 100 is configured to operate in a networked RTK environment in which atmospheric and ephemeris errors affecting signals within a network coverage area are collected by a plurality of reference stations. Using this information, the atmospheric and ephemeris errors across an entire region can be extrapolated which can be used to correct pseudorange errors at remotely located GNSS receivers such as device 100.

Figure 2B:
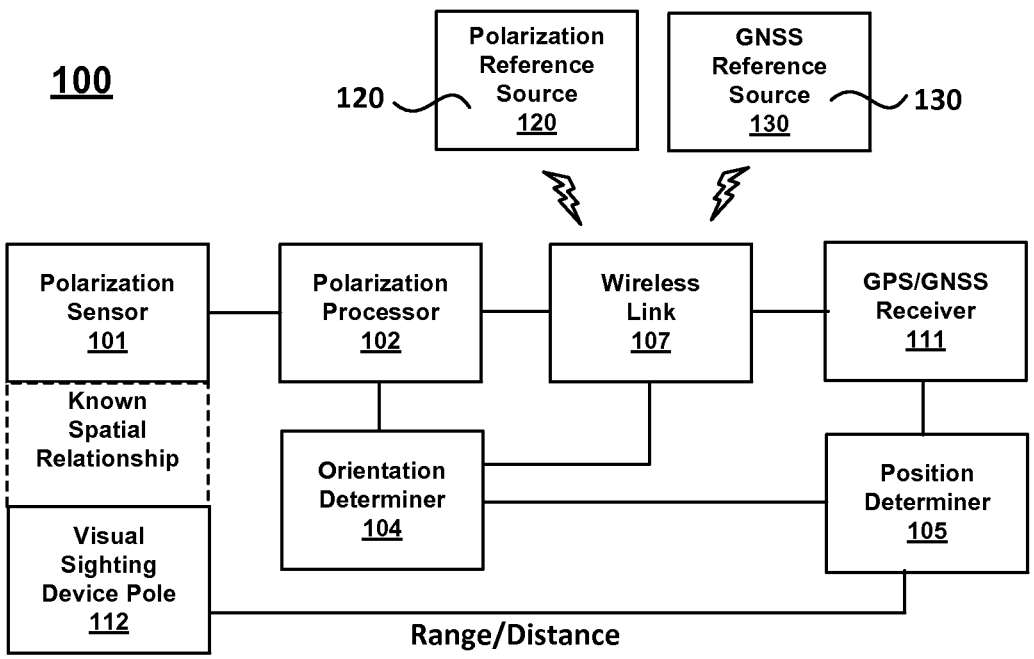
FIG. 2B is a block diagram of an example survey device in accordance with one embodiment.

FIG. 2B an example device 100 utilizing a sky polarization sensor for absolute orientation determination in accordance with one embodiment. For the sake of brevity, components of device 100 described above with reference to FIGS. 1A, 1B, 1C, and 2A will not be described again in the discussion of FIG. 2B. In FIG. 2B, visual sighting device pole 112 acts as the visual sighting device and provides the distance to the point on the ground where its bottom is located. In this case the range distance is the length of the pole to a coordination point on the platform, often the location of the GNSS antenna phase center, or some other reference point.

Figure 3A:
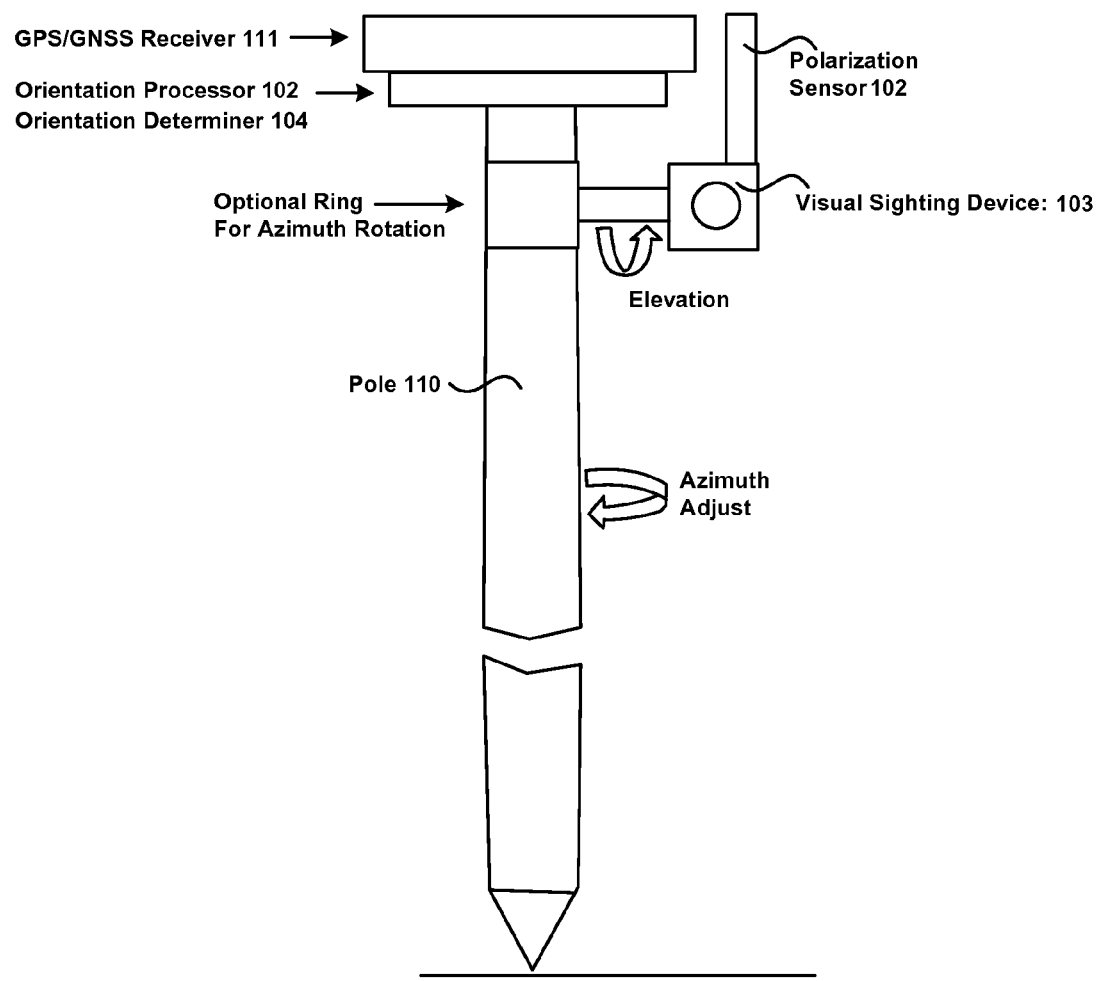
FIG. 3A, is a diagram of an example survey device in accordance with one embodiment.
Figure 3B:
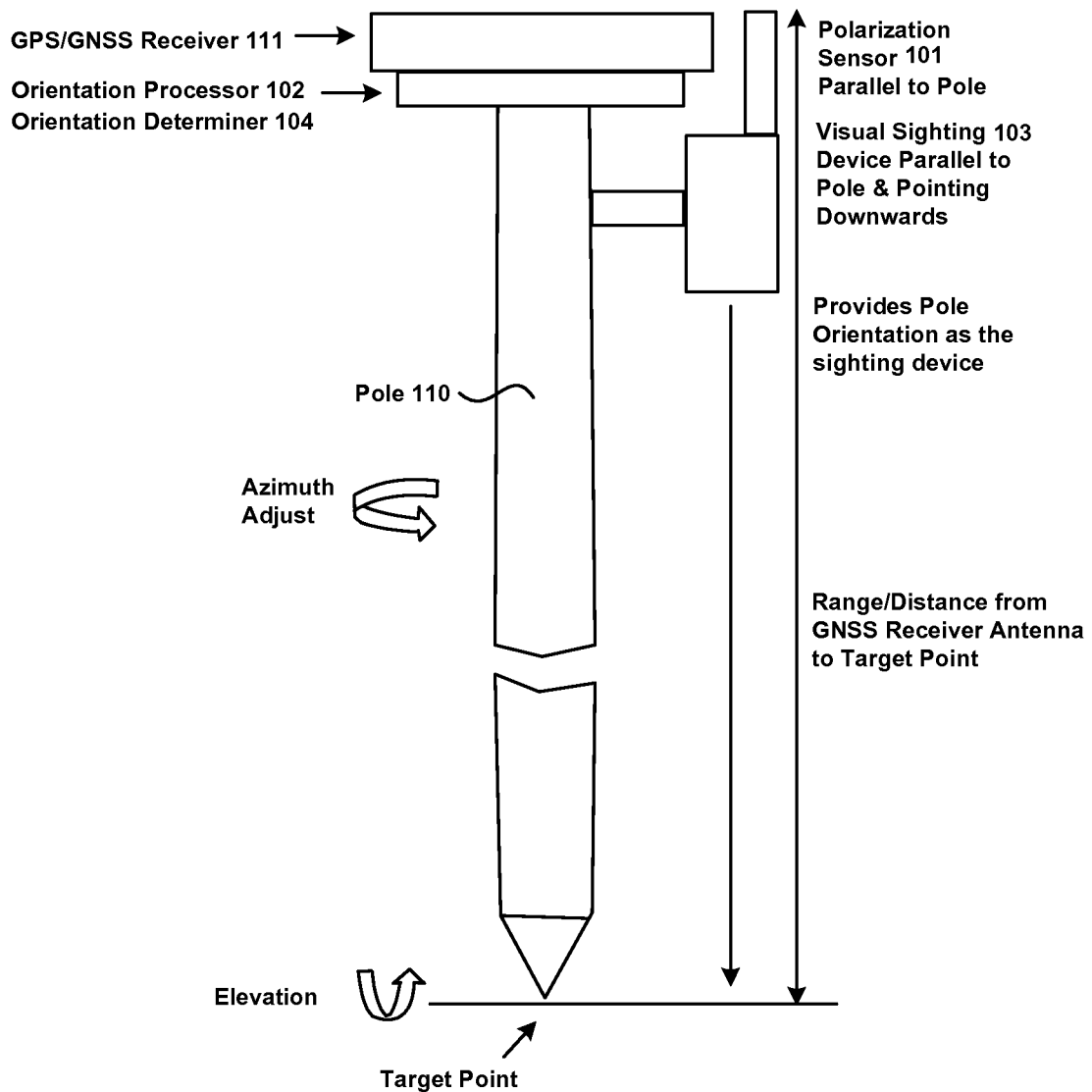
FIG. 3B is a block diagram of an example survey device in accordance with one embodiment.
Figure 3C:
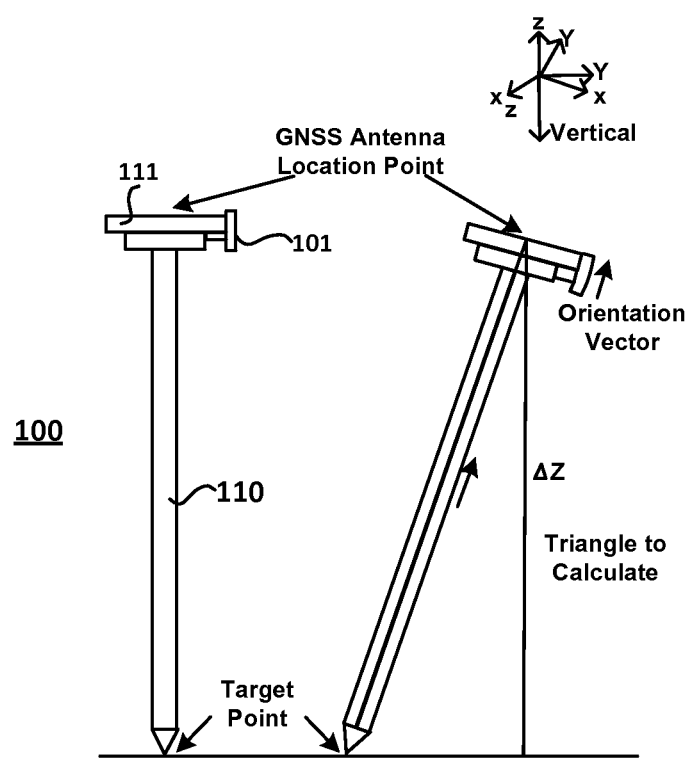
FIG. 3C is a simplified diagram showing an X', Y' and Z' camera reference frame tilting with a survey instrument which an X, Y, Z real-world coordinate frame remains aligned with a local gravity vector.
Figure 3F:
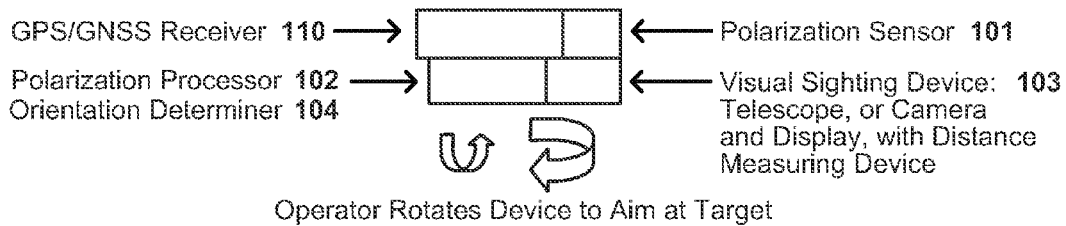
FIG. 3F is a block diagram of an example device utilizing a sky polarization sensor for absolute orientation determination in accordance with one embodiment.

FIGS. 3A, 3B, and 3F are diagrams of devices utilizing a sky polarization sensor for absolute orientation determination in accordance with various embodiments. FIG. 3F shows an assembly of a GNSS receiver, a wireless receiver, the polarization processor and orientation determiner, the polarization sensor, and a visual sighting device, on a common platform. Such a platform can be handheld. For the sake of brevity, components of device 100 described above with reference to FIGS. 1A, 1B, 1C, 2A, and 2B will not be described again in the discussion of FIGS. 3A, 3B, and 3F.

FIG. 3A shows a physical configuration of an example device 100 utilizing a sky polarization sensor for absolute orientation determination in accordance with one embodiment. In FIG. 3A, polarization sensor 101 is coupled with visual sighting device 103 and mounted on the pole 110 which supports a GPS/GNSS rover receiver 111, normally for ease of transport in the field and for locating the bottom tip of the pole over a desired target point on the ground, either as a reference point or a point to be measured. In at least one embodiment, visual sighting device 103 is fixed to the pole 110 and therefore moves only when the pole 110 is moved. Alternatively, visual sighting device 103 may be mounted via a rotatable ring at the point shown on the pole and is moveable in elevation and could be in azimuth as well.

In FIG. 3B, visual sighting device 103 is shown aiming downward towards the ground, with its visual axis parallel to the axis of pole 110. Alternatively, the sight axis of visual sighting device 103 does not need to be parallel to pole 110, as long as there is a known spatial relationship between visual sighting device 103 and polarization sensor 101. In this mode, visual sighting device 103 and pole 110 are able to measure the same distance to the ground from the mounting point on pole 110. Thus, pole 110 itself can act as a special case equivalent and substitute for visual sighting device 103 as is shown in FIG. 2B. All that is required is for the polarization sensor to be mounted parallel to the pole axis, as shown in FIG. 3C. The operator aims by placing the pole tip on the target. The range from visual sighting device 103, and the GNSS antenna of GPS/GNSS receiver 111, to the target is simply the length of the pole 110.

FIG. 3F is a block diagram of an example device 100 utilizing a sky polarization sensor for absolute orientation determination in accordance with one embodiment. FIG. 3F shows device 100 configured as a handheld device without a pole 110. In the embodiment of FIG. 3F, device 100 may be, for example, a cellular telephone, camera, binoculars, telescope, handheld data collector, video camera, or the like in which the operator manually rotates and elevates device 100 to aim visual sighting device 103 at a target.

Figure 3G:
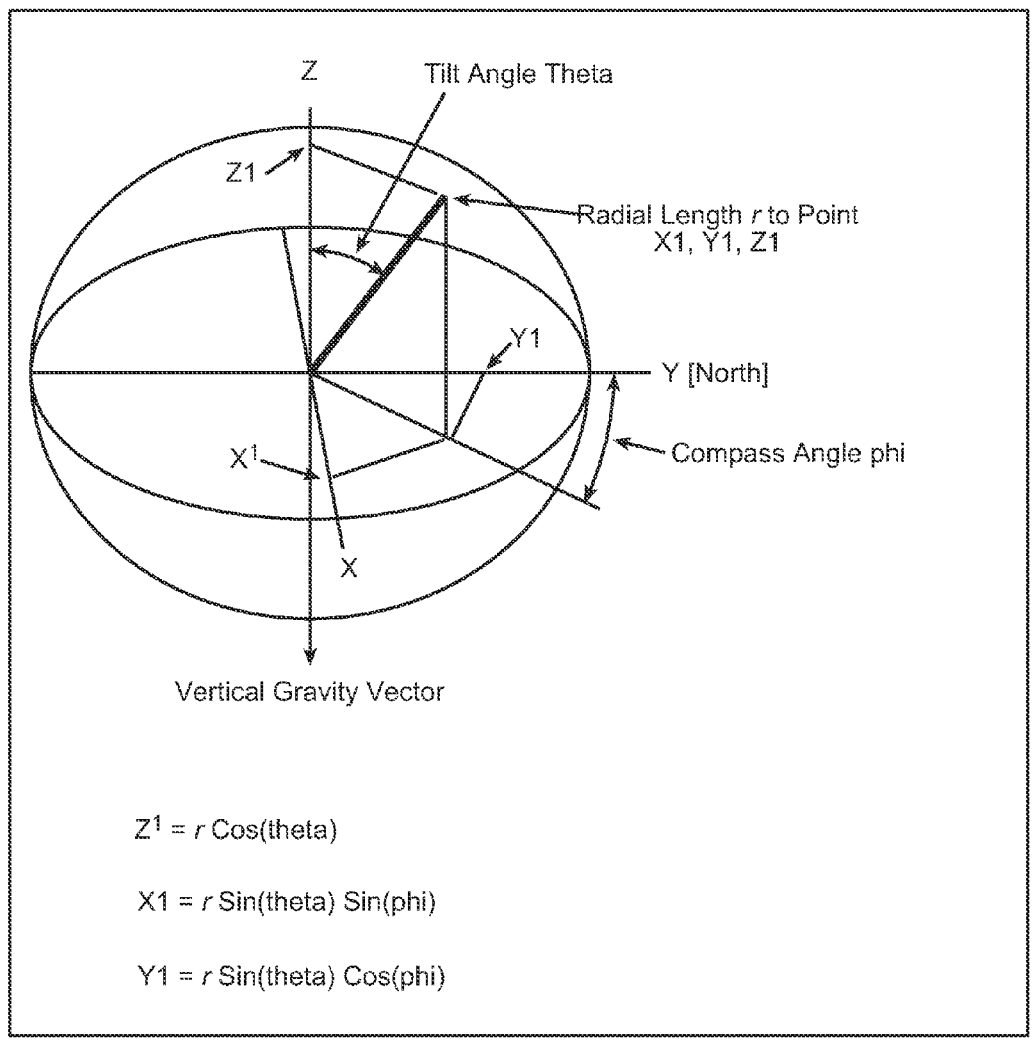
FIG. 3G is a simplified diagram of a spherical coordinate frame overlaid with a conventional Cartesian coordinate frame.

FIGS. 3D and 3E shows how spherical coordinates are employed to determine various orientation data and pole bottom position data from measurements of sky polarization and physical location information from a GNSS receiver in accordance with at least one embodiment. Some software applications typically output pose data in a CAHV format (a convention commonly used in machine vision), whereas the reference, or coordinate, frame of interest for survey applications is spherical. Spherical coordinates provide tilt angle (generally referred to as theta) relative to a vertical axis such as a gravitational vector and tilt direction (generally referred to as phi) relative to some reference such as true or magnetic north. The tilt angle and tilt direction determine a vector r emanating from a zero reference point and extending to an imaginary point on a sphere. This is shown in FIG. 3G, where a spherical coordinate frame is overlaid with a conventional Cartesian coordinate frame for reference. One or more coordinate transformations using known techniques may be used to transform the data from the CAHV format to spherical coordinates.

In the CAHV format, C provides a distance from a feature in a field of view to a perspective center (or entrance pupil) of an imaging device such as visual sighting device 103. The perspective center is generally on an axis passing through a lens of visual sighting device 103.

A coordinate transform may be used to convert the data from the CAHV format to an intermediate X', Y', and Z' camera reference frame. In this intermediate reference frame, X' and Y' lie along an image plane that may be near a rear of visual sighting device 103, and Z' extends outward along a lens axis.

In various embodiments, a second coordinate transform can be performed to convert the relative orientation of a component of device 100 (e.g., polarization sensor 101 or visual sighting device 103) to a real-world (e.g., GPS/GNSS) coordinate frame. In the real-world coordinate frame, the Z axis extends in a vertical direction parallel to a gravity vector, and the X and Y axes extend along a horizontal plane. This is shown in FIG. 3D, where the image plane of visual sighting device 103 tilts as device 100 is tilted from a level position to the un-level position. The real-world coordinate frame of visual sighting device 103 does not tilt with device 100. This is also shown in the vector diagram of FIG. 3C where the X, Y, and Z axes of the real-world coordinate frame remain aligned with a local gravity vector as the X', Y', and Z' axes of visual sighting device 103 tilt around the Z' axis.

The data may be converted from the real-world coordinate frame to spherical coordinates using known conversions. The vector r may be determined using the equation:

$$R = (X^2 + Y^2 + Z^2)^{1/2} \quad \text{Equation (1)}$$

As shown in FIGS. 3D and 3E, the vector r can represent a distance from an antenna phase center of GNSS receiver 111 to a point of interest located at real-world coordinates ($X_1$, $Y_1$, and $Z_1$). In one or more embodiments where device 100 includes pole 110, this is the distance from the antenna phase center of GNSS receiver 111 to a tip of pole 110 (e.g., typically 2 meters). FIG. 3D is a perspective view showing a device 100 having a tilt angle (theta) from a vertical axis Z in a north-westerly tilt direction (phi). The tilt direction (phi) is more easily seen in the top down view shown in FIG. 3E (looking down along the Z axis).

Using real-world coordinates X, Y, Z, the tilt angle and tilt direction of device 100 can be determined using the equations:

$$\text{Tilt Angle (theta)} = \arccos(Z/r) \quad \text{Equation (2)}$$

$$\text{Tilt Direction (phi)} = \arctan(Y/X) \quad \text{Equation (3)}$$

In one or more embodiments, a location of a point of interest can be determined using a location of a survey device and a tilt angle and tilt direction of the survey device. For example, referring to FIG. 3A, device 100 comprises GNSS receiver 111. A distance along a vertical axis from an antenna phase center of GNSS receiver 111 to a point of interest is known when a survey device is leveled. Using an un-leveled survey device, as shown in FIG. 3D, introduces a height offset and a ground offset. A vertical height of the antenna phase center above the ground is unknown because of the height offset and a horizontal distance from the antenna phase center to the point of interest is unknown because of the ground offset. The ground offset may include X axis and Y axis components in a real-world coordinate system.

The following equations can be used to determine the X and Y components of the ground offset and the Z component of offset error in at least one embodiment:

$$X1 = r \cdot \cos(\text{theta}) \quad \text{Equation (4)}$$

$$Y1 = r \cdot \sin(\text{theta}) \quad \text{Equation (5)}$$

$$Z1 = r \cdot \sin(\text{theta}) \cdot \cos(\text{phi}) \quad \text{Equation (6)}$$

Where r is the distance from the antenna phase center of GNSS receiver 111 to a tip of pole 110 of device 100.

Figure 4A:
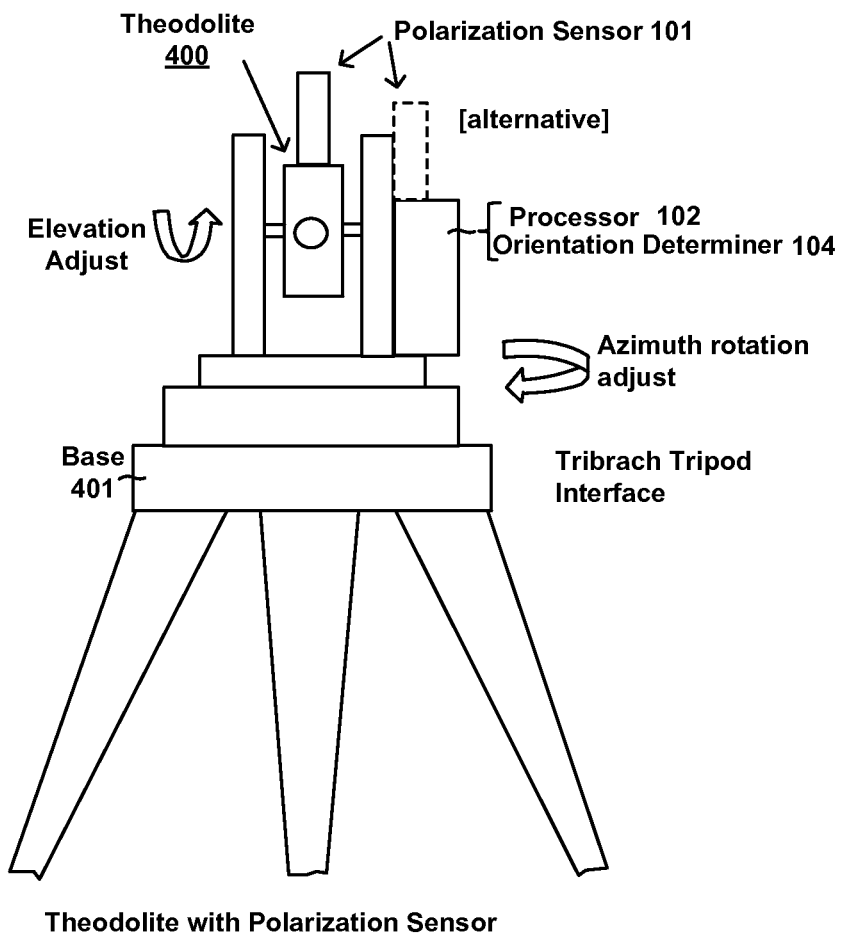
FIG. 4A shows an example device utilizing a sky polarization sensor for absolute orientation determination in accordance with one embodiment.

FIG. 4A shows a device utilizing a sky polarization sensor for absolute orientation determination in accordance with various embodiments. In the embodiment shown in FIG. 4A, a device 100 comprises polarization sensor 101 and visual sighting device 103. In the embodiment of FIG. 4A, visual sighting device 103 is a theodolite, which is a telescope without the usual angle readout equipment, since orientation determined from the polarization 101 sensor mounted on it. Device 100 further comprises polarization processor 102, and orientation determiner 104 which are mounted on a base 401. In the embodiment shown in FIG. 4A, base 401 further comprises a Tribrach tripod interface.

Figure 4B:
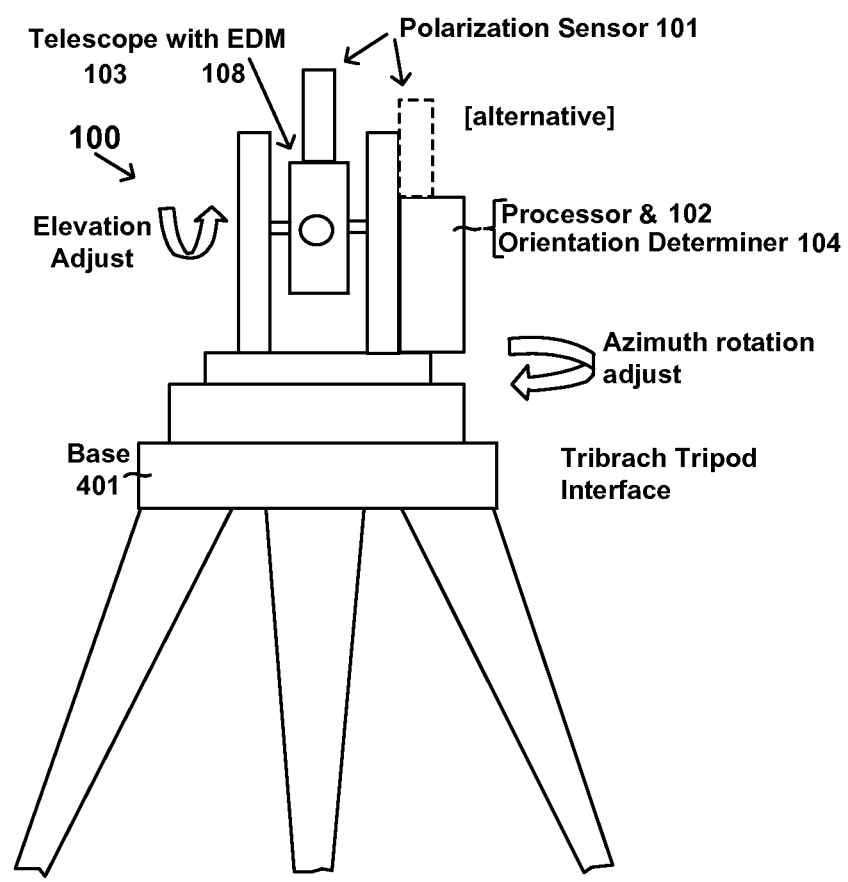
FIG. 4B shows an example device utilizing a sky polarization sensor for absolute orientation determination in accordance with one embodiment.

FIG. 4B shows a device utilizing a sky polarization sensor for absolute orientation determination in accordance with various embodiments. The embodiment of FIG. 4B, device 100 comprises an optical total station which has a telescope with a built-in electronic distance measuring system (EDM) (e.g., visual sighting device 103 and range distance component 108 respectively of FIG. 1B) and is rotatable in the elevation and azimuth axes relative to base 401. Using sky polarization sensor 101 and orientation determiner 104, the angle readouts normally associated with a total station are no longer needed. There are two alternatives for the mounting of the sky polarization sensor, as shown in FIGS. 4A and 4B. First, it can be attached directly to the visual sighting device, so it directly measures the orientation when sighting the target; therefore no traditional angle sensors are required. However extreme elevation angles may not be measurable because the sky view of the polarization sensor may be too restricted, in which case angle readouts are necessary. Secondly, the polarization sensor 101 can be mounted on the main body of device 100 so that it is perpendicular to the azimuth rotation base, as shown in the dotted line version. This configuration requires a traditional vertical angle sensor, as the sighting device can be rotated in the vertical axis, which permits nearly full hemispherical pointing angles to be measured. Both configurations may include a traditional horizontal angle sensor, although this is unnecessary because the sky polarization device fulfills the same purpose.

In the embodiments of FIGS. 4A and 4B, the use of sky polarization could be used in two ways, with significant impact on workflow and system requirements. First, sky polarization could be used simply to provide relative orientation, in which case traditional backsighting is required to establish absolute orientation. Secondly, methods providing absolute orientation from sky polarization could be used. In this case, backsighting is not required, providing a major improvement in workflow.

It should be noted that leveling is typically not required in the embodiment of FIGS. 4A and 4B, providing another important workflow improvement. The primary function of the tripod is to provide a stable platform, allowing the operator to easily sight small targets at long distances. The tripod also holds the components of device 100 steadily in a known spatial relationship to the POB. The easiest method is to set up the instrument so that the POB is along the upright axis of the instrument, by looking through the optical plummet. The distance from the instrument to the POB is measured as usual with a tape measure. This configuration relies on the polarization sensor measuring the off-vertical tilt of the instrument, so the second alternative for mounting the polarization sensor (e.g., on the main body of device 100). If the first alternative mounting is used (e.g., directly attached to visual sighting device 103) then a vertical angle sensor (not shown) may be used to measure the tilt of device 100. Another setup method is to follow convention, and set up the instrument vertically over the POB. This can be established with a plumb bob on a string. The vertical distance can be measured as usual, with a tape measure. But note that unlike traditional instruments, there is no need to level the instrument. This is because the three axes of every orientation measurement are always referenced to the sky and so are already in terms of true north and gravity. By contrast, a traditional optical instrument measures on an axis aligned to the base of the instrument, so it must be exactly level to align with gravity.

Figure 5A:
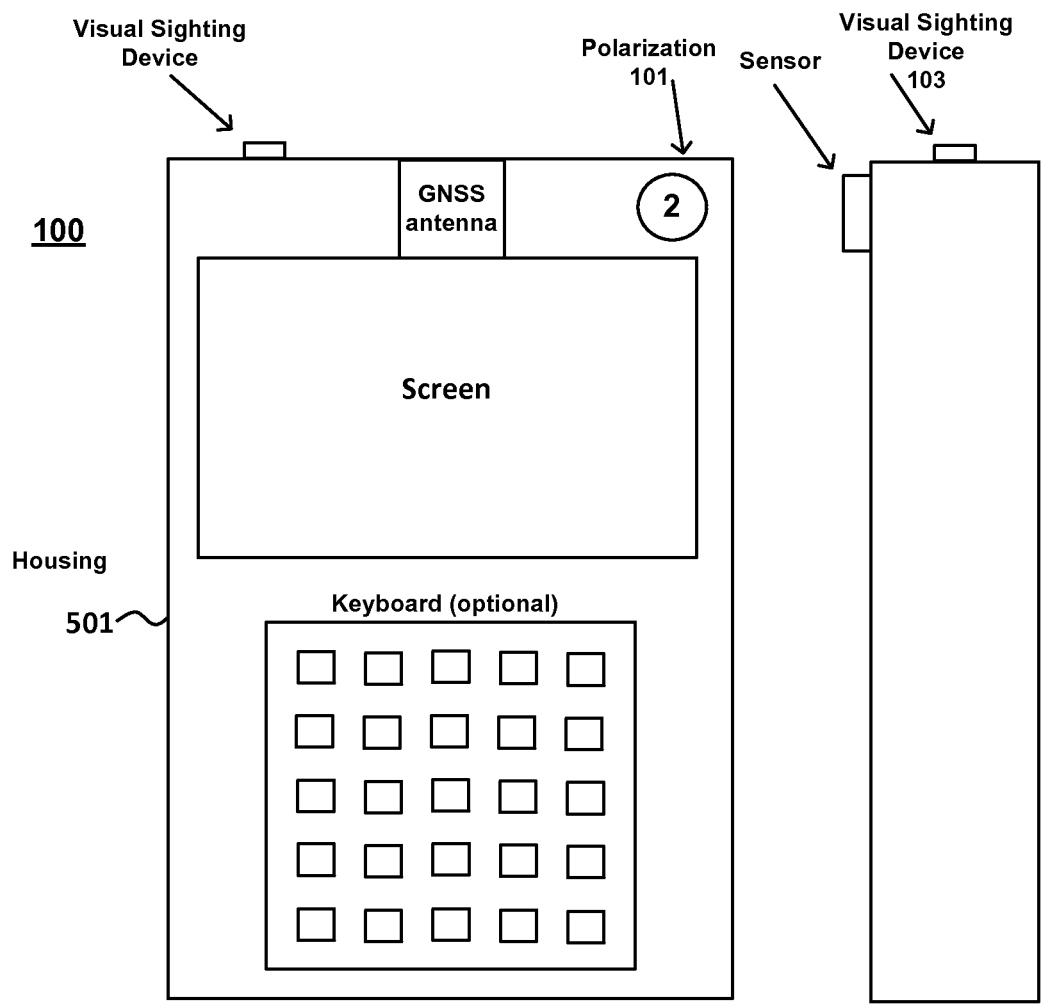
FIG. 5A shows an example device utilizing a sky polarization sensor for absolute orientation determination in accordance with one embodiment.
Figure 5B:
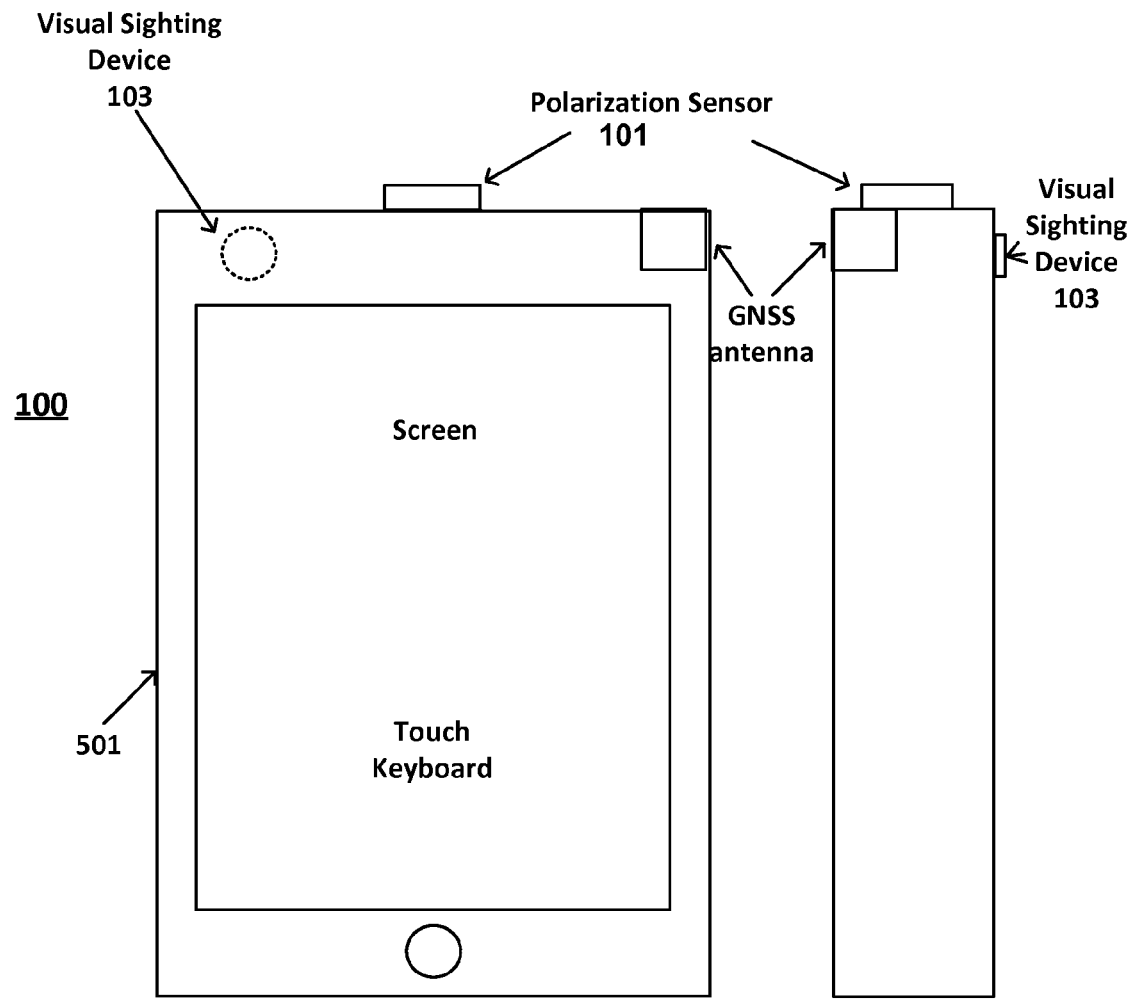
FIG. 5B shows an example device utilizing a sky polarization sensor for absolute orientation determination in accordance with one embodiment.

FIGS. 5A and 5B show devices utilizing a sky polarization sensor for absolute orientation determination in accordance with various embodiments. In the embodiment shown in FIG. 5A, polarization sensor 101 can be integrated with the housing 501 for a handheld Geographical Information Systems (GIS) data collection receiver. As shown in FIG. 5A, visual sighting device 103 is disposed on the top edge of housing 501, while polarization sensor 101 is disposed on the front side of housing 501. Thus, when a user points visual sighting device 103 at an object (e.g., to record an image), polarization sensor 101 will generally be pointed at the sky to record the sky polarization. Similarly, it may be integrated with another type of data collector, such as a cellphone modified to serve as a position determination instrument, as shown in FIG. 5B. In FIG. 5B, visual sighting device 103 is disposed on the back side of housing 501, while polarization sensor 101 is disposed on the top edge of housing 501.

Figure 6A:
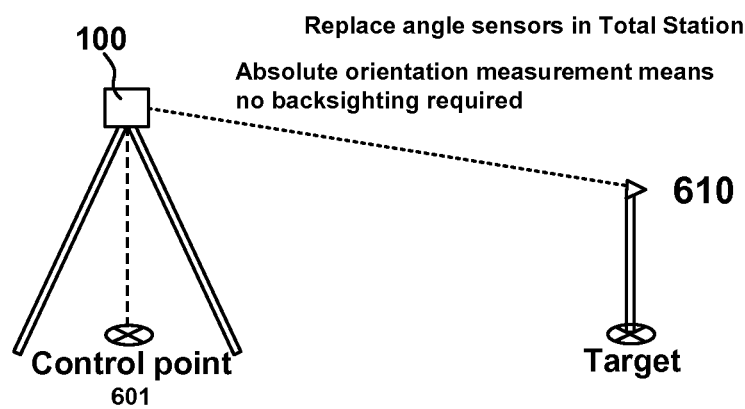
FIGS. 6A-6E show implementations of an orientation system in accordance with various embodiments.

Example Implementation of a Sky Polarization Sensor for Absolute Orientation Determination in Position Determining Systems FIG. 6A-6E show various use scenarios of a device 100 in accordance with various embodiments. In FIG. 6A, device 100 comprises a tripod-mounted survey device (e.g., a theodolite or total station as described with reference to FIGS. 4A and 4B) which is disposed above a control point 601. Because device 100 can determine its absolute orientation using polarization sensor 101 and orientation determiner 104, there is no necessity to level the instrument or to backsight to another known reference point to establish the absolute orientation of device 100. In other words, device 100 can be set up at control point 601 and measurements of the relative angle and range to target 610 can be acquired. As a result, the amount of time to set up and begin collecting data using embodiments of device 100 is greatly reduced.

Figure 6B:
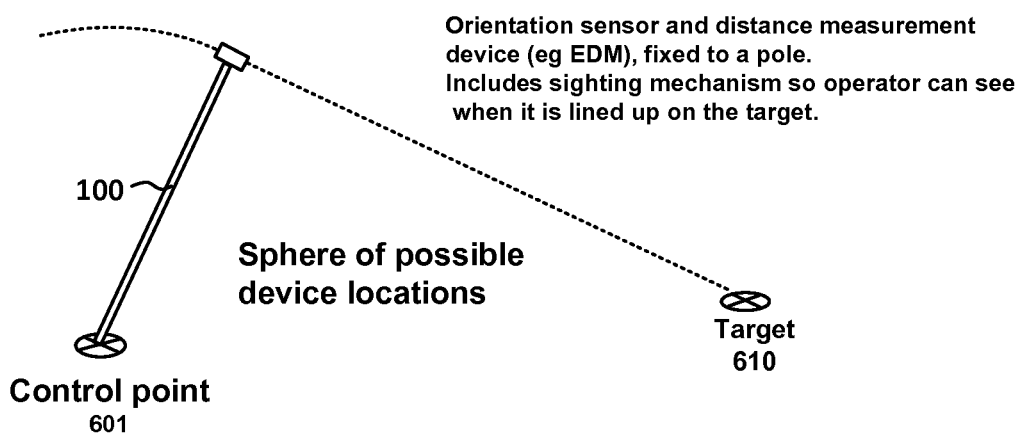

In FIG. 6B, device 100 comprises a pole (e.g., 110 of FIGS. 1B and 1C) and a distance measurement device (e.g., 108 of FIG. 1B). Device 100 further comprises a sighting mechanism such as a video camera coupled with display 106 to permit a user to view in real-time whether device 100 is aimed at a target such as target 610. In operation, the user places the tip of pole 110 on control point 601 and tilts/rotates device 100 until range/distance measurement component 108 is pointed at target 610. The range to target 610 and orientation of device 100 are measured and used to determine the position of target 610 using the methods described above. Again, the time needed to set up device 100 and determine the position of target 610 is greatly reduced in comparison with currently implemented techniques.

Figure 6C:
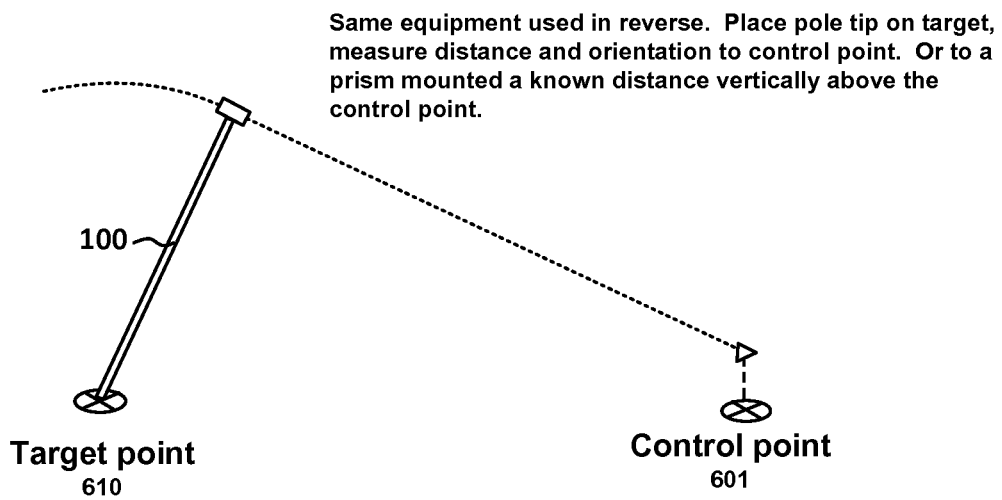

In FIG. 6C, the same equipment described above with reference to FIG. 6B is used. However, in the example of FIG. 6C, the tip of pole 110 is places at the position of target 610 and the range to control point 601 and orientation of device 100 are measured. This permits determining the position 610 in instances when it may be obscured when observed from control point 601. Alternatively, the range to a prism mounted vertically above control point 601 may be determined by device 100. In one or more embodiments, the prism may also be configured with a polarization sensor 101 and other components to determine the absolute orientation of the prism.

Figure 6D:
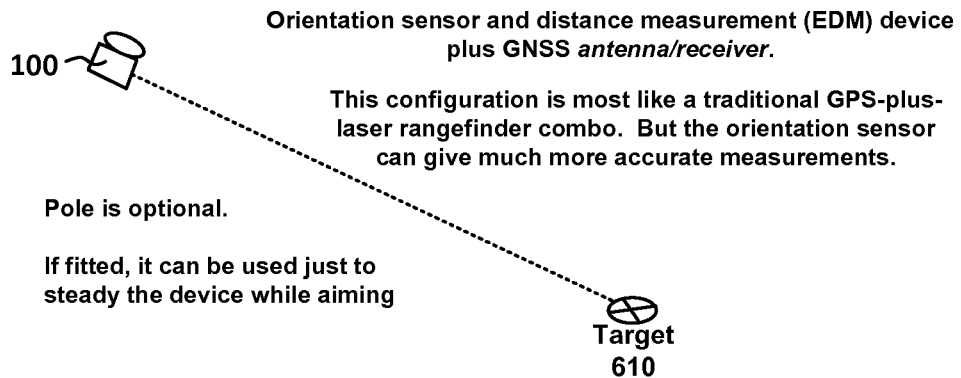

In the example of FIG. 6D, device 100 comprises a GNSS antenna/receiver (e.g., 111 of FIG. 2A), a distance measurement device (e.g., 108 of FIG. 1B), orientation determiner 104, and a polarization sensor 101 as well as other components described above to facilitate determining the absolute orientation of device 100. It is noted that device 100 may optionally comprises pole 110 in various embodiments. In this embodiment, the position of device 100 is determined using GNSS receiver 111 while the range to target 610 is acquired using range/distance measurement component 108. Polarization sensor 101 captures sky polarization data at the time that the range to target 610 is captured.

Figure 6E:
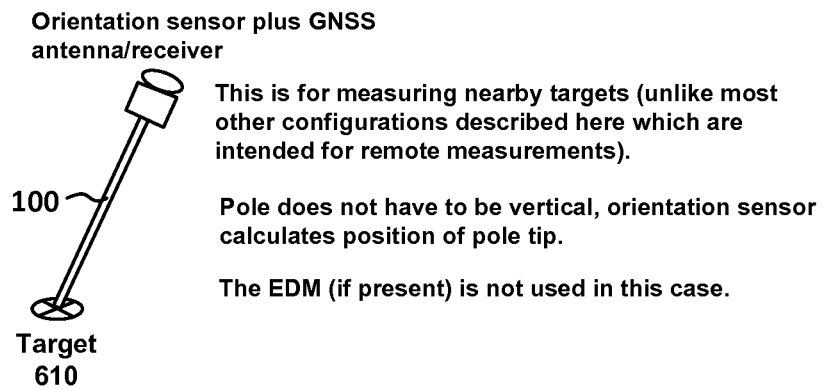

In the example of FIG. 6E, device 100 is configured to determine the position of nearby targets. Thus, in FIG. 6E, device 100 comprises a GNSS antenna/receiver (e.g., 111 of FIG. 2A), polarization sensor 101, and other components described above to determine the absolute orientation of device 100. In FIG. 6E, device 100 further comprises pole 110. In operation, the tip of pole 110 is placed at target 610 and the position of GNSS antenna/receiver 111 is acquired. Using polarization sensor 101, the orientation of device 100 can be determined and the position of the tip of pole 110, as opposed to the position of antenna/receiver 111, can be determined as described above. Again, this permits a rapid determination of the location of target 610.

Operation of a Sky Polarization Measurement System

Orientation of an object is defined by angles of rotation about three perpendicular dimensional axes associated with the object, commonly referred to as X, Y, and Z, or Easting, Northing, and altitude. In the following discussion, the term "absolute orientation" means that the Y axis of a device is aligned with true north and the Z axis is aligned with the gravity vector. These axes are also commonly referred to as yaw, pitch and roll.

Positioning is usually defined in terms of a coordinate system, using axes defined as latitude/longitude or northing/easting or X/Y. Altitude, height or Z, is measured relative to various datums but is usually parallel to the local gravity vector. Thus in nearly all cases, positioning coordinate systems are aligned with true north and gravity, so absolute orientations can be used directly for coordinate geometry. Another term of art is "pose." Pose refers to the orientation of the object relative to some previously selected and defined frame of reference.

Relative Orientation Measurement

The angle sensors in traditional optical survey instruments inherently measure relative angle differences. For example, the horizontal angle is zeroed when the device is switched on; the horizontal axis simply measures angle differences between the backsight and the target, and the vertical angle is relative to the base of the instrument. This is why the instrument traditionally must be truly level before it can deliver elevation angles. Similarly, the azimuth to the backsight must be known in order to convert horizontal angle difference values into the azimuth to the target.

Alternatively, gyroscopes can be used to measure angle differences. Once the gyroscope is spinning, it tends to maintain its orientation from its initial axial alignment, and relative rotations can be measured. Unfortunately all gyros exhibit drift over time. A variety of underlying technology can be used, from ring laser gyros down to micro electromechanical system (MEMS) gyros, each having its own characteristics such as drift rate, size, weight, power and cost. Because of these compromises, gyros have not typically been used for angle difference measurement in land survey applications, although they are used in other applications such as airborne surveys, often combined with other sensors in an Inertial Measurement Unit (IMU).

Absolute Orientation Determination

In optical survey applications, positioning usually ideally requires absolute orientation, (e.g., horizontal angle with respect to true north (termed azimuth) and elevation angle with respect to gravity (termed elevation angle or vertical angle)). To achieve this with traditional optical instruments, each time the instrument is set up the operator uses a bubble-level to find a local vertical reference line, parallel to the gravity vector. Then the operator takes a backsight reading, which enables subsequent raw horizontal values to be converted to absolute azimuth values. Other gravity-sensing systems have been employed, such as a weighted pendulum.

A gyrocompass is another method of determining absolute azimuth. A gyrocompass (or gyrotheodolite) contains a gyroscope plus a mechanism that results in an application of torque whenever the compass's axis is not pointing north. This uses the earth's rotation in an effect known as precession. Such devices can deliver high accuracy, but this takes a long time (e.g., 20 minutes for 10 arc-seconds), and so are not useful for general purpose surveying.

GNSS-based devices using multiple antennae can also be used to determine absolute orientation. However, these devices are costly and the antennae must have large separation to get even moderate accuracy. Thus, they are not practical for many applications such as surveying in rugged terrain.

Figure 7A:
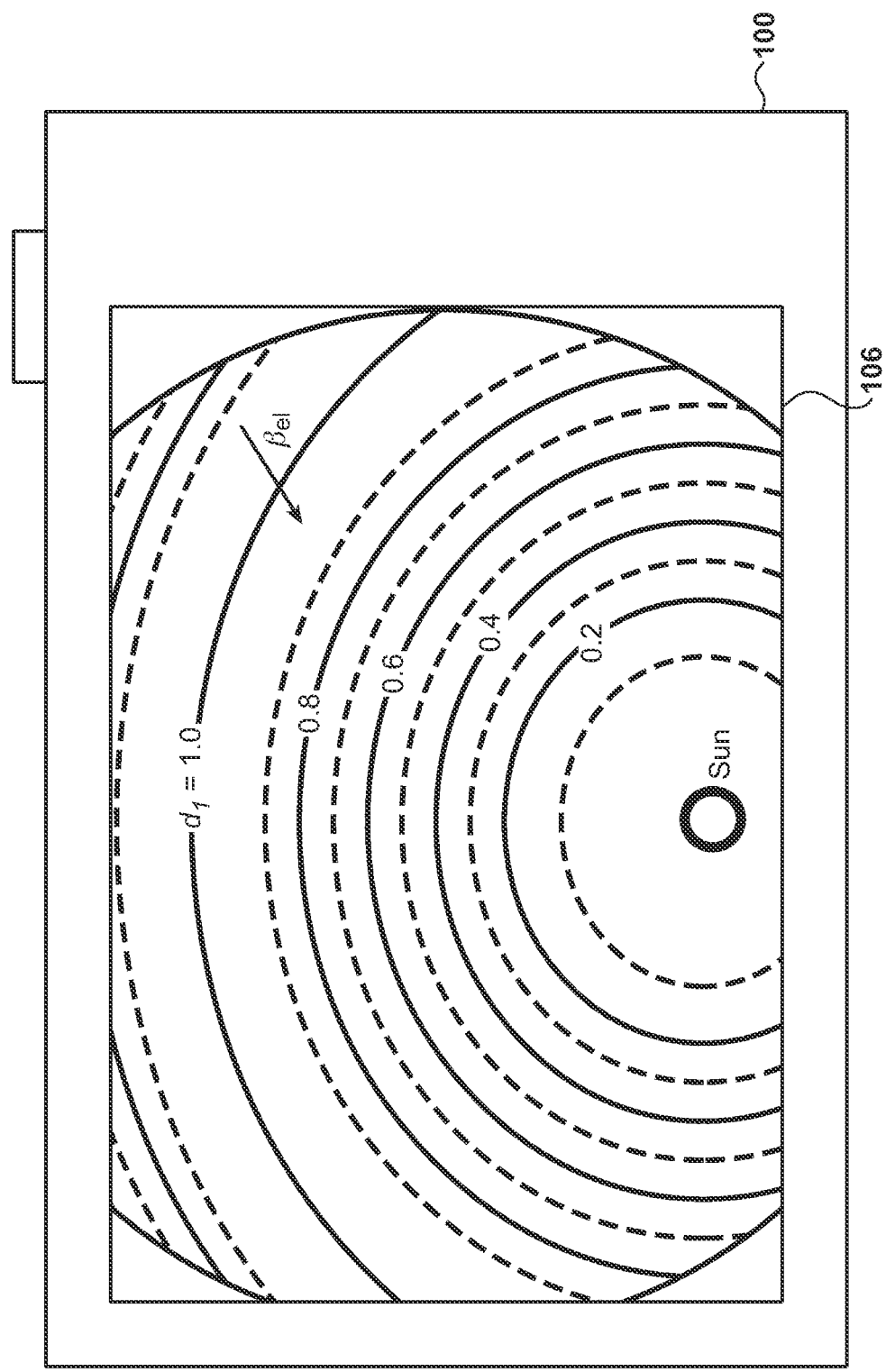
FIGS. 7A-7D show views looking upwards representing views of the sky polarization as it might appear in a polarization sensor image, for a given time and location in accordance with various embodiments.
Figure 7B:
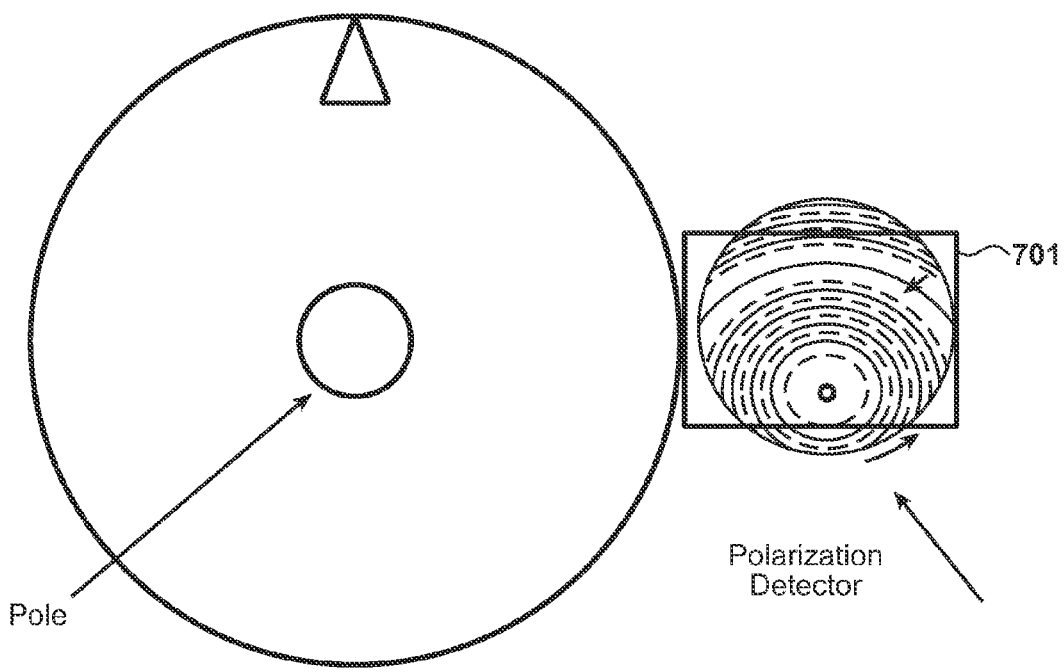
Figure 7C:
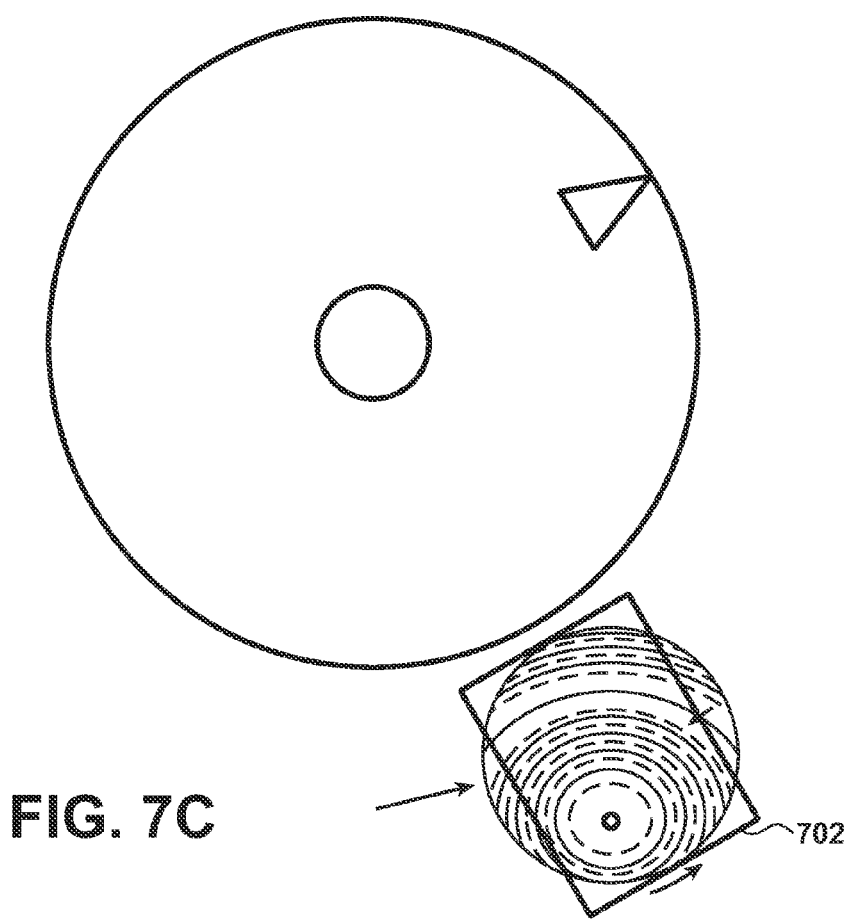
Figure 7D:
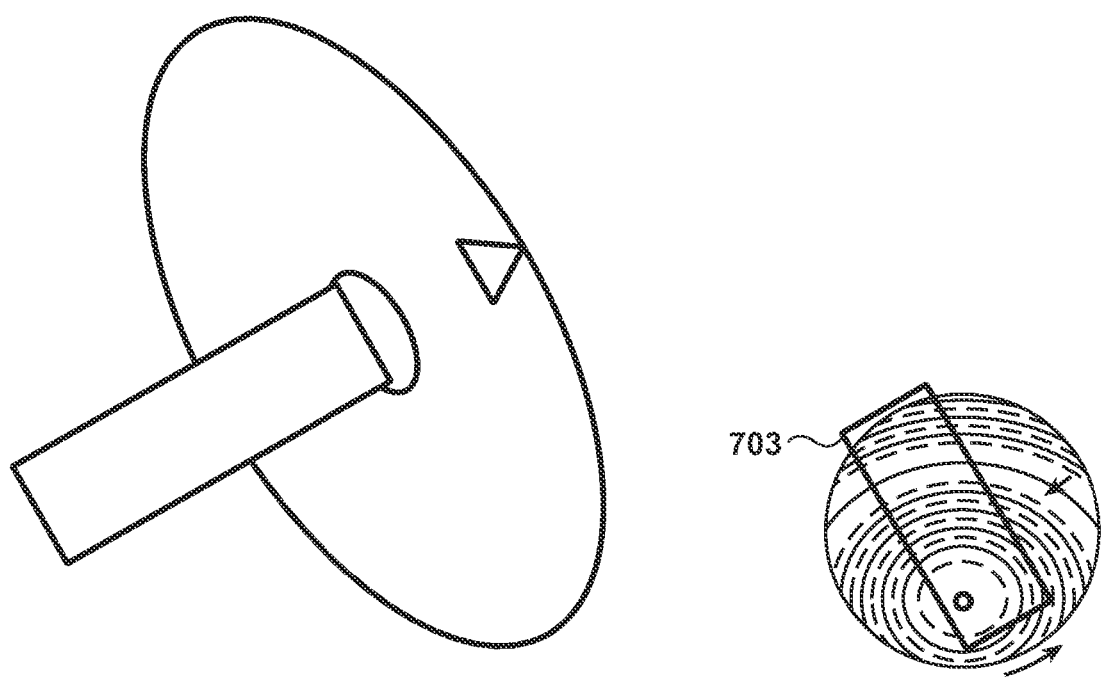

In accordance with at least one embodiment, computer vision techniques are used to measure orientation changes using a polarized camera (e.g., polarization sensor 101) pointing at the sky. Typically, unpolarized photos of the sky do not actually provide much textured information about the sky itself, and it can include a lot of detail that causes problems for correlation, such as fast-moving local clouds, buildings, trees, and overhead wires that may not be visible at both a reference and a mobile location. Polarized light measurements greatly reduce the effect of clouds, and make many earth-bound objects practically invisible because they do not emit polarized light. Images of the ground or local surroundings tend to include objects moving independently of the world, such as cars, people and shadows, which can cause severe difficulties to computer vision algorithms. Linear motion of the mobile device causes apparent rotation in some axes when nearby objects are in view, whereas the sky polarization avoids that effect because the sky if effectively at infinity. Additionally, sky polarization provides a world-wide texture that is present even when the sky is clear and texture-less to the human eye. As shown in FIGS. 7A-7D, the polarization pattern in the sky does not change at a given time, even when a polarization sensor is rotated. Instead, the image of the sky polarization pattern which is captured rotates relative to polarization sensor 101 as it is rotated, or displays other imaging characteristics which can be used to determine the orientation of the polarization sensor at the time the sky polarization pattern is captured. FIG. 7A shows a polarization image on a display (e.g., 106 of FIG. 1A) similar to the predicted sky polarization intensity model shown in FIG. 8. FIG. 7B shows a view looking up from below device 100 toward a GNSS receiver 111 disposed on a pole 110 which a representation of the sky polarization pattern for a given time and location. As shown in FIG. 7B, box 701 shows an example imaging field of polarization sensor 101. In FIG. 7C, although pole 110 and GNSS receiver 111 have been rotated, the sky polarization pattern has not changed. However, its relative orientation to the imaging field of polarization sensor 110 (e.g., 702 of FIG. 7C) has rotated. In the example of FIG. 7C, this permits detecting rotation of device in the yaw axis much like a needle of a compass remains pointing North while rotating relative to the azimuth ring. However, when pole 110 is tilted as shown in FIG. 7D, the sky polarization pattern becomes compressed parallel to the axis of pole 110. As shown in FIG. 7D, box 703 of the imaging field of polarization sensor 101 is foreshortened due to rotation in the pitch and/or roll axes.

Figure 8:
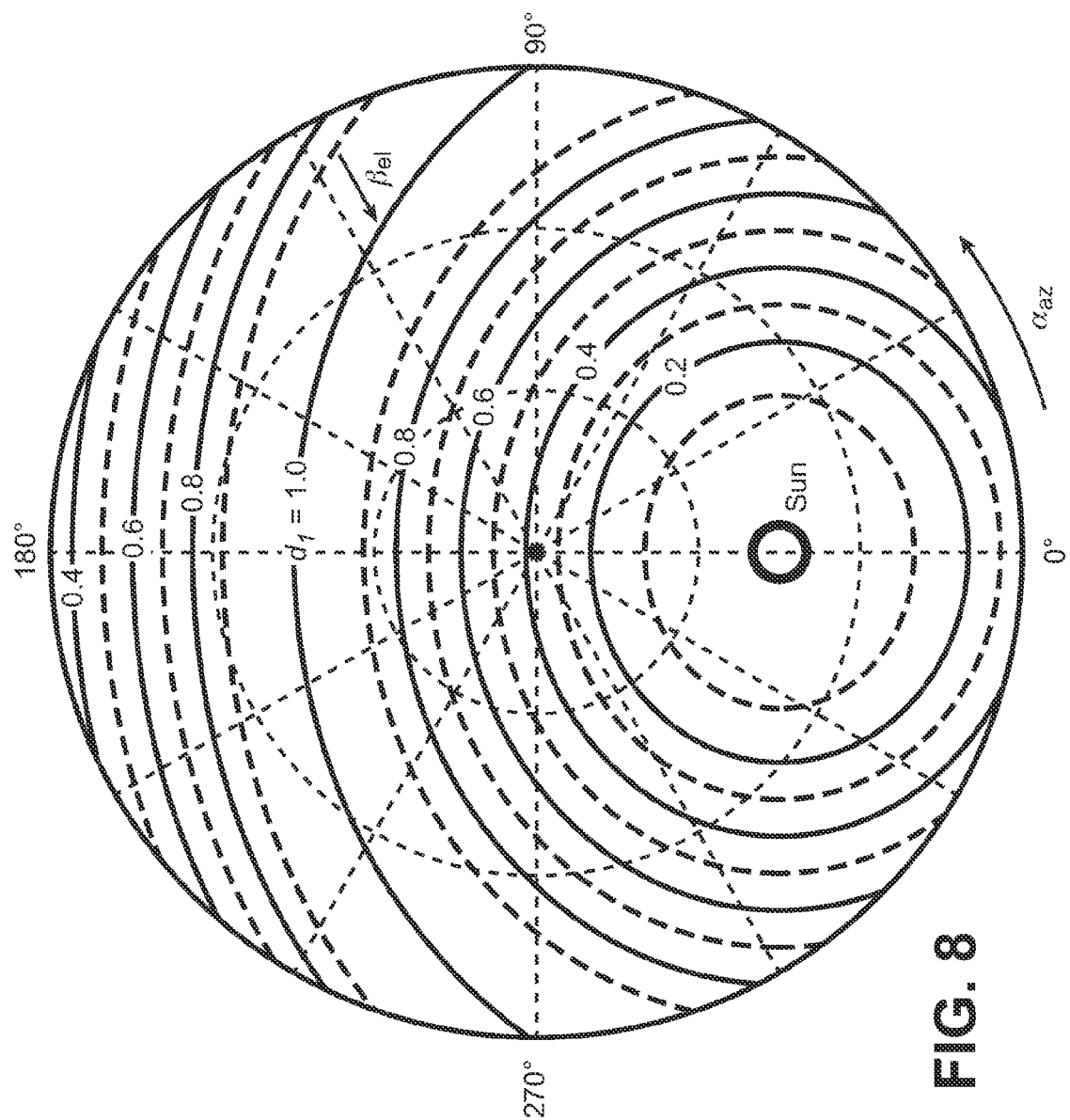
FIG. 8 shows a model of predicted sky polarization intensity for a given time and location.
Figure 9:
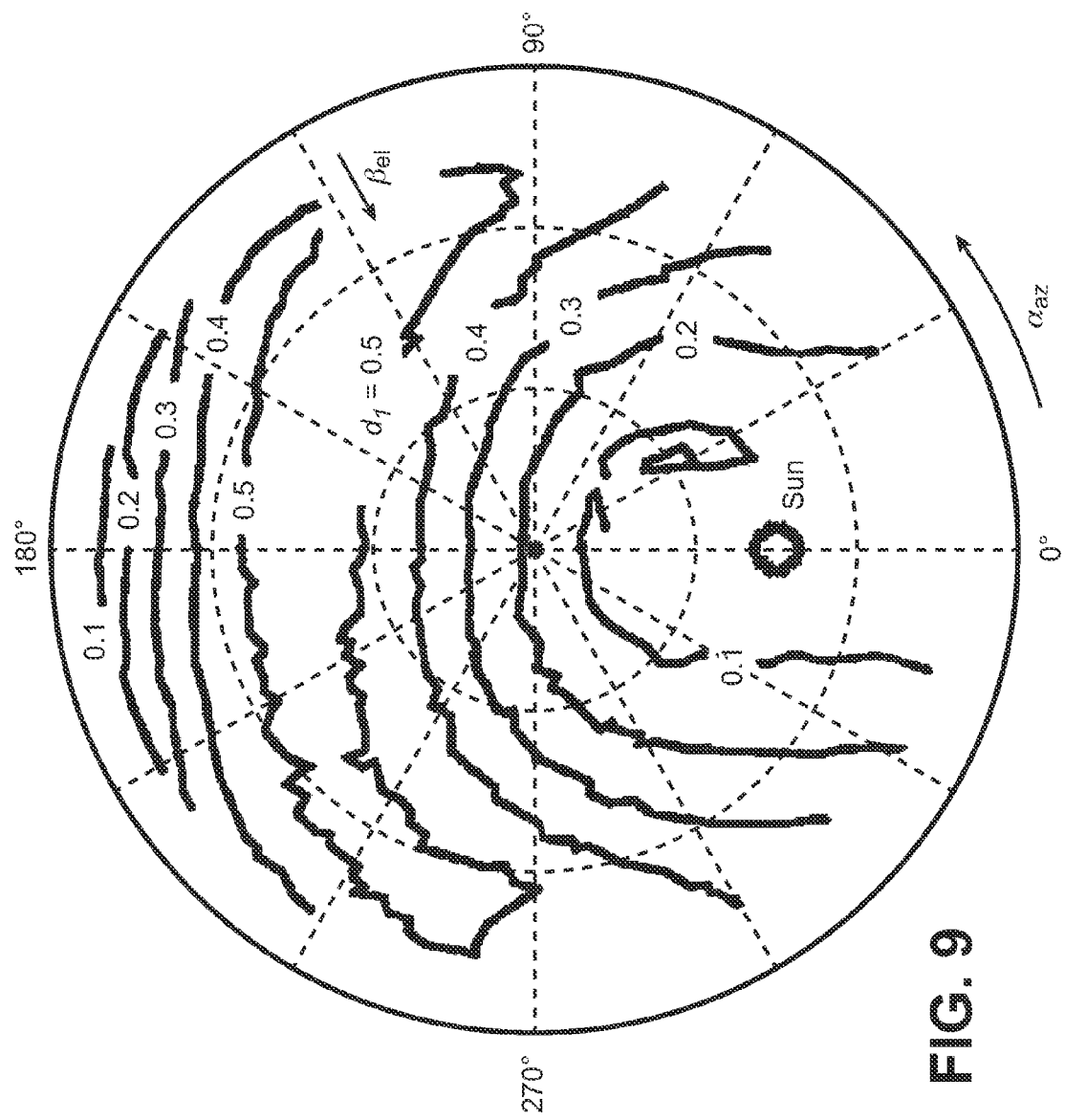
FIG. 9 shows measured sky polarization intensity for a given time and location.

It is well known that as the sun's rays enter Earth's atmosphere, they are scattered by molecules of air, water, dust and aerosols, forming a defined polarization pattern. The Rayleigh sky model is a well known mathematical model of this effect. The pattern depends on the time of day and geographical location of the observer. Sky polarization is mostly linear, rather than circular. Both the intensity (or degree) and angle of polarization can be measured. However, the intensity varies substantially day to day, as well as being reduced by cloud cover, whereas the angle of polarization is unaffected by atmospheric disturbances and can be predicted with an acceptable level of precision by the Rayleigh sky model. The angle of polarization is moderately affected by clouds, such that insects can still navigate successfully under cloud cover. FIGS. 8 and 9 respectively show predicted and measured sky polarization intensity for a given time and location. These are radial skyplots, with lines showing the contours of constant degree of polarization. The predicted values shown in FIG. 8 were generated using a simple mathematical model. The measurements shown in FIG. 9 were made on a clear day, using the wavelength 439 nm (violet). As can be seen, the measurements approximately follow the pattern of the model, but with noticeable variance. Also, the measurement values differ from the model; for example, the maximum measured is about 0.84, whereas the model predicts 1.0. In accordance with one or more embodiments, the angle of polarization is used to determine the orientation of device 100. In various embodiments described herein, the absolute orientation of visual sighting device 103 is determined based upon angle of polarization observed at device 100.

Digital imaging can produce high resolution polarization maps of the sky. In one embodiment, polarization sensor 101 is configured to capture two images, each with a linearly polarized filter at 90 degrees to the other linearly polarized filter. In another embodiment, polarization sensor 101 is configured to capture three images with polarization filter angles of 0, 60 and 120 degrees respectively, or four images with polarization filter angles of 0, 45, 90 and 135 degrees respectively. In another embodiment, polarization sensor 101 is configured to capture a plurality of successive images with a polarizing filter at various respective angles. For example, polarizing sensor could capture 3 or more successive images with respective polarization filter angles of 0, 60, and 120 degrees. In one embodiment, the polarization filter can be rotated between the capture of respective images to achieve the respective polarization filter angles. It is recognized that polarization sensor 101 can capture more or less than 3 successive images in various embodiments. In another embodiment, polarization sensor 101 is configured with one image sensor and two or more polarizing filters. In this case each of the two or more polarizing filters receives the same view as the other. In accordance with one embodiment, a single image sensor is used in conjunction with one or more splitters, each directing light to a respective filter and separate sensor. In another embodiment, polarization sensor 101 comprises an image sensor (e.g., a charge coupled device (CCD), or a complimentary metal-oxide semiconductor (CMOS) device). Alternatively, polarization sensor 101 may utilize one or more cameras, each with a differently angled filter, CCD, or CMOS sensor.

Figure 10:
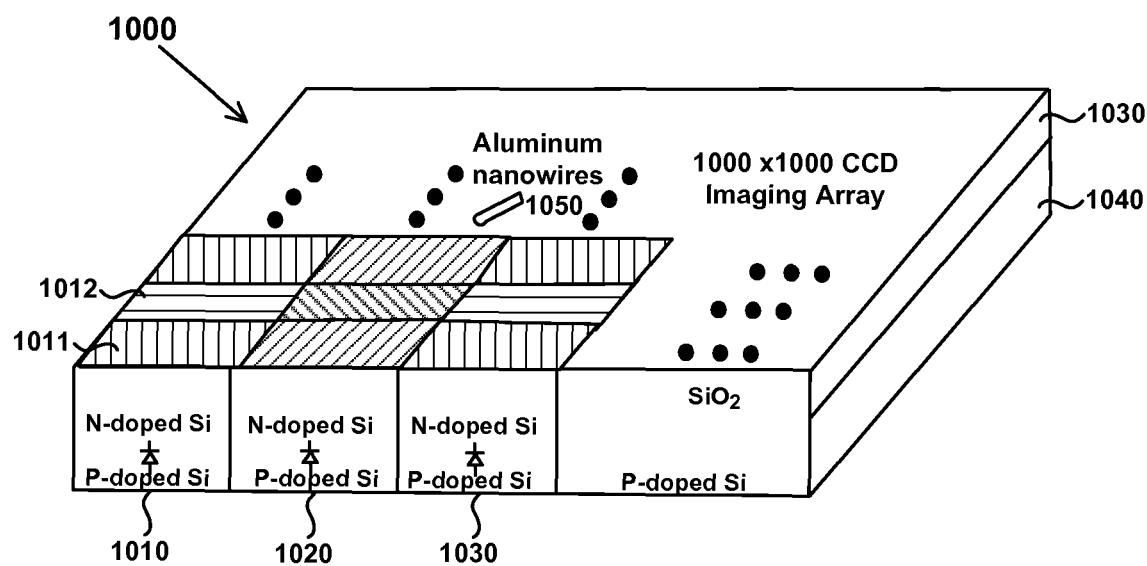
FIG. 10 is a diagram of one embodiment of a polarization detector component with each pixel having its own polarization filter, oriented differently to its neighbors.

In at least one embodiment, each pixel element of the image sensor has a respective polarizing filter at different angles to neighboring pixels. This is shown in greater in FIG. 10 which is a diagram of one embodiment of a polarization detector component 1000 with each pixel having its own polarization filter, oriented differently to its neighbors. In FIG. 10, a first column 1010, second column 1020, and third column 1030 of pixels are disposed in a P-doped silicon layer 1040. It is noted that each of columns 1010, 1020, and 1030 is comprises of a plurality of pixel elements Disposed above silicon layer 1040 is a silicon oxide layer 1030 upon which aluminum nanowires 1050 have been respectively disposed above each of the pixel elements of columns 1010, 1020, and 1030. The aluminum nanowires 1050 act as respective polarizing filters for the pixel elements above which they are disposed. It is noted that in FIG. 10, the aluminum nanowires 1050 are disposed at different angles than the aluminum nanowires which are above a neighboring pixel element in the same column. For example, the aluminum nanowires above pixel element 1011 are disposed at polarization filter angle of 0 degrees, while the aluminum nanowires above neighboring pixel element 1012 are disposed at a polarization filter angle of 90 degrees. Furthermore, in second column 1020 the polarization filter angle of the aluminum nanowires above the pixel elements are aligned at an angle which is offset 45 degrees from those of neighboring columns (e.g., 1010 and 1030) and are offset 90 degrees from neighboring pixel elements of the same column.

Sky Polarization Processing

Sky polarization occurs at most wavelengths, but typically filters are used to restrict measurements to the blue or ultraviolet spectral range, as used by insects. Experiments have shown that the extension of the e-vector pattern of the blue sky into the areas of the sky covered by clouds is more useful to an e-vector compass when the observer responds to shorter wavelengths. Thus, in one or more embodiments, polarization sensor 101 is configured to selectively pass wavelengths in the blue to ultraviolet spectral range.

When the sun is in full view, its light intensity can cause saturation, as many sensors have limited dynamic range. Thus, in at least one embodiment, the dynamic range of the most useful parts of the sky image is maximized. In one embodiment, multiple sensor elements, each with a restricted field of view, are implemented by polarization sensor 101 so that if one sensor element is saturated by the direct image of the sun, one or more other sensor elements can independently set their exposure to capture other parts of the sky with high fidelity. In one embodiment, sensor exposure can be controlled to intentionally over-expose the parts of the image around the sun in order to optimize the dynamic range of the rest of the captured image.

Orientation determiner 104 is configured to receive the data captured by polarization sensor 101 and to derive information regarding the orientation of device 100. Typically, cloud cover does not preclude orientation from sky polarization, unlike traditional celestial navigation. Furthermore, the polarization angle pattern is unique in subsets of the sky. Therefore the whole sky need not be visible; orientation can be calculated when parts of the sky are occluded by buildings, trees, or other obstructions. Additionally, the sun itself can be occluded, yet orientation can be calculated from the sky polarization of other parts of the sky, unlike traditional sun-shots.

In one or more embodiments, using orientation determiner 104, sky polarization measurements (alone) can be used to calculate all three axes of rotation of device 100: yaw, pitch and roll. In contrast, celestial navigation such as a sunshot with a sextant only determines azimuth. Elevation angle and roll are also detectable, but they are measured from the ocean horizon which strictly speaking is a separate measurement of the gravity vector unrelated to the sun, and which is unavailable to most land survey applications. To understand the difference, consider that the sun's location is a single point, so it is necessary to also measure gravity (by sighting the ocean horizon) in order to measure elevation angle, look up the almanac with an approximate location, and determine the azimuth to the sun. In contrast, the capture of sky polarization is not based upon a single point; it is a 3D hemisphere, which can be imaged as a two dimensional surface. Thus it follows that rotations of the measuring device in all three axes can be determined by, for example, correlating the captured sky polarization image from device 100 with a reference sky polarization model. Furthermore, the gravity vector does not need to be measured when correlating the captured sky polarization image with the reference sky polarization model.

In one or more embodiments, orientation determiner 104 measures the angle of polarization received at polarization sensor 101 in addition to, or instead of, measuring the intensity of polarization. Then, instead of simply looking for meridian symmetry, orientation determiner 104 correlates the measured values with the predicted values from a model such as Rayleigh's model. Alternatively, orientation determiner 104 correlates the measured values with a second set of measured values captured at a separate location. In one or more embodiments, orientation determiner 104 receives the predicted values (e.g., from a Rayleigh's model or a second set of measured values) from polarization reference source 120 via wireless link 107.

To use this information to determine orientation, orientation determiner 104 performs a correlation process to compute the relative rotations of device 100 around all three axes that result in the best match between the measurements captured by polarization sensor 101 and the model values, or second set of measurements. Those relative rotations comprise the orientation of device 100 relative to the sun.

In the method described above, orientation determiner 104 calculates the orientation of device 100 relative to the sun. Of course the sun is in constant motion across the sky, rotating by about 15 arc-seconds per second of time. Absolute orientation of device 100 (e.g., with respect to true north and gravity) can be determined by orientation determiner 104 if the azimuth and elevation angle of the sun are known. In one or more embodiments, these values can be accurately calculated by orientation determiner 104 using a solar almanac, if the time and approximate location of device 100 on earth is known. Furthermore, based upon the known spatial relationship between polarization sensor 101 and visual sighting device 103, the absolute orientation of visual sighting device 103 can also be determined. In one or more embodiments, GNSS receivers (e.g., 111 of FIGS. 2A and 2B) can provide sufficiently accurate time and the location of device 100. Solar ephemeris data and software is available from, for example, the Navigation and Ancillary Information Facility (NAIF) of the National Aeronautics and Space Administration (NASA) and can stored locally (e.g., in data storage unit 1212 of FIG. 12). Thus, absolute orientation of visual sighting device 103 in all three axes can be calculated, without performing a gravity-based leveling action of device 100.

Model Limitations

It is recognized that observations of sky polarization (e.g., captured by polarization sensor 101) do not always exactly match the Rayleigh model this can be due to various atmospheric factors such as double- or multiple-scattering effects. Pollution also causes variations in the number and size of aerosol particles, which also causes differences from simple models of sky polarization. Cloud cover and differences in ground albedo also have an effect on sky polarization measurements. These effects can constrain the orientation accuracy achievable from measuring the polarization pattern and comparing it to theoretical models. In one or more embodiments, rather than attempting to improve the theoretical models, one sky polarization measurement (e.g., captured by polarization sensor 101) is correlated against another sky polarization measurement (e.g., captured by polarization reference source 120) by orientation determiner 104, rather than against a theoretical model.

One advantage in using orientation determiner 104 to correlate a plurality of sky polarization measurements is that two contemporary real-sky measurements will typically be much more alike under most conditions, compared to the technique of comparing a real-sky measurement (e.g., captured by polarization sensor 101) with a model such as the Rayleigh model. This is because the factors that cause local variance from the ideal Rayleigh model are likely to be similar in both measurements. In other words, the factors that cause a variance from the Rayliegh model at device 100 are also likely to cause a similar variance from the Rayleigh model at the site where polarization reference source 120 is captured. For example, heavy cloud, pollution and city lights may cause the sky polarization to diverge significantly from a model, but two measurements (from devices nearby in time and space) will see sky polarization affected by the environment, and so will be relatively similar and more highly correlated. For this reason, differential correlation algorithms utilized by orientation determiner 104 will be much more robust, and will deliver higher accuracy results. Another advantage of the differential technique is that polarization model values do not have to be calculated. In contrast, the model-comparison method should ideally re-calculate the model for each orientation update, which is computationally expensive at high update rates.

There are two important methods of employing the differential approach in accordance with various embodiments: absolute referenced differential orientation and autonomous relative orientation.

Absolute Referenced Differential Orientation

Instead of a single polarization measurement device, two devices are used in one or more embodiments. One device is a stationary reference (e.g., polarization reference source 120 of FIGS. 1A, 1B, and 1C), and is calibrated with a known absolute orientation (for more details see the Calibration section below). The other device (e.g., device 100) is mobile. A sky polarization measurement is taken at the same time at both device 100 and polarization reference source 120 within a certain tolerance. The two measurements of sky polarization are then correlated either using orientation determiner 104 on device 100, or by a second orientation determiner (e.g., 1904 of FIG. 19) located at polarization reference source 120. The correlation process computes the relative rotations of device 100 around all three axes (e.g., the X, Y, and Z axes) that result in the best match between the measurements of sky polarization captured at device 100 and those captured at polarization reference source 120. It is noted that model values such as a Rayleigh model can also be correlated with the measurements of sky polarization captured at device 100 instead of, or in addition to, the correlation of sky polarization captured at device 100 and polarization reference source 120. Those rotations comprise the orientation of the device 100 relative to the reference device used at polarization reference source 120. As the absolute orientation of the reference device used at polarization reference source 120 is known, then the absolute orientation of visual sighting device 103 can be derived by the correlation process performed by orientation determiner 104.

The static reference device (e.g., polarization reference source 120) may be permanently emplaced at a known location, in much the same way as GNSS reference stations are installed. This would make it easier to co-locate, to share the power, computing, and communications resources of the GNSS reference stations to provide sky polarization data to device 100. However other configurations are possible, especially if it is desired to locate polarization reference source 120 close to device 100. For example a polarization reference source 120 could be established near a construction site. In one embodiment, polarization reference source 120 can be vehicle-mounted so that it is nearby when a field worker exits the vehicle to perform a survey. The only requirement is to establish the absolute orientation of polarization reference source 120, which can be done in the traditional way by leveling over a control point and back-sighting, or by using a twin-GNSS system, where orientation is calculated by using two GNSS antennae separated by a distance (e.g., the Trimble SPS555H receiver). This setup of polarization reference source 120 only needs to be done once regardless of where device 100 is moved. Thus it is still much more productive than traditional optical surveying, which has to be leveled and backsighted every time the instrument is moved.

Autonomous Relative Orientation

Differential measurement correlation can also be performed by orientation determiner 104 on measurements from a single device (e.g., polarization sensor 101) over time. In one embodiment, polarization sensor 101 measures the sky polarization at times t1 and t2, then orientation determiner 104 computes the change in orientation of device 100 over that duration. This is advantageous in that no reference device (e.g., polarization reference source 120) and no data communications are required. It also enables a relatively high update rate, without being throttled by data transfer speed from a remote resource. The downside is that it delivers only relative orientation changes. However the relative orientation values are typically sufficiently accurate, and atmospheric changes at device 100 will cause only slow drift.

If high accuracy is required or there is a significant time between the measurements, then the solar movement from frame to frame can be calculated by orientation determiner 104 and applied to the relative orientation. The solar movement is simply the difference between the azimuth and elevation angles calculated from the solar almanac for the location and times.

Correlation

Each measurement of sky polarization is actually a set of data values over a spatial region (the region's shape is determined by the lens of polarization sensor 101). The data values calculated are angle or intensity of polarization, or potentially other Stokes parameters. When using camera-based measurement, these values are typically calculated per pixel, so it is convenient to think of the measurement data as an image, and use image processing techniques when correlating sky polarization measurements.

The mobile measurement (e.g., taken by device 100) is taken with unknown orientation. In theory, the mobile image can be rotated in all three axes until it matches the static reference measurement provided, for example, by polarization reference source 120. As an example, assume that the measurements captured by device 100 are taken roughly upwards (towards zenith) with a fish-eye lens. If polarization reference source 120 and device 100 have the same orientation (for example level and with true north at the top), then there will be negligible difference between the images. But if device 100 is rotated 20 degrees horizontally (i.e., around the vertical axis), then the image correlation performed by orientation determiner 104 will detect a rotation of 20 degrees in the horizontal plane. Similarly pitch and roll rotation of device 100 cause translation along the image sensor pixel axes.

Correlation Algorithms

In practice the correlation matching performed by orientation determiner 104 will be inexact because of different atmospheric effects and different skyline obstructions. Different lenses used by polarization sensor 101 and polarization reference source 120, as well as different image resolutions, may cause scale changes or other aberrations. Thus, in one or more embodiments, algorithm used by polarization processor is used to find a best fit between the sky polarization measurements captured by polarization sensor 101 and the sky polarization measurements captured by polarization reference source 120 and/or a sky polarization model. For the purpose of the present Description of Embodiments, the term "best fit" is understood to mean the solution in which there is the least difference between the sky polarization measurement captured by polarization sensor 101 and the sky polarization reference data set with which is correlated.

There are several types of algorithms available for correlating images and determining rotation, translation and scale changes. Examples which can be used in various embodiments are the Wavelet transformation method, Fast Fourier transformation method, Morphological Pyramid approach, and Genetic Algorithms. In one embodiment, Fast Fourier Transforms are use by orientation determiner 104 to find global transforms with small scale changes between sky polarization measurements captured by polarization sensor 101 and sky polarization measurements captured by polarization reference source 120 and/or a sky polarization model. Because the scale changes will be constant for a given pair of reference and mobile polarization sensors, at least one embodiment accounts for scale changes between polarization sensor 101 and the polarization sensor used by polarization reference source 120 before running the correlation algorithm used by orientation determiner 104.

Lens distortion can introduce correlation variances that are undesirable because they are not directly related to orientation changes of device 100. Therefore in one embodiment, a measurement of the lens distortion of polarization sensor is performed perhaps as a factory calibration procedure. This lens distortion can be compensated for, either by creating a corrected image at device 100, or by accounting for the known distortion of polarization sensor 101 during the pre-processing or correlation by orientation determiner 104.

In one or more embodiments, it is possible to use other correlation methods that do not use image-processing algorithms. As a simplistic example, a number of samples can be taken by orientation determiner 104 from the first measurement dataset captured by polarization sensor 101, at spatial intervals across the sky (e.g., in a regular rectangular grid pattern). Each sample value can be subtracted from the value of a second measurement dataset captured by polarization sensor 101 at the same spatial location, and the total difference of the sample values can be summed. Then the first dataset can be re-sampled with the sampling grid rotated or translated and the process is repeated. A smaller total difference between the first measurement dataset and the second measurement dataset indicates a better fit. This process iterates, trying other orientations of the sky polarization measurements captured by polarization sensor 101 until the total difference is minimized. In one embodiment, a least squares method can also be used by orientation determiner 104.

It should be noted that there are many other computer vision algorithms used for finding correspondences between images, such as speeded up robust feature (SURF). However many of these algorithms rely on finding identifiable local features, such as corners or lines. Thus they require a reasonable level of texture across relatively small areas of the image. Thus they are not optimal for use with polarization patterns, which have relatively gradual changes over large portions of the sky.

Calculating Absolute Orientation

Image correlation calculates the orientation of device 100 with respect to the static device (e.g., polarization reference source 120). But most applications need to determine the absolute orientation with respect to true north and true zenith (the direction of the gravity vector). This is achieved by determining the absolute orientation of polarization reference source 120, and applying the calculated difference of the sky polarization measurement from polarization reference source 120 to the sky polarization measurement captured by polarization sensor 101 of device 100. One formula for performing this operation is shown in Equation 7 below:

$$R^D_M = R^D_R R^R_M \quad \text{Equation (7)}$$

where $R^D_M$ is a matrix describing the mobile device orientation $R^D_R$ is a matrix describing the reference device orientation $R^R_M$ is a matrix describing the orientation difference between reference and mobile devices.

Calibration

All sky polarization orientation devices need to be calibrated, to determine the spatial relationship between image sensor data and either true north and gravity, a sighting system, or the body of the device. This is true for model-comparison systems, autonomous differential systems, and reference differential systems. For example in a camera-based device, it is unlikely that the axis of polarization sensor 101 is perfectly perpendicular to the device housing, or to the axis of visual sighting device 103. Thus in one or more embodiments, calibration is performed to measure the misalignment between the axis of polarization sensor 101 and the axis of visual sighting device 103, to a high degree of accuracy so the error can be compensated.

Typically, each sky polarization sensor 101 is only calibrated once (assuming no physical damage occurs to device 100). Thereafter, the polarization detected for a given orientation of polarization sensor 101 on an assembled system will be consistent. In other words, once polarization sensor 101 is aligned with the equipment, it will always produce a true north reference direction.

Traditional surveying techniques provide methods for alignment of sensors, such as mounting the device over a known point, precisely levelling it, and sighting another known point at a distance. However an extra step is required to calibrate to the plane of the actual image sensor(s). There are at least two methods, using a standard nearby target, and imaging the sky.

Standard Nearby Target

In one embodiment, a target surface is placed in view of the optics of device 100 (e.g., visual sighting device 103). This target surface is located so that it is in a known spatial relationship (such as perpendicular) to either the mounting for device 100 (e.g., base 401 of FIGS. 4A and 4B) or to another target that is viewed through the visual sighting device 103 of device 100. An image is then taken of the target surface. Standard computer vision methods are used to identify known parts of the target surface in the image, and to therefore calculate the misalignment of the image sensor(s) with respect to device 100 or the mounting.

Imaging the Sky or Sun

Other calibration methods used in various embodiments do not use a standard target as described above, but use the sky or sun itself as the calibration target. They utilize the fact that we already have a sky camera (e.g., polarization sensor 101), and use it to directly calculate the absolute orientation (yaw, pitch and roll) of the image sensor(s). The advantages are that the sun's elevation and azimuth can be precisely calculated, so no other target needs to be installed and itself calibrated. In fact, no factory calibration is required. They require access to a solar ephemeris which can be stored locally on device 100 such as in data storage unit 1212 of FIG. 12, and accurate location and time, which can be provided by GNSS receiver 111.

The disadvantage is that a large part of the sky needs to be in view, which is difficult in a manufacturing environment. However these methods may be useful as an uncomplicated setup procedure for a static reference station, or as a way of independently checking a factory calibration.

Imaging the Sky

One method utilized in various embodiments compares sky polarization measurements with a model, and averages over time. First, sky polarization measurements are correlated with a predictive model to determine 3-axis orientation of device 100, or polarization reference source 120. Then, average orientations of device 100, or polarization reference source 120, are determined over time (e.g., a day or several days). In one or more embodiments, the averaging can be weighted by the closeness of the match, for example to de-weight results when the sky is cloudy.

Imaging the Sun

Another calibration method used in various embodiments utilizes sun-shots over the course of a day. The equipment being calibrated (e.g., device 100, or polarization reference source 120) can be used to directly measure the location of the sun (e.g., using a centroid-of-area algorithm) and using a dark filter to avoid overexposure of the polarization sensor. As an example, multiple sun-shot measurements are taken over the course of a day, as the sun's location (azimuth and elevation angle) moves across an arc of the sky. Each individual sun-shot resolves two unknowns (azimuth and elevation angle), so only two sun-shots (preferably at widely spaced times) are needed to resolve the 3-axis orientation of device 100 or polarization reference source 120. Additionally, extra information from subsequent sun-shots can be averaged to increase precision.

Figure 16:
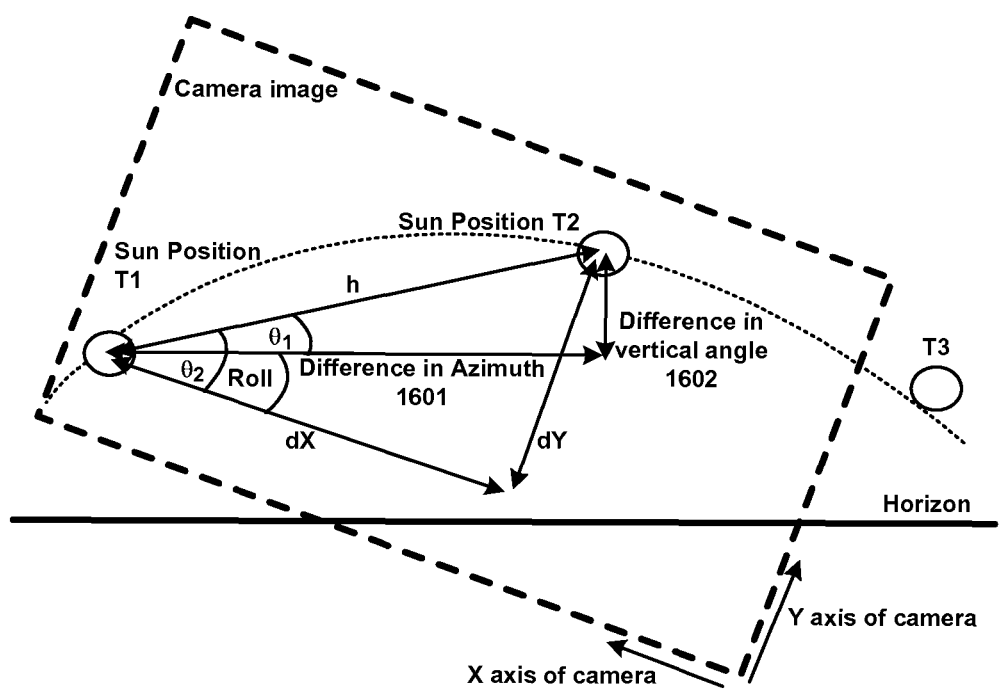
FIG. 16 is a drawing showing the arc of the sun over the course of a day.

As an example, FIG. 16 is a drawing showing the arc of the sun over the course of a day. It also shows the location of the sun on images on a stationary camera (with a normal lens, not a fish-eye lens). The camera is not level. The azimuth and vertical angle of the sun can be determined from a solar almanac for given times. Thus the differences in azimuth 1601 and the difference in vertical angle 1602 are known for measurements at two times T1 and T2.

The camera image can act as an independent measurement of angles. dX and dY are the differences in pixels of the sun's location at the two times, assuming the camera is stationary. With a well-calibrated camera, dX and dY subtend known angles. The roll angle can be calculated as follows:

let $dX_{angle} = dX$ converted from pixels to angle and $dY_{angle} = dY$ converted from pixels to angle $\tan \Gamma_1$ = (Difference in Vertical Angle)/(Difference in Azimuth)

$\tan \Gamma_2 = dY_{angle}/dX_{angle}$      Equation (8)

then Roll = $\theta_2 - \theta_1$      Equation (9)

Then any other difference in X and Y, measured from the image, can be converted to a difference in azimuth 1601 and a difference in vertical angle 1602.

$\theta_2 = \arctan(dY_{angle}/dX_{angle})$ $\theta_1 = \text{Roll} - \theta_2$ $h = \sqrt{(dX^2 + dY^2)}$ Difference in Vertical Angle = $h \cdot \cos \theta_1$      Equation (10)

Difference in Azimuth = $h \cdot \tan \theta_1$      Equation (11)

FIG. 16 represents a calibrated image from a standard camera lens. A fish-eye lens projects the scene onto the image sensor differently, but it can still be used to measure angle differences in its X and Y axes. Thus the formulation above also holds for lenses with a very wide field of view.

One advantage is that this method is not affected by possible variations in polarization, or shortcomings of a polarization model. Another advantage is the increased precision from averaging a large number of samples. In addition, there is no need to calculate polarization models.

Leveling and Sighting

When calibrating a polarization device as a static differential reference (e.g., polarization reference source 120), it need not be manually leveled; it just needs to be stationary and aimed at the sky. The sun/sky observations are used to calculate the absolute orientation of the image sensor used by polarization reference source 120) in that configuration.

When calibrating a mobile device such as device 100, then it is also necessary to calculate the relationship of the polarization sensor 101 to the vector of the associated visual sighting device 103, or to the instrument body of device 100. Therefore the latter vector can be determined during calibration. This can be achieved by setting up over a known point, leveling, and sighting another point with known 3D coordinates to capture an elevation angle and azimuth to the known point, or by using a fixture that holds the device body in a known orientation, during the sky/sun calibration process.

Other celestial objects such as the moon, planets or selected stars could be tracked if required, but the sun is much easier to identify automatically because of its unique brightness. And, conveniently, it is available during normal working hours.

Accuracy

Some applications such as navigation only require a few degrees of orientation accuracy. However many other applications such as remote survey measurement require much higher accuracy, and are the motivation for the differential sky polarization approach. Accuracy is affected by timing, image resolution, baseline, and correlation performance.

Timing

The sun appears to move across the sky at roughly 15 arc-seconds per second of time. This speed varies on the season, the latitude, and the time of day. But clearly, precise time-tagging of measurements is important to achieve survey-grade orientation accuracy of 0.5-10 arc-seconds.

Partial Sky Visibility

This method should work even when only relatively small patches of sky are visible. It is better than matching a model, as the models include large expanses with very little variation, whereas real measurements will include small variations that can provide matchable texture. Of course, accuracy will suffer if the sky visibility is restricted so much that insufficient texture is available.

Precision of Correlation

It seems obvious that correlation performance affects accuracy. But most pairs of measurements will have various kinds of differences such as occlusions and noise, and some correlation algorithms will perform better than others. Choice of algorithm will affect accuracy.

Baseline

An underlying assumption is that the sky polarization pattern will be similar enough in the two locations, for matching to achieve the accuracy required. The baseline distance between the two devices will affect this assumption. In clear conditions the similarity assumption holds over relatively long distances, which are still only a small fraction of the earth's radius. Under conditions with significant local variation, such as some types of cloud and pollution, the baseline will be more restricted in order to achieve a given orientation accuracy.

High accuracy GNSS systems also use differential corrections, usually via one or more reference stations, which transfer measurements either for real-time differential correction or for post-processing. A very convenient solution would be to establish a reference polarization measurement device at the same location as each GNSS base station, sharing the same communications channel and computer processor, and using the GNSS location and time in the ephemeris calculation.

VRS (Virtual Reference Station)

Some GNSS reference implementations establish a network of base stations, model the errors over the coverage area, and create synthetic 'local' corrections for each client mobile GNSS device. This is known as a Virtual Reference Station (VRS). This principle can be applied to polarization: polarization can be measured at various locations, such as at a plurality of polarization reference sources 120, across the network area, and synthetic local polarization values can be calculated for the location of each mobile device 100 within the coverage area. The synthetic values can be calculated from interpolation, or modelling such as monitoring the differences over time and space between the actual values and the Rayleigh predictions.

Minimization of Data Transfer

A simple reference differential system could transfer the entire reference measurement dataset whenever device 100 needs to calculate its orientation (or store this data for processing later). But many applications demand a relatively high update rate, which would require a prohibitively high data transfer rate. There are several ways to minimize the amount of data to be transferred.

Resolution

The data transfer rate is directly related to the resolution of the static sensor (e.g., polarization sensor 1901 of FIG. 19), so it may be optimal to use a lower resolution polarization sensor 1901 at polarization reference source 120, or to reduce resolution of the data, or to transmit a smaller sample of the measurement. This needs to be balanced with accuracy requirements, because orientation accuracy is dependent on resolution. Reducing the update rate (the frequency at which orientation is calculated) will minimize the number of times data must be transferred, and hence will directly improve the bandwidth consumption.

Compression

One simple compression method is to only transmit pixel values that have a large change from the previous frame. Another method is to calculate spatial and temporal differences from a model (Rayleigh etc), and only transmit the differences that are larger than a threshold. That avoids transmitting a lot of pixel values that simply follow the model, although it requires the device 100 to calculate the model values and then apply the differences.

Image/Video Compression

As the measurement data values are similar to an image, then standard image compression techniques can be used. Each static measurement can be compressed using a variety of algorithms, such as JPEG. Or successive static measurements can be treated as video, and compressed with an algorithm such as MPEG. Also, as many compression algorithms use variants of Fourier transforms, and the image correlation can also use Fourier techniques, there may be efficiencies to be gained here, such as avoiding to-and-fro conversion of data.

Predictive Modelling

It is also possible to implement custom compression that takes advantage of known properties of the data. One example is to account for the motion of the sun over time. This is predictable from the ephemeris, and of course the polarization pattern moves accordingly, even over short time spans. Therefore the mobile device can create synthetic extrapolated reference data by calculating the motion of the sun since the last actual reference data received, and rotating and translating the reference data accordingly, as a good prediction of the likely polarization pattern.

Autonomous Relative Updates

Another method of extrapolation (for the purposes of minimization of data transfer) is to calculate autonomous relative orientation updates for the duration between reference data frames. The most recent mobile data frame is correlated with the previous mobile data frame (instead of comparing with the reference). This allows a relatively high update rate without a correspondingly high rate of data transmission from the reference device. The arrival of the next reference data frame will enable the absolute orientation to be recalculated to reset any drift. To achieve the highest accuracy, the autonomous relative correlations should account for the movement of the sun during the interval between mobile measurements; this information is available from the almanac. This method combines the two differential techniques (autonomous relative updates and absolute referenced differential orientation), to achieve a high update rate with low data transfer rate.

Sensor Fusion

Some applications such as machine control require orientation to be calculated at a high rate such as 10 Hz, with minimal latency. An optimal solution could be to add sensors such as MEMS gyroscopes, which make frequent measurements of relative orientation changes. To meet the requirements of the application these other sensor values can be combined in a Kalman filter with the sky polarization orientation values, which may be less frequent but which drift less over time and can provide absolute orientation. Other sensors can also be combined, such as GNSS which adds absolute geographical location and precise time.

Night Operation

Another advantage of the differential approach is that it allows some operation at night. The solar polarization effect continues well after dusk and before dawn. The polarization of moonlight causes a similar effect which, although 100 million times less intense, is known to be used successfully by dung beetles for navigation. Of course success is unlikely during moonless nights.

An important advantage of the differential approach is that it allows orientation differences to be calculated just by observing whatever polarization pattern is present, without requiring a solar or lunar ephemeris or polarization model. More advanced methods may need a solar or lunar ephemeris, in order to predict the motion of the sun or moon over time.

Example Orientation Determiner

Figure 11A:
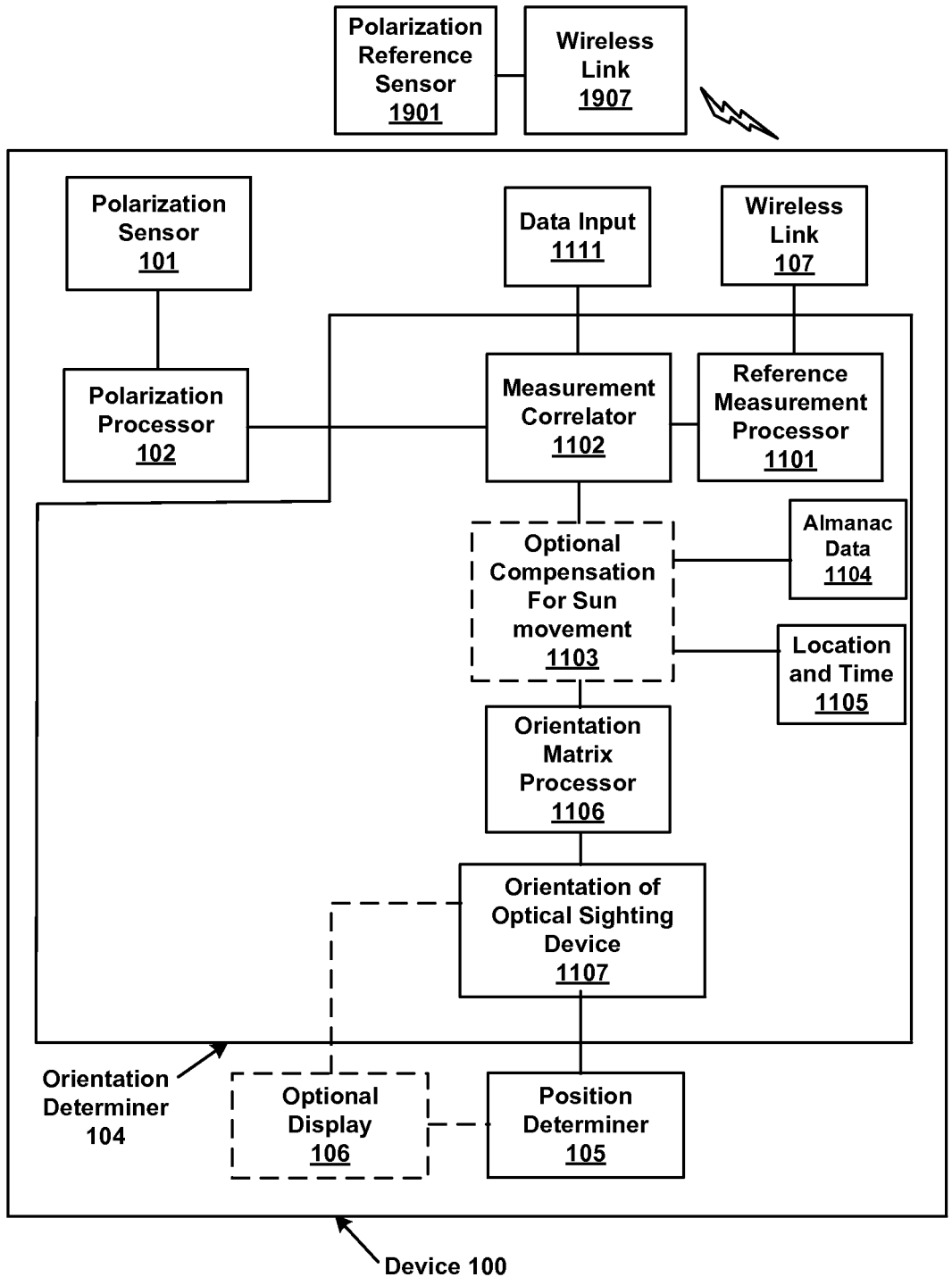
FIG. 11A is a block diagram of functional elements that comprise an orientation determiner in accordance with an embodiment.

FIG. 11A is a block diagram of an example orientation determiner in accordance with one or more embodiments. In the embodiment of FIG. 11A, orientation determiner 104 receives a time-tagged sky polarization dataset from the polarization processor 103. It also receives a time-tagged reference sky polarization dataset with known orientation information from polarization reference sensor 1901 which is a component of polarization reference source 120. It is noted that in one embodiment, the time tagging of the sky polarization dataset from polarization sensor 101, and the reference sky polarization dataset, are respectively time tagged by polarization processor 103 and reference measurement processor 1101. In this embodiment, the just-captured sky polarization dataset from polarization sensor 101 is correlated with the reference sky polarization dataset from polarization reference source 120 by measurement correlator 1102. Correlation determines the rotations for the three axes to achieve the best-fit match between the two sky polarization datasets. The negatives of the rotations about the three axes of X, Y, and Z that result in a match represent the difference in orientation between the two polarization sensors which captured the data (e.g., polarization sensor 101 of device 100 and polarization sensor 1901 of FIG. 19). If the time tag of device 100 and the reference sky polarization dataset time-tag are not identical or within a predetermined time span, then optionally the orientation difference can be compensated (e.g., at 1103 of FIG. 11A) for movement of the sun. This uses the location of device 100 and time, looks up a solar almanac 1104 and the location and time at which the sky polarization dataset was captured at device 100, determines the azimuth and elevation of the sun at those two times, and calculates an orientation difference. In FIG. 11A, data input 1111 is configured to receive data such as the current date/time and location of device 100. This can be generated by, for example, GNSS receiver 111, or manually input. In at least one embodiment, this data is automatically recorded when polarization sensor 101 captures a measurement of sky polarization data. The orientation processor takes these orientation differences, applies them to the known absolute orientation of the reference sky polarization dataset, and calculates the absolute orientation of device 100. The rotation matrices are applied by orientation matrix processor 1106 described in Equation 12 below:

$$R^U_M = R^U_R R^R_M R^S_T \quad \text{Equation 12}$$

where $R^U_M$ is a matrix describing the mobile device orientation $R^U_R$ is a matrix describing the reference device orientation $R^R_M$ is a matrix describing the orientation difference between reference and mobile devices.

$R^S_T$ is a matrix describing the orientation difference caused by motion of the sun over the duration between reference and mobile devices.

Using this data, the orientation of an optical sighting device (e.g., visual sighting device 103) can be determined at 1107 and output to either, or both of, display 106 and position determiner 105.

Figure 11B:
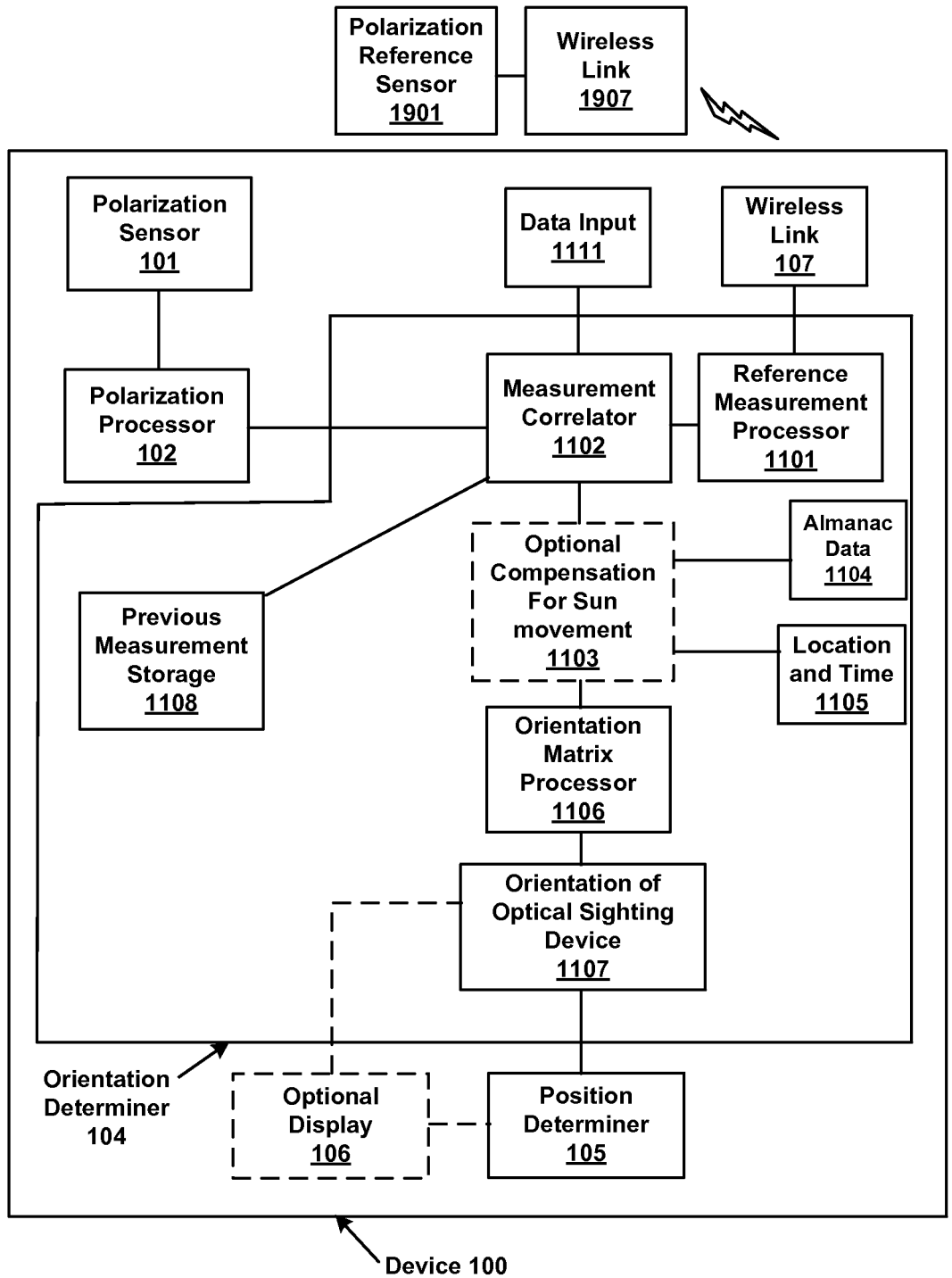
FIG. 11B block diagram of functional elements that comprise an orientation determiner in accordance with an embodiment.

FIG. 11B is a block diagram of an example orientation determiner in accordance with one or more embodiments. In FIG. 11B, shows the addition of storage for previous mobile measurements 1108. In at least one embodiment, if there is no recent reference measurement of sky polarization received from polarization reference source 120, then a new measurement of sky polarization performed by device 100 can be correlated with a previous measurement of sky polarization performed by device 100. This gives the difference in orientation of device 100 from the previous measurement, which can also be compensated for sun movement, to give a good approximation of absolute orientation.

Figure 11C:
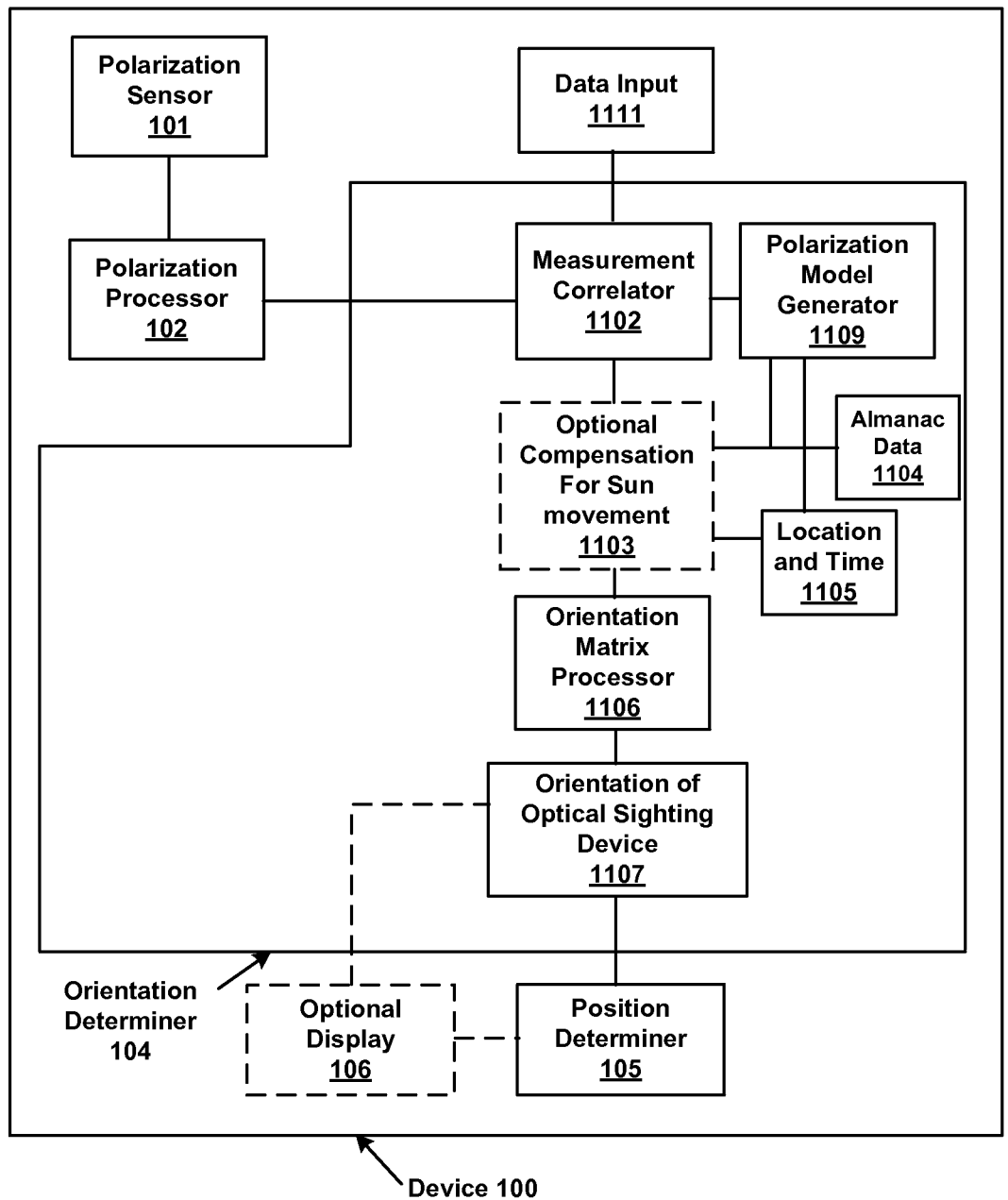
FIG. 11C block diagram of functional elements that comprise an orientation determiner in accordance with an embodiment.

FIG. 11C is a block diagram of an example orientation determiner in accordance with one or more embodiments. In the embodiment of FIG. 11C, when using a polarization model (e.g., a Rayleigh sky model) and no reference measurement, a sun almanac 1104 is stored locally, and used by polarization model generator 1109 to generate a polarization model for the location of device 100 at that time. The polarization measurement captured using polarization sensor 101 is correlated with the model generated by device 100 to determine the absolute orientation of visual sighting device 103. To avoid a new model being generated for every update, the same model can be used for a number of successive measurements, especially if the correlation result is compensated for the sun movement between those times.

Example Computer System Environment

Figure 12:
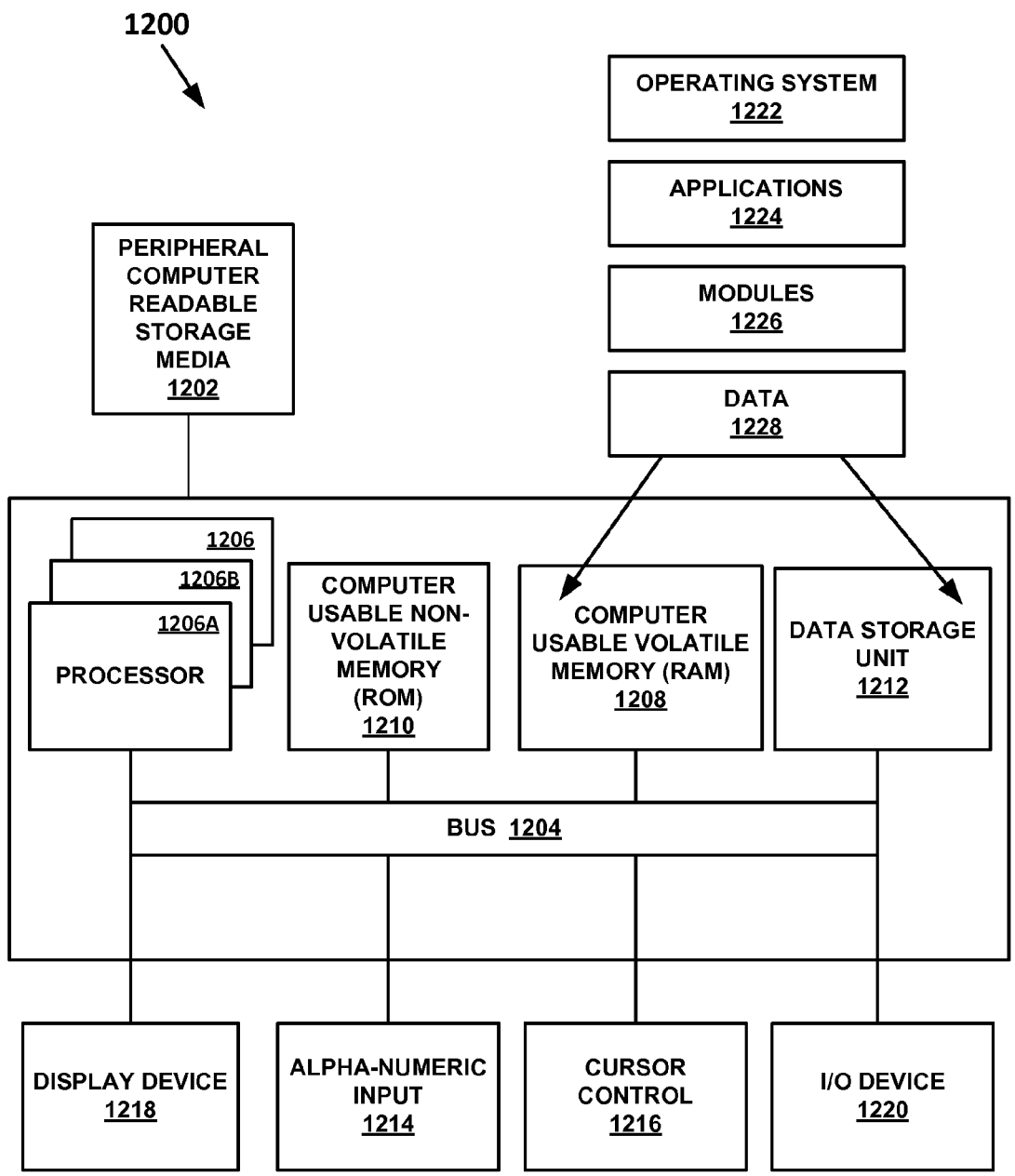
FIG. 12 is a block diagram of an example computer system that can be used in accordance with various embodiments.

With reference now to FIG. 12, all or portions of some embodiments described herein are composed of computer-readable and computer-executable instructions that reside, for example, in computer-usable/computer-readable storage media of a computer system. That is, FIG. 12 illustrates one example of a type of computer (computer system 1200) that can be used in accordance with or to implement various embodiments which are discussed herein. It is noted that the computer system discussed with reference to FIG. 12 can be implemented as device 100 and as polarization reference source 120. It is appreciated that computer system 1200 of FIG. 12 is only an example and that embodiments as described herein can operate on or within a number of different computer systems including, but not limited to, general purpose networked computer systems, embedded computer systems, server devices, various intermediate devices/nodes, stand alone computer systems, handheld computer systems, multi-media devices, and the like. Computer system 1200 of FIG. 12 is well adapted to having peripheral computer-readable storage media 1202 such as, for example, a floppy disk, a compact disc, digital versatile disc, universal serial bus "thumb" drive, removable memory card, and the like coupled thereto.

Computer system 1200 of FIG. 12 includes an address/data bus 1204 for communicating information, and a processor 1206A coupled to bus 1204 for processing information and instructions. As depicted in FIG. 12, system 1200 is also well suited to a multi-processor environment in which a plurality of processors 1206A, 1206B, and 1206C are present. Conversely, system 1200 is also well suited to having a single processor such as, for example, processor 1206A. Processors 1206A, 1206B, and 1206C may be any of various types of microprocessors. System 1200 also includes data storage features such as a computer usable volatile memory 1208, e.g., random access memory (RAM), coupled to bus 1204 for storing information and instructions for processors 1206A, 1206B, and 1206C. System 1200 also includes computer usable non-volatile memory 1210, e.g., read only memory (ROM), coupled to bus 1204 for storing static information and instructions for processors 1206A, 1206B, and 1206C. Also present in system 1200 is a data storage unit 1212 (e.g., a magnetic or optical disk and disk drive) coupled to bus 1204 for storing information and instructions. System 1200 also includes an optional alphanumeric input device 1214 including alphanumeric and function keys coupled to bus 1204 for communicating information and command selections to processor 1206A or processors 1206A, 1206B, and 1206C. System 1200 also includes an optional cursor control device 1216 coupled to bus 1204 for communicating user input information and command selections to processor 1206A or processors 1206A, 1206B, and 1206C. In one embodiment, system 1200 also includes an optional display device 1218 (e.g., display 106 of FIG. 1A) coupled to bus 1204 for displaying information.

Referring still to FIG. 12, optional display device 1218 of FIG. 12 may be a liquid crystal device, cathode ray tube, plasma display device or other display device suitable for creating graphic images and alphanumeric characters recognizable to a user. Optional cursor control device 1216 allows the computer user to dynamically signal the movement of a visible symbol (cursor) on a display screen of display device 1218 and indicate user selections of selectable items displayed on display device 1218. Many implementations of cursor control device 1216 are known in the art including a trackball, mouse, touch pad, joystick or special keys on alphanumeric input device 1214 capable of signaling movement of a given direction or manner of displacement. Alternatively, it will be appreciated that a cursor can be directed and/or activated via input from alphanumeric input device 1214 using special keys and key sequence commands. System 1200 is also well suited to having a cursor directed by other means such as, for example, voice commands. System 1200 also includes an I/O device 1220 for coupling system 1200 with external entities. For example, in one embodiment, I/O device 1220 is a modem for enabling wired or wireless communications between system 1200 and an external network such as, but not limited to, the Internet.

Referring still to FIG. 12, various other components are depicted for system 1200. Specifically, when present, an operating system 1222, applications 1224, modules 1226, and data 1228 are shown as typically residing in one or some combination of computer usable volatile memory 1208 (e.g., RAM), computer usable non-volatile memory 1210 (e.g., ROM), and data storage unit 1212. In some embodiments, all or portions of various embodiments described herein are stored, for example, as an application 1224 and/or module 1226 in memory locations within RAM 1208, computer-readable storage media within data storage unit 1212, peripheral computer-readable storage media 1202, and/or other tangible computer readable storage media. In one or more embodiments, computer system 1200, or alternatively polarization processor 102, is configured to translate sky polarization data into an orientation of device 100 in a coordinate system visual sighting device 103. In at least one embodiment, computer system 1200, or alternatively polarization processor 102, is configured to translate sky polarization data into the WGS-84 coordinate system. However, it is noted that various embodiments are not limited to the WGS-84 coordinate system alone and can utilize various coordinate systems known in the art. In another embodiment, the sky polarization data is translated into a local coordinate system.

Some Example Methods of Operation and Embodiments

Figure 13A:
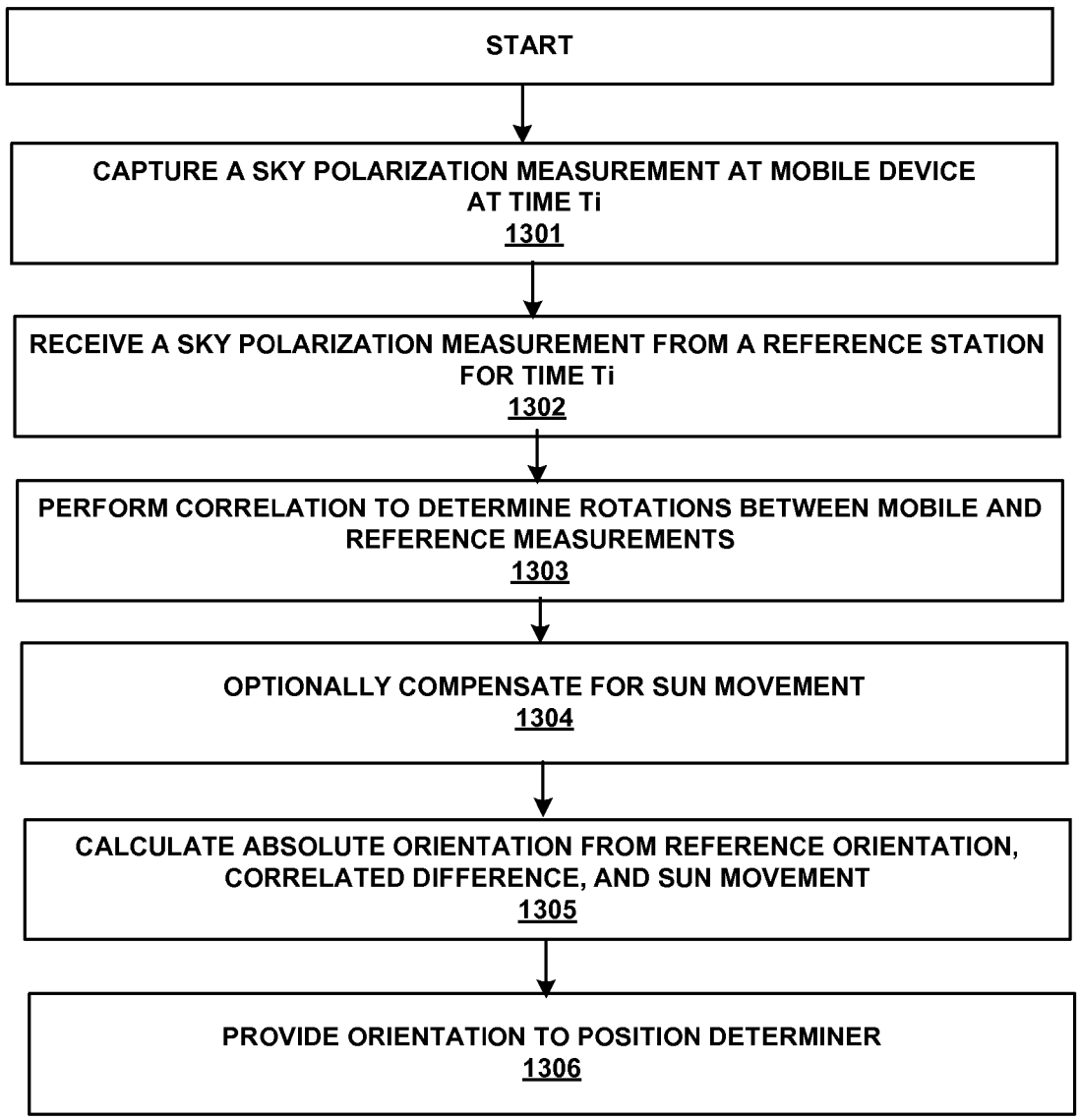
FIGS. 13A and 13B are flowcharts demonstrating the steps used to obtain an orientation of a visual sighting device via analysis of sky polarization data in accordance with various embodiments.
Figure 13B:
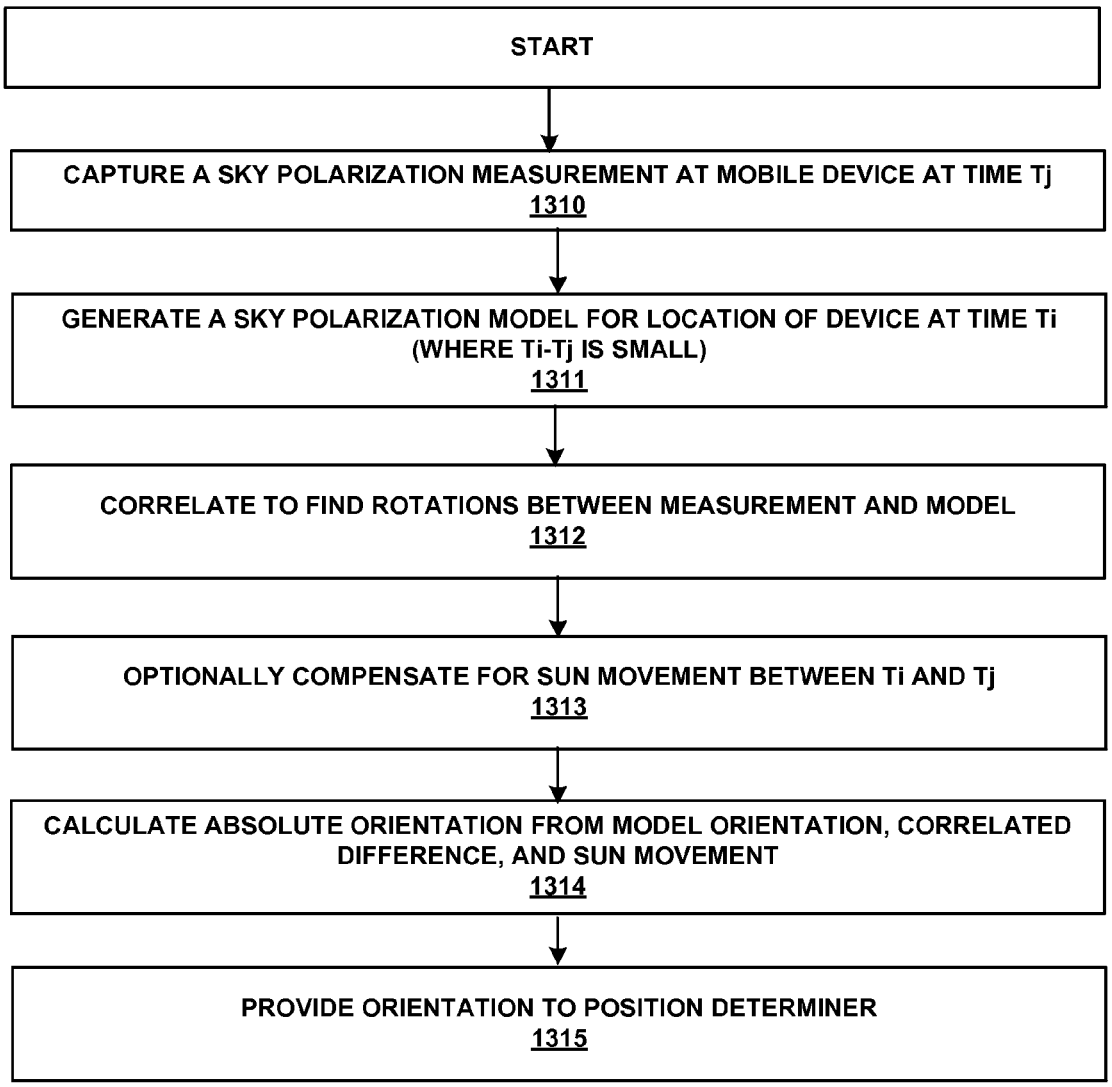

FIGS. 13A and 13B are flowcharts demonstrating the steps used to obtain an orientation of a visual sighting device via analysis of sky polarization data. FIG. 13A describes the case where polarization reference source 120 supplies reference data to enable the absolute orientation of visual sighting device 103 to be calculated. In operation 1301, a sky polarization measurement is captured at device 100 at a time Ti. In operation 1302, a sky polarization measurement is received from a reference station (e.g., polarization reference source 120) for time Ti. In operation 1303, a correlation to determine rotations between the sky polarization measurement captured at device 100 and the reference sky polarization received from polarization reference source 120 is performed. In operation 1304, an optional calculation to compensate for the movement of the sun is performed. In operation 1305, an absolute orientation of visual sighting device 103 is calculated based upon the orientation of polarization reference source 120, the correlated difference between the sky polarization measurement captured at device 100 and the reference sky polarization received from polarization reference source 120, and the movement of the sun. In operation 1306, the absolute orientation of visual sighting device 103 is provided to position determiner 105.

FIG. 13B describes a case where orientation determiner 104 generates a polarization model and no reference measurement (e.g., from polarization reference source 120) is required. In operation 1310, a sky polarization measurement is captured at device 100 at a time Tj. In operation 1311, device 100 generates a sky polarization model (e.g., a Rayleigh sky model) for the location at which device 100 is located for a time Tj. In operation 1312, a correlation to determine rotations between the sky polarization measurement captured at device 100 and the model of sky polarization generated by device 100 is performed. In operation 1313, an optional calculation to compensate for the movement of the sun is performed. In operation 1314, an absolute orientation of visual sighting device 103 is calculated based upon the orientation of the sky polarization model generated by device 100, the correlated difference between the sky polarization measurement captured at device 100 and the sky polarization model generated by device 100, and the movement of the sun. In operation 1315, the absolute orientation of visual sighting device 103 is provided to position determiner 105

FIG. 14 is a flow chart demonstrating a process for obtaining an incremental update to orientation based on sky polarization data in accordance with at least one embodiment. In operation 1401, a reference sky polarization data set measured at a first time Ti is received by device 100. In operation 1402, a sky polarization data set is acquired at a second time Tj by device 100. In operation 1403, the two sky polarization data sets are processed to determine the difference in orientation between them. In operation 1404, the difference in orientation is provided as orientation parameters for device 100 at time Tj. In operation 1405, the orientation parameters are used to provide a direction relative to a reference point on device 100.

FIG. 15A is a flow chart for determining a location with a visual sighting device in accordance to one embodiment. In the method described in FIG. 15A, a single set of sky polarization reference data from polarization reference source 120 can be used to determine multiple instances of the absolute orientation of visual sighting device 103. In operation 1501, a visual sighting device (e.g., 103 of device 100) is used to sight to a target. In operation 1502, a range measurement to the target (e.g., using range distance component 108) and a sky polarization measurement (e.g., using polarization sensor 101) are acquired by device 100. In operation 1503, the absolute orientation of visual sighting device 103 is determined by correlating a sky polarization measurement with a model of sky polarization using orientation determiner 104. In operation 1504, a vector is determined from visual sighting device 103 to a target based on the range measurement and orientations of device 100. In operation 1505, the geolocation of visual sighting device 103 is determined using a GNSS receiver 111. In operation 1506, the geolocation of the target is determined by position determiner 105 by vector addition from the geolocation of visual sighting device 103.

FIG. 15B is a flow chart for determining a location with a visual sighting device in accordance to one embodiment. In the method described in FIG. 15B, a location can be determined with a visual sighting device using a sky polarization measurement from a mobile device and from a reference source. In operation 1511, visual sighting device 103 is used to sight a first target. In operation 1512, range distance component 108 is used to acquire a range measurement to a target and polarization sensor 101 is used to acquire a sky polarization measurement. In operation 1513, a measurement of sky polarization is acquired from a reference device (e.g., polarization reference source 120) having a known absolute orientation. In operation 1514, the sky polarization measurements acquired by device 100 and polarization reference source 120 are correlated to determine the absolute orientation of visual sighting device 103. In operation 1515, a vector from visual sighting device 103 to the target is determined based upon the range measurement and absolute orientation of visual sighting device 103. In operation 1516, the geolocation of visual sighting device 103 is optionally determined using GNSS receiver 111. In operation 1517, the geolocation of the target is optionally determined using position determiner 105 to perform vector addition from the geolocation of device 100.

FIG. 15C is a flow chart for determining a location with a visual sighting device in accordance to one embodiment. In operation 1521, the absolute orientation of visual sighting device 103 is established by setting a reference polarization source 120 up over a known point, sighting a known backsight, and measuring a reference sky polarization (e.g., using polarization sensor 1901 of FIG. 19). In operation 1522, visual sighting device 103 is used to sight a first target. In operation 1523, a range measurement is acquired to the target using range distance component 108 and a sky polarization measurement is acquired using polarization sensor 101. In operation 1524, the absolute orientation to the target is determined using orientation determiner 104 to correlate the reference sky polarization measurement from polarization reference source 120 and the sky polarization measurement acquired by device 100. In operation 1525, a vector from visual sighting device 103 to the target is determined based on the range measurement acquired by device 100 and the absolute orientation determined by orientation determiner 104. In operation 1526, the geolocation of visual sighting device 103 is optionally determined using GNSS receiver 111. In operation 1527, the geolocation of the target is optionally determined using position determiner 105 to perform vector addition from the geolocation of device 100.

As discussed above another calibration method used in various embodiments utilizes sun-shots over the course of a day. In accordance with one embodiment, multiple sun-shot measurements are taken over the course of a day, as the sun's location (azimuth and elevation angle) moves across an arc of the sky. Each individual sun-shot resolves two unknowns (azimuth and elevation angle), so only two sun-shots (preferably at widely spaced times) are needed to resolve the 3-axis orientation of device 100 or polarization reference source 120. Additionally, extra information from subsequent sun-shots can be averaged to increase precision.

As an example, FIG. 16 is a drawing showing the arc of the sun over the course of a day. It also shows the location of the sun on images on a stationary camera (with a normal lens, not a fish-eye lens). The camera is not level. The azimuth and vertical angle of the sun can be determined from a solar almanac for given times. Thus the differences in azimuth 1601 and the difference in vertical angle 1602 are known for measurements at two times T1 and T2. The roll angle of device 100 can be determined using equation 9 discussed above. The difference in vertical angle 1602 can be determined using equation 10 discussed above while the difference in azimuth 1601 can be determined using equation 11 discussed above.

Figure 17:
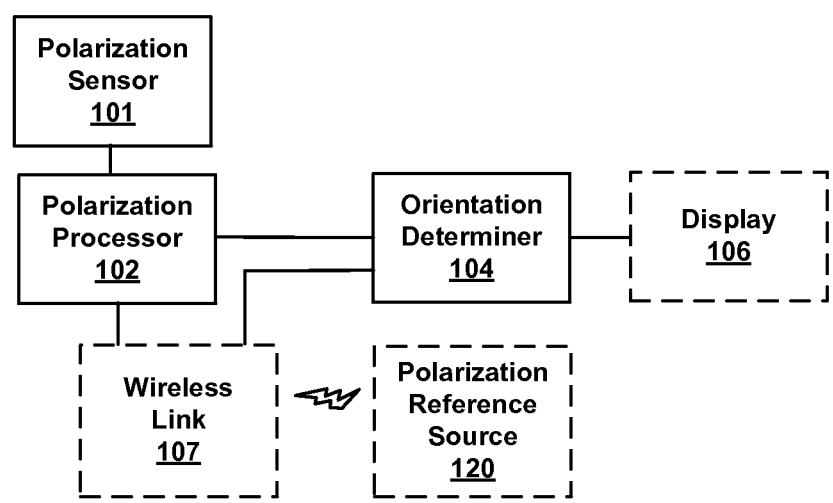
FIG. 17 is a block diagram of an example device utilizing a sky polarization sensor for absolute orientation determination in accordance with one embodiment.

FIG. 17 is a block diagram of an example device utilizing a sky polarization sensor for absolute orientation determination in accordance with one embodiment. In the embodiment of FIG. 17, device 100 comprises a sky polarization-based compass and orientation determiner, associated with a platform. In FIG. 17, the polarization-based compass comprises a polarization sensor 101, a polarization processor 102, an orientation determiner 104, and optionally may incorporate a reference polarization image from a polarization reference source 120 acquired either via wireless link 107 or by direct connection prior to undertaking a trip. Optionally the orientation data such as the current platform direction relative to True North may be presented on display 106.

Figure 18:
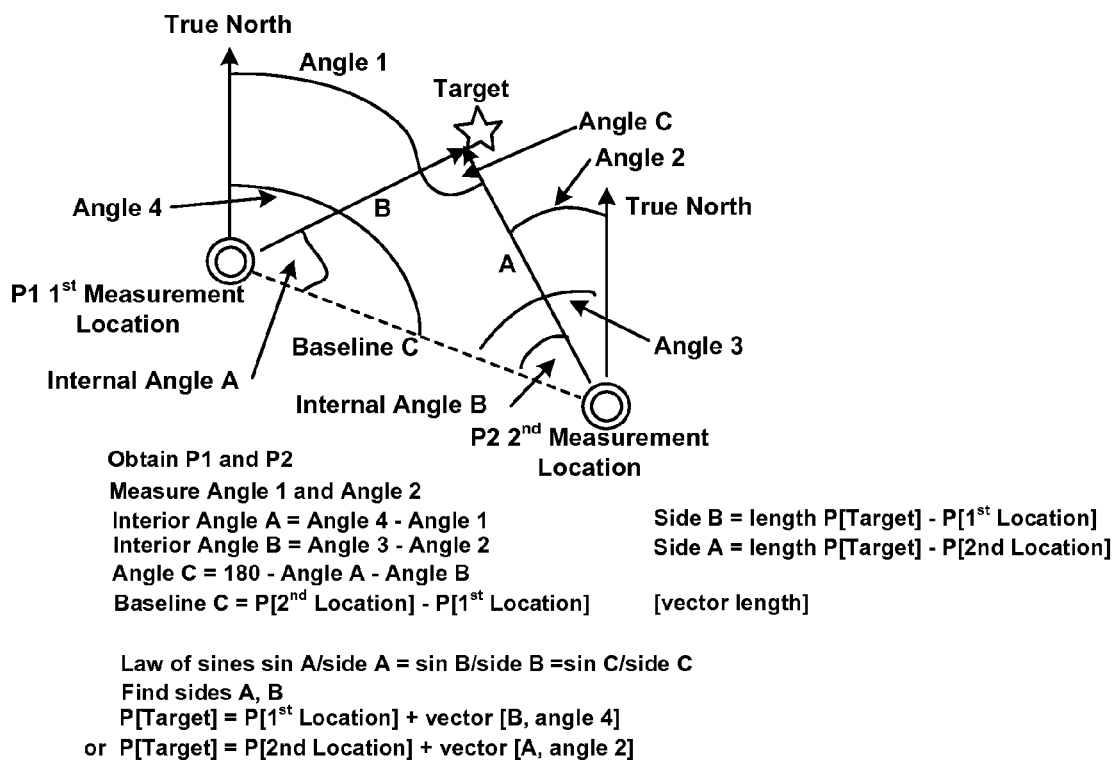
FIG. 18 is a diagram demonstrating finding target position without EDM measurements in accordance with one embodiment.

FIG. 18 is a diagram demonstrating an embodiment. The embodiment comprises the use of a visual sighting device without an EDM for measuring distance to a target, and demonstrates how a user can determine the location of a remote target by measuring two angles relative to true north, from two spaced apart locations with known positions, using basic geometry and the law of sines. In FIG. 18, P1 comprises the determined position of device 100 when measuring angle 1 to the target. In accordance with various embodiments, absolute orientation of visual sighting device 103 is accomplished using sky polarization measurements acquired by device 100 and correlating them with either a sky polarization model (e.g., received from polarization reference source 120 or generated by orientation determiner 104) and/or sky polarization measurements received from polarization reference source 120. A similar determination of P2 is made at a second location and angle 2 to the target is measured. A baseline C, which is the distance between P1 and P2, is then derived. Angle 3, which is the angle from True North at P2 to the derived baseline, is then determined and angle 4, which is the angle from True North at P1 to the derived baseline, is determined. Interior angle A is determined by subtracting angle 1 from angle 4. Interior angle B is determined by subtracting angle 2 from angle 3. Interior angle C is determined by subtracting angle A and angle B from 180 degrees. Because angle C and the length of baseline C are known, the law of sines can be used to derive sides A and B as interior angles A and B are already known. The location of the target can be determined by adding the vector B to the measurement P1, or by adding the vector A to the measurement P2.

Example Polarization Reference Source

Figure 19:
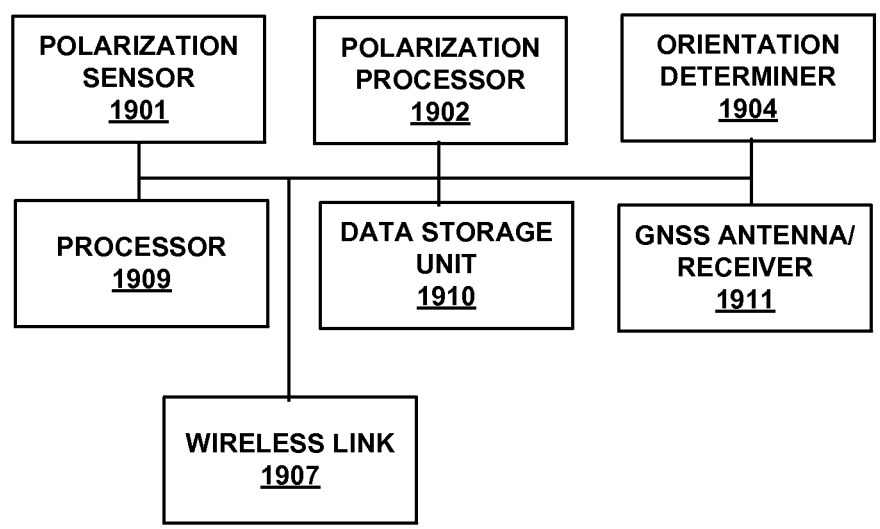
FIG. 19 is a block diagram of an example polarization reference source in accordance with an embodiment.

FIG. 19 is a block diagram of an example polarization reference source 120 in accordance with one or more embodiments. In the embodiment of FIG. 19, polarization reference source 120 comprises a polarization sensor 1901, a polarization processor 1902, an orientation determiner 1904, a wireless link 1907, a processor 1909, a data storage unit 1910, and a GNSS antenna/receiver 1911. As described above with reference to at least FIG. 1A, polarization sensor 1901 is configured to capture a reference measurement of sky polarization at the location of polarization reference source 120. In at least one embodiment, polarization processor 1902 and orientation determiner 1904 can be used to determine difference between the reference measurement of sky polarization captured by polarization sensor 1901 and a received sky polarization measurement captured by device 100 using polarization sensor 101. Thus, in at least one embodiment, polarization reference source 120 is configured to determine the absolute orientation of device 100 remotely and forward this information back to device 100 to facilitate determining the location of a target. Alternatively, device 100 can send other data such as its position and range to the target as well, in which case polarization reference source 120 can determine the location of the target based upon the position of device 100, the range to the target, and the orientation of device 100. In one or more embodiments, the absolute orientation of polarization reference source 120 is known and stored in data storage unit 1910. This absolute orientation information can be sent, along with the reference measurement of sky polarization captured at polarization reference source 120, to device 100 to facilitate determining the absolute orientation of device 100 as described above. In another embodiment, processor 1909 can be used to generate a model of sky polarization, such as a Rayleigh model, and forward this to device 100. In at least one embodiment, polarization reference source 120 comprises a mobile station. For example, as described above, GNSS-based devices using multiple antennae can also be used to determine absolute orientation. While this may not be practical for handheld devices, a vehicle can use multiple antennae to determine the absolute orientation of the vehicle. In at least one embodiment, GNSS antenna/receiver 1911 comprises multiple antennae which facilitate determining the absolute orientation polarization reference source 120. Thus, polarization reference source 120 can be implemented as a mobile sky polarization reference source which can be driven to remote locations and provide sky polarization data to mobile devices such as device 100. In another embodiment, a mobile polarization reference source 120 can be located at a known target point and the backsighting method described above can be used to determine its absolute orientation.

In accordance with various embodiments, wireless link 1907 may operate on any suitable wireless communication protocol for communicating with device 100 including, but not limited to: WiFi, WiMAX, WWAN, implementations of the IEEE 802.11 specification, cellular, two-way radio, satellite-based cellular (e.g., via the Inmarsat or Iridium communication networks), mesh networking, implementations of the IEEE 802.15.4 specification for personal area networks, and implementations of the Bluetooth® standard.

More Example Methods of Operation

FIG. 20 is a flowchart of a method for determining absolute orientation of a platform in accordance with an embodiment. In operation 2001 a first reference sky polarization data set is measured at a first time Ti using a sky polarization sensor disposed on a platform. In operation 2002, a second sky polarization data set is obtained at a second time Tj from the sky polarization sensor. In operation 2003, a difference in orientation is determined between the first reference sky polarization data set and the second sky polarization data set using an orientation determining component. In operation 2004, the difference in orientation is provided as at least one orientation parameter for the platform at the second time Tj. In operation 2005, the at least one orientation parameter is used to provide a direction relative to a reference point on the platform.

FIG. 21 is a flowchart of a method for obtaining position data for a target in accordance with an embodiment. In operation 2101, a visual sighting device, comprising a range measurement system, and a sky polarization sensor disposed in a known spatial relationship with the visual sighting device are oriented toward a target. In operation 2102, an estimate of the orientation of the visual sighting device is generated based on sky polarization while a range measurement is captured from the visual sighting device to the target. In operation 2103, a first location is determined having a known spatial relationship to the visual sighting device. In operation 2104 an orientation of the visual sighting device and a distance to the target are acquired. In operation 2105, a location of the target is calculated based on the first location, the distance to the target, and the orientation of the visual sighting device. In one or more embodiments, the first location is determined by a resection survey process using device 100.

FIG. 22 is a flowchart of a method for obtaining position data for a target with a position determining component in accordance with an embodiment. In operation 2201, a first position is acquired using a total station comprising a sky polarization sensor having a known spatial relationship to the total station. In operation 2202, a first orientation of the total station is acquired based upon a sky polarization data set. In operation 2203, the sky polarization data set is translated into orientation information in a coordinate system at the total station. In operation 2204, a visual sighting device of the total station, with an internal distance measuring system, is used to capture a distance to a target. In operation 2205, a location of the target is calculated based on the first position, the distance to the target, and the orientation information.

FIG. 23 is a flowchart of a method for obtaining position data for a target with a position determining component in accordance with an embodiment. In operation 2301, a position determination system is provided comprising a Global Navigation Satellite System (GNSS) receiver of a position determining system is used to measure a first location. In operation 2302, a visual sighting device, further comprising an internal distance measuring system, of the position determining system is used to measure a distance to a target. In operation 2303, a sky polarization sensor of the position determining system is used to measure an orientation of the visual sighting device. In operation 2304, a location of the target is calculated based on the first position, the distance to the target, and the orientation of the visual sighting device.

FIG. 24 is a flowchart of a method for obtaining position data for a target in accordance with an embodiment. In operation 2401, a first location is determined of a visual sighting device and a sky polarization sensing device having a known spatial relationship and from which is measured a first estimate of orientation to a target based upon sky polarization. In operation 2402, a second location is determined from which is measured a second estimate of orientation to the target based upon sky polarization. In operation 2403, a position is calculated of the target based upon the first location, the first estimate of orientation to the target, the second location, and the second estimate of orientation to the target.

FIG. 25 is a flowchart of a method for determining the position of a target location in accordance with various embodiments. In operation 2510, a visual sighting device and a sky polarization sensor are oriented toward a known location wherein the visual sighting device comprises a range measurement system and is disposed in a known spatial relationship with the sky polarization sensor. In operation 2520, an estimate is generated of the absolute orientation of the visual sighting device based on sky polarization while determining a distance from the visual sighting device to the known location. In operation 2530, a set of coordinates of the known location are accessed. In operation 2540, a second spatial relationship is determined between the visual sighting device and the target when the range measurement is captured. In operation 2550, a location of the target is calculated based on the set of coordinates, the distance to said known location, the known spatial relationship, the second known spatial relationship, and the absolute orientation of visual sighting device.

Example Operating Environment

Figure 26:
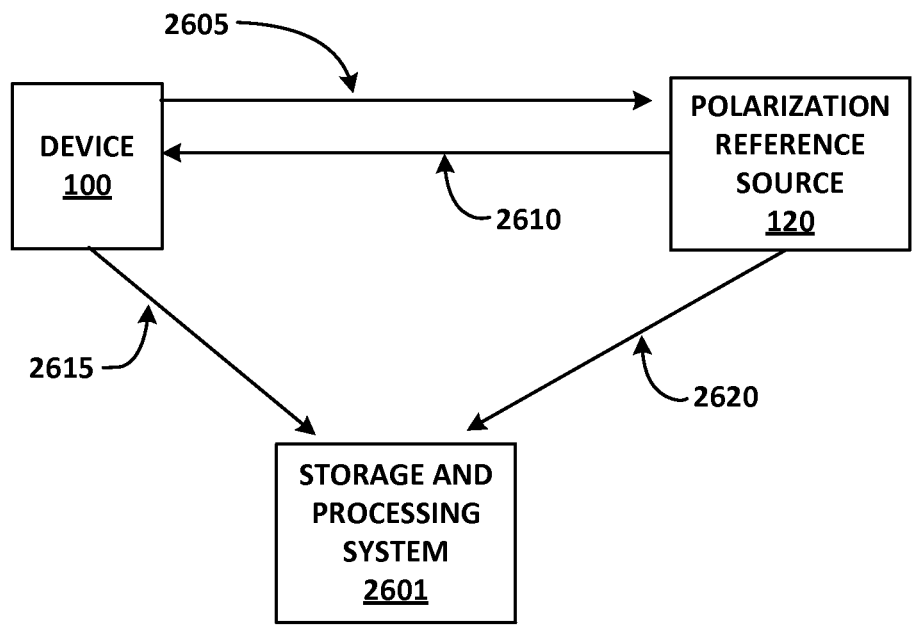
FIG. 26 is a block diagram of an example operating environment in accordance with various embodiments.

FIG. 26 is a block diagram of an example operating environment in accordance with various embodiments. In FIG. 26, device 100 is communicatively coupled with polarization reference source via a wireless communication link (e.g., 107 FIG. 1A). In one embodiment, device 100 transmits a request 2605 for sky polarization reference data to polarization reference source 120. In at least one embodiment, request 2605 comprises a time and location at which a sky polarization measurement was captured by polarization sensor 101. This data can be obtained, for example, from GNSS receiver 111. Polarization reference source 120 sends a response 2610 to device 100 conveying sky polarization reference data such as a model of expected sky polarization at the time and location specified in request 2605. Alternatively, response 2610 may be a sky polarization reference measurement comprising a second sky polarization measurement captured by polarization reference source 120 using a second polarization sensor having a known absolute orientation. In at least one embodiment, polarization reference source 120 captures a plurality of sky polarization reference measurements throughout the day and uses the one captured closest in time to the time specified in request 2605 as part of response 2610. As described above, device 100 can use the data conveyed in response 2610 in determining the absolute orientation of a component of device 100, or of device 100 itself.

In an alternative embodiment, device 100 sends data to a storage and processing system 2601 such as sky polarization measurements, time/date and location at which the sky polarization measurements were captured, relative azimuth of visual sighting device 103 to a target, or other data via message 2615. Similarly, polarization reference source 120 can send sky polarization reference data in message 2620 such as a model of expected sky polarization. Alternatively, message 2620 may comprise a sky polarization reference measurement comprising a second sky polarization measurement captured by polarization reference source 120 using a second polarization sensor having a known absolute orientation. In at least one embodiment, storage and processing system 2601 is configured to store this data in a data storage unit (e.g., 1212 of FIG. 12) and to process the data received from device 100 and polarization reference source 120. As a result, storage and processing system 2601 can determine the absolute orientation of a component of device 100, or of device 100 itself. In an embodiment, device 100 and polarization reference source 120 can send this data at regular intervals, or in response to a request from storage and processing system 2601.

Example Vehicle Control System and Example Vehicle Using Same

Figure 27:
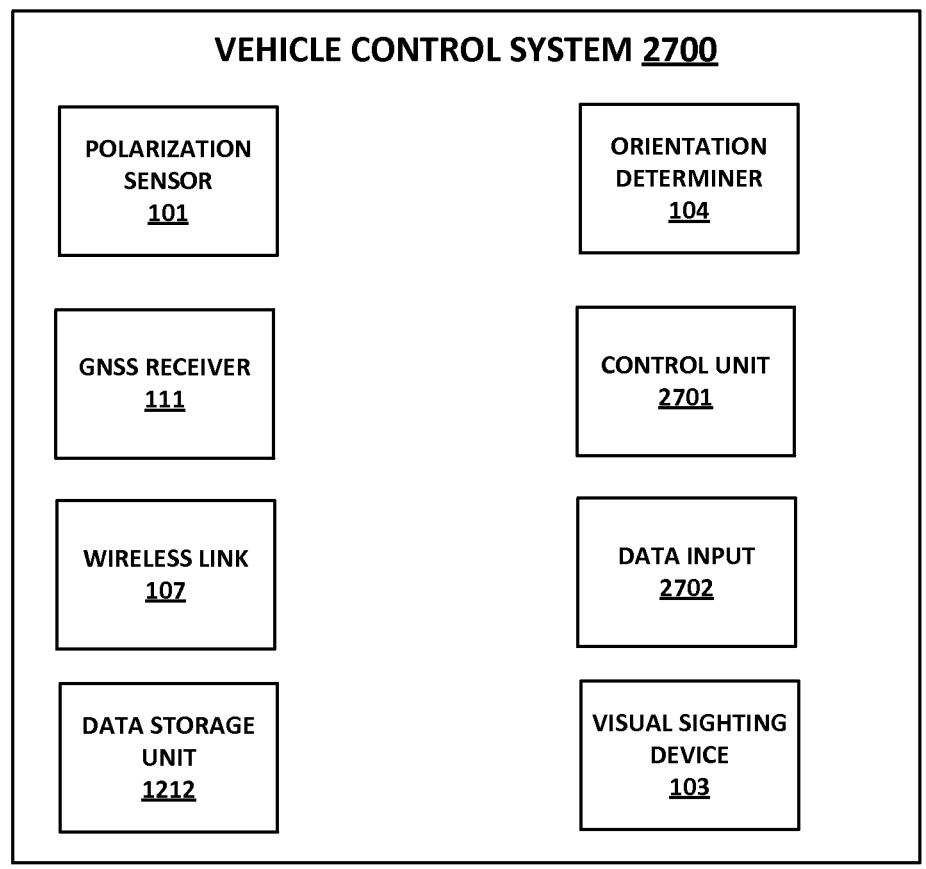
FIG. 27 is a block diagram of an example vehicle control system in accordance with various embodiments.

FIG. 27 is a block diagram of an example vehicle control system in accordance with various embodiments. In FIG. 27, vehicle control system 2700 comprises a polarization sensor 101 configured to capture measurements of sky polarization as discussed above. Vehicle control system 2700 further comprises GNSS receive 111 which is configured to provide location and time information. Vehicle control system 2700 further comprises an orientation determiner 104 configured to determine the orientation of components of vehicle control system such as polarization sensor 101, the location of antenna phase center of an antenna used by GNSS receiver 111, or other components such as a visual sighting device 103 which may be used as a sensor for vehicle control system 2700. In various embodiments, vehicle control system 2700 further comprises wireless link 107 which is configured to send and/or receive data with, for example, polarization reference source 120. It is noted that wireless link 107 may also receive commands, data, updates, etcetera, used for purposes other than sending or receiving sky polarization data. As described above, in various embodiments, vehicle control system 2700 may receive sky polarization reference data such as models of expected sky polarization and/or sky polarization reference measurements comprising a second sky polarization measurement captured by polarization reference source 120 using a second polarization sensor having a known absolute orientation. In one or more embodiments, vehicle control system 2700 comprises a data storage unit 1212 for storing data such as sky polarization measurements captured by polarization sensor 101, date/time and location data from GNSS receiver 111, a sun almanac, or a locally generated sky polarization model which can be used to determine the absolute orientation of vehicle control system 2700, or components thereof. In FIG. 27, vehicle control system 2700 further comprises a control unit 2701 which is configured to generate a command controlling an operation performed by a vehicle. For example, control unit 2701 can generate a steering command, a command to start/stop, accelerate/decelerate, or to operate a tool or implement coupled with the vehicle. It is noted that additional components such as a display 106, or an input system for a user, have not been included in FIG. 27 for the purpose of brevity.

Figure 28:
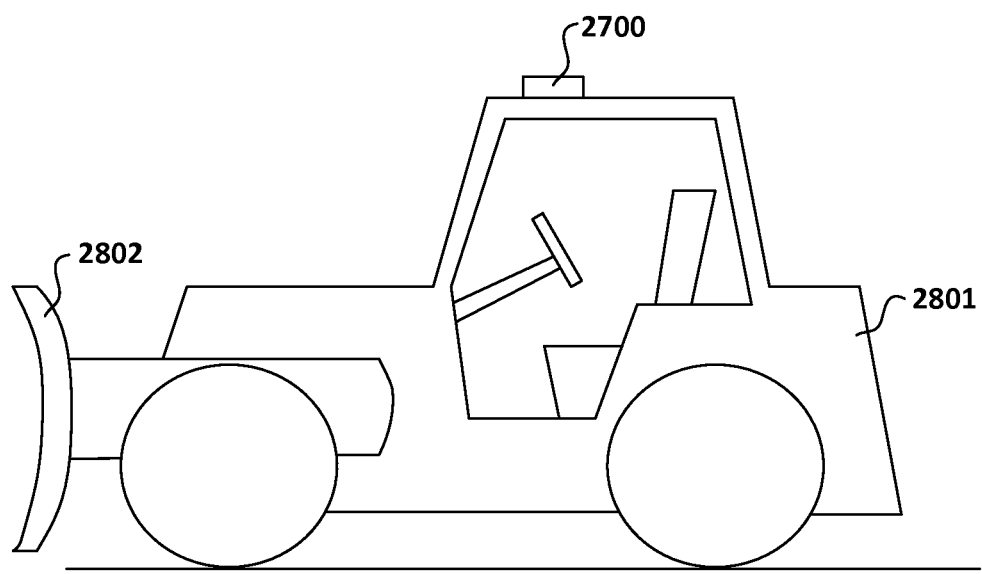
FIG. 28 illustrates an example vehicle using a vehicle control system in accordance with various embodiments

FIG. 28 illustrates an example vehicle using a vehicle control system in accordance with various embodiments. In FIG. 28, a vehicle 2801 is configured with a vehicle control system 2700 which is discussed in greater detail above with reference to FIG. 27. In one or more embodiments, vehicle control system 2700 is used to monitor and/or control operation of vehicle 2801. Furthermore, vehicle control system 2700 can be configured to report data to a separate location for the purposes of monitoring or remotely controlling the operation of vehicle 2801. In one embodiment, a visual sighting device 103 of vehicle control system 2700 is configured to monitor the operation of an implement (e.g., blade 2802) of vehicle 2801. It is noted that vehicle control system 2700 is compatible with a variety of vehicles including, but not limited to, bulldozers, skid-steer loaders, backhoes, graders, dump trucks, tractors, harvesters, cranes, forklifts, tow trucks, or the like. In one embodiment, additional vehicle control systems 2700 can be coupled directly with an implement used by vehicle 2801 such as a bulldozer blade, a plow, a trailer, or the lifting arm of a crane or other lifting device. These can provide additional control and monitoring of the implements used by vehicle 2801.

What is claimed is:

1. A method for obtaining position data for a target, comprising:
    orienting a visual sighting device and a sky polarization sensor toward a target, wherein said visual sighting device comprises a range measurement system and is disposed in a known spatial relationship with said sky polarization sensor;
    determining an absolute orientation of said visual sighting device based on a sky polarization data measurement using the sky polarization sensor;
    determining a distance from said visual sighting device to said target using the range measurement system;
    determining a position of a first location having a known spatial relationship to said visual sighting device; and
    calculating a position of said target based on said position of said first location, said distance from said visual sighting device to said target, and said absolute orientation of said visual sighting device.

2. The method of claim 1 wherein said visual sighting device comprises an optical survey instrument.

3. The method of claim 2 determining wherein said position of said first location is determined by a resection survey process with said optical survey instrument.

4. The method of claim 2 further comprising:
    establishing said visual sighting device approximately above said first location without levelling said visual sighting device and wherein there is a known distance and orientation between said first location and said optical survey instrument.

5. The method of claim 2 further comprising:
    establishing said visual sighting device vertically above said first location and leveled, and wherein there is a known distance between said first location and said optical survey instrument.

6. The method of claim 1 wherein said visual sighting device comprises an integrated electronic distance measurement (EDM) system.

7. The method of claim 1 wherein said visual sighting device further comprises a camera with a display.

8. The method of claim 1 wherein said position of said first location is determined by using a Global Navigation Satellite System (GNSS) receiver.

9. The method of claim 1 wherein said visual sighting device and sky polarization sensor are integrated with a Global Navigation Satellite System (GNSS) receiver in a known spatial relationship.

10. The method of claim 9 wherein said GNSS receiver, said visual sighting device and said sky polarization sensor are affixed to a pole in a known spatial relationship.

11. The method of claim 10 wherein said pole comprises said visual sighting device and said range measurement system.

12. The method of claim 1 further comprising:
    using a processing system to translate said sky polarization data measurement into an orientation in a coordinate system for said visual sighting device.

13. The method of claim 12 further comprising:
    translating said orientation into the World Geodetic System (WGS) 84 coordinate system.

14. The method of claim 12 wherein said processing system translates said sky polarization data measurement into a local coordinate system.

15. The method of claim 12 further comprising:
    receiving a sky polarization data set at a known time T(i);
    accessing a sun almanac to determine azimuth and elevation angles of the sun at said time T(i) and for said first location;
    calculating a plurality of predicted polarization values for a plurality of respective sample points across the sky at said time T(i) and for said first location;
    correlating a sky polarization measurement captured using said sky polarization sensor with at least one of said plurality of predicted polarization values, and calculating translation and rotation parameters of a transform between said sky polarization measurement and said at least one of said plurality of predicted polarization values;
    converting said translation and rotation parameters of said transform from image-space to real-world coordinate frame; and
    adding said rotation parameters in the real-world coordinate frame to the azimuth and elevation angles determined from said sun almanac, to determine the yaw, pitch and roll orientation parameters for said visual sighting device.

16. The method of claim 15 further comprising:
    determining at least one orientation angle to a remote target wherein said at least one orientation angle is matched to a coordinate system by a setup procedure comprising:
    establishing a platform vertically over a known position;
    measuring a vertical distance from said known position to said platform;
    determining a level orientation for said sky polarization sensor, as determined by a bubble-level; and
    establishing said orientation of said platform in terms of said coordinate system by aiming said visual sighting device at a backsight of either a known azimuth or a known position while measuring said sky polarization data set.

17. The method of claim 16 further comprising:
    using a polarization reference station, comprising a second sky polarization sensor having measurement axes which are aligned in a known orientation with respect to True North and a local gravity vector, to generate a sky polarization reference data set; and
    storing said sky polarization reference data set at a sequence of known times including said known time T(i) using a first data storage system.

18. The method of claim 17 further comprising:
transmitting said sky polarization measurement from said polarization reference station to an orientation determiner coupled with said visual sighting device and said sky polarization sensor using a communications link.

19. The method of claim 18 further comprising:
transmitting said sky polarization measurement from a mobile device comprising said visual sighting device and said orientation determiner to a storage and processing system via a communications link;
sending said sky polarization reference data set from said first storage system to said storage and processing system; and
determining an orientation for said visual sighting device at said storage and processing system.

20. The method of claim 18 further comprising:
transmitting said sky polarization measurement from said orientation determiner to said polarization reference station;
processing said sky polarization measurement with reference data taken proximate to said known time T(i) to bring said sky polarization measurement and said sky polarization reference data set into congruence by calculating a series of axis rotations with resultant defined angles;
using said resultant defined angles as at least one orientation parameter for said visual sighting device at time T(i); and
transmitting said resultant defined angles to said orientation determiner as the orientation parameters for the time T(i) of the visual sighting system.

21. The method of claim 18 wherein said sky polarization reference data set is sent after receiving a request via said communications link from said orientation determiner for data captured proximate to time T(i).

22. The method of claim 1 wherein the sky polarization sensor comprises a photo-diode-based polarization detection system.

23. The method of claim 1 wherein the sky polarization sensor comprises a camera-based polarization detection system.

24. The method of claim 1 further comprising:
using a differential polarization process to determine said absolute orientation of said visual sighting device.

25. A method for obtaining position data for a target with a position determining device, comprising:
acquiring a first position of a total station, the total station comprising a sky polarization sensor disposed in a known spatial relationship to said total station;
determining a first absolute orientation of said total station based on a sky polarization data set acquired using the sky polarization sensor;
translating said first absolute orientation into orientation information in a coordinate system at said total station;
capturing a distance to a target using a visual sighting device of said total station comprising an internal distance measuring system; and
calculating a position of said target based on said first position, said distance to said target, and said orientation information.

26. A method for obtaining position data for a target with a position determining system, comprising:
determining a position of a first location using a Global Navigation Satellite System (GNSS) receiver of the position determining system;
determining a distance to a target from a visual sighting device of the position determining system using an internal distance measuring system of the visual sighting device;
determining an absolute orientation of the visual sighting device based on a sky polarization data measurement using a sky polarization sensor of said position determining system; and
calculating a position of said target based on said position of said first location, said distance from said visual sighting device to said target, and said absolute orientation of said visual sighting device.

27. A method for obtaining position data for a target, comprising:
determining a position of a first location of a visual sighting device and a sky polarization sensing device having a known spatial relationship with respect to the visual sighting device;
determining a first absolute orientation of the visual sighting device when the visual sighting device is at the first location and oriented toward a target, wherein the first absolute orientation is determined based on a first sky polarization data measurement using the sky polarization sensing device;
determining a position of a second location of said visual sighting device;
determining a second absolute orientation of the visual sighting device when the visual sighting device is at the second location and oriented toward the target, wherein the second absolute orientation is determined based on a second sky polarization data measurement using the sky polarization sensing device; and
calculating a position of said target based upon the position of said first location, said first absolute orientation of the visual sighting device, the position of said second location, and said second absolute orientation of the visual sighting device.

28. A surveying system comprising:
a visual sighting device comprising a distance measuring component configured to measure a distance from the visual sighting device to a target;
a polarization sensor disposed in a known spatial relationship with said visual sighting device;
an orientation determiner configured to determine an absolute orientation of said visual sighting device based upon at least one sky polarization data set captured by said polarization sensor;
a Global Navigation Satellite System (GNSS) receiver configured to determine a position at which said surveying system is located; and
a position determiner configured to determine a position of a target based upon said absolute orientation, said distance from the visual sighting device to said target, and the position at which said surveying system is located.

29. The surveying system claim 28 wherein said orientation determiner is configured to find a best fit between said sky polarization data set and a reference sky polarization data set.

30. The surveying system of claim 29, wherein said reference sky polarization data set comprises a model of sky polarization.

31. The surveying system of claim 29 wherein said reference sky polarization data set comprises a set of sky polarization measurements captured using a second sky polarization sensor having a known absolute orientation.

32. A method for determining a position of a target comprising:
  orienting a visual sighting device and a sky polarization sensor toward a known location, wherein said visual sighting device comprises a range measurement system and is disposed in a known first spatial relationship with said sky polarization sensor;
  determining an absolute orientation of said visual sighting device based on a sky polarization data measurement using the sky polarization sensor;
  determining a distance from said visual sighting device to said known location;
  accessing a set of coordinates of said known location;
  determining a second spatial relationship between said visual sighting device and said target when said distance to said known location is determined; and
  calculating a position of said target based on said set of coordinates, said distance to said known location, said known first spatial relationship, said second spatial relationship, and said absolute orientation of said visual sighting device.

33. The method of claim 32 further comprising:
  comparing a sky polarization measurement, captured using said sky polarization sensor, with a sky polarization reference data set to determine said absolute orientation.

34. The method of claim 33 further comprising:
  receiving an indication of the time said sky polarization measurement was taken and an indication of the location at which said sky polarization measurement was taken.

35. The method of claim 33 further comprising:
  receiving said sky polarization reference data set at said visual sighting device from a polarization reference source.

36. The method of claim 35 further comprising:
  comparing a sky polarization measurement, captured using said sky polarization sensor with a sky polarization model based upon a time when said sky polarization measurement was taken.

37. The method of claim 35 further comprising:
  comparing a sky polarization measurement, captured using said sky polarization sensor with a second sky polarization measurement captured by a second sky polarization sensor having a known absolute orientation.

38. The method of claim 33 wherein said sky polarization reference data set comprises a sky polarization model, said method further comprising:
  storing said sky polarization model at said visual sighting device.

* * * * *